(12) United States Patent
Borzycki et al.

(10) Patent No.: US 8,745,755 B2
(45) Date of Patent: Jun. 3, 2014

(54) CONTROLLING DEVICE ACCESS TO ENTERPRISE RESOURCES IN AN ORCHESTRATION FRAMEWORK FOR CONNECTED DEVICES

(71) Applicant: Citrix Systems, Inc., Ft. Lauderdale, FL (US)

(72) Inventors: Andrew Borzycki, Killara (AU); Mallikharjuna Reddy Deva, Sydney (AU); Uday Nandigam Gajendar, Menlo Park, CA (US); Anil Roychoudhry, Woodcroft (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 13/963,811

(22) Filed: Aug. 9, 2013

(65) Prior Publication Data

US 2014/0108792 A1 Apr. 17, 2014

Related U.S. Application Data

(60) Provisional application No. 61/861,199, filed on Aug. 1, 2013, provisional application No. 61/712,956, filed on Oct. 12, 2012, provisional application No. 61/712,962, filed on Oct. 12, 2012, provisional application No. 61/824,204, filed on May 16, 2013, provisional application No. 61/713,718, filed on Oct. 15, 2012, provisional application No. 61/806,577, filed on Mar. 29, 2013, provisional application No. 61/713,715, filed on Oct. 15, 2012, provisional application No. 61/713,762, filed on Oct. 15, 2012, provisional application No. 61/714,469, filed on Oct. 16, 2012, provisional application No. 61/714,293, filed on Oct. 16, 2012, provisional application No. 61/712,948, filed on Oct. 12, 2012, provisional application No. 61/712,953, filed on Oct. 12, 2012.

(51) Int. Cl.
*H04L 29/06* (2006.01)
*G06F 21/62* (2013.01)

(52) U.S. Cl.
CPC .......... *G06F 21/6218* (2013.01); *H04L 63/04* (2013.01)

USPC ................ 726/27; 726/3; 713/150; 380/255; 380/259

(58) Field of Classification Search
CPC ..... G06F 21/10; G06F 21/6218; G06F 15/16; H04L 2463/101; H04L 63/0428; H04L 29/06
USPC ........ 726/1–3, 16, 26–27; 713/150, 153, 154, 713/160, 164–166; 380/200–203, 255–257, 380/259–260, 269, 270, 277–278, 283, 380/28–30
See application file for complete search history.

(56) References Cited

U.S. PATENT DOCUMENTS 6,609,198 B1    8/2003    Wood et al.
(Continued)

OTHER PUBLICATIONS

Office Action received in U.S. Appl. No. 13/963,794 mailed Oct. 17, 2013.
(Continued)

*Primary Examiner* — Darren B Schwartz
*Assistant Examiner* — John B King
(74) *Attorney, Agent, or Firm* — Banner & Witcoff, Ltd.

(57) ABSTRACT

Aspects described herein allow multiple devices to function as a coherent whole, allowing each device to take on distinct functions that are complementary to one another. Aspects described herein also allow the devices function as a coherent whole when interconnected devices and their respective applications are configured to operate in various operation modes, when management policies are employed to control the operation of the interconnected devices and their respective applications, when transferring content between the interconnected devices and storing the content at those devices, when obtaining access credentials for the interconnected devices that enable the devices to access enterprise resources, when a policy agent applies management policies to control operation of and interaction between the interconnected devices, and when the interconnected devices are used to access an enterprise application store.

16 Claims, 43 Drawing Sheets

(56) References Cited

U.S. PATENT DOCUMENTS

| | | | |
|---|---|---|---|
| 6,883,098 B1 | 4/2005 | Roman et al. | |
| 7,043,453 B2* | 5/2006 | Stefik et al. | 705/52 |
| 7,254,831 B2 | 8/2007 | Saunders et al. | |
| 7,529,923 B2 | 5/2009 | Chartrand et al. | |
| 8,296,239 B2* | 10/2012 | Nonaka | 705/57 |
| 8,468,090 B2 | 6/2013 | Lesandro et al. | |
| 2003/0031319 A1* | 2/2003 | Abe et al. | 380/232 |
| 2003/0037103 A1* | 2/2003 | Salmi et al. | 709/203 |
| 2003/0046366 A1* | 3/2003 | Pardikar et al. | 709/219 |
| 2004/0083273 A1* | 4/2004 | Madison et al. | 709/217 |
| 2005/0273592 A1* | 12/2005 | Pryor et al. | 713/150 |
| 2006/0085826 A1* | 4/2006 | Funk et al. | 725/87 |
| 2006/0161635 A1* | 7/2006 | Lamkin et al. | 709/217 |
| 2007/0199051 A1 | 8/2007 | Parikh et al. | |
| 2007/0226225 A1 | 9/2007 | Yiu et al. | |
| 2007/0226773 A1 | 9/2007 | Pouliot | |
| 2008/0066177 A1 | 3/2008 | Bender | |
| 2008/0133729 A1 | 6/2008 | Fridman et al. | |
| 2008/0196038 A1 | 8/2008 | Antonio et al. | |
| 2008/0209506 A1* | 8/2008 | Ghai et al. | 726/1 |
| 2009/0172789 A1 | 7/2009 | Band et al. | |
| 2010/0124196 A1 | 5/2010 | Bonar et al. | |
| 2010/0146523 A1 | 6/2010 | Brigaut et al. | |
| 2010/0150341 A1* | 6/2010 | Dodgson et al. | 380/29 |
| 2011/0239125 A1 | 9/2011 | Kristensen et al. | |
| 2011/0258301 A1 | 10/2011 | McCormick et al. | |
| 2012/0066691 A1 | 3/2012 | Branton | |
| 2012/0088540 A1 | 4/2012 | Smith et al. | |
| 2012/0117622 A1 | 5/2012 | Gronholm et al. | |
| 2012/0166524 A1 | 6/2012 | Watakabe et al. | |
| 2012/0179909 A1* | 7/2012 | Sagi et al. | 713/167 |
| 2012/0290694 A9* | 11/2012 | Marl et al. | 709/223 |
| 2013/0013688 A1 | 1/2013 | Wang et al. | |
| 2013/0086684 A1 | 4/2013 | Mohler | |
| 2013/0091543 A1 | 4/2013 | Wade et al. | |
| 2013/0227659 A1 | 8/2013 | Raleigh | |
| 2013/0232541 A1 | 9/2013 | Kapadia et al. | |
| 2013/0346268 A1 | 12/2013 | Pereira et al. | |

OTHER PUBLICATIONS

Ranjan et al., "Programming Cloud Resource Orchestration Framework: Operations and Research Challenges", arvix.org, 2012, pp. 1-19.

Na et al., "Personal Cloud Computing Security Framework," 2010 IEEE Asia-Pacific Computing Conference, 2010, pp. 671-675.

Notice of Allowance issued in U.S. Appl. No. 13/963,825 mailed Oct. 25, 2013.

Wilson et al., "Unified Security Framework", in proceedings of the 1st International Symposium on Information and Communication Technologies, pp. 500-505. Trinity College Dublin, 2003.

Mysore et al., "The Liquid Media System—a Multi-Device Streaming Media Orchestration Framework", Ubicomp 2003 Workshop, pp. 1-4.

Office Action received in U.S. Appl. No. 13/963,825 mailed Nov. 6, 2013.

Written Opinion and International Search Report, PCT/US2013/062636, Jan. 10, 2014.

* cited by examiner

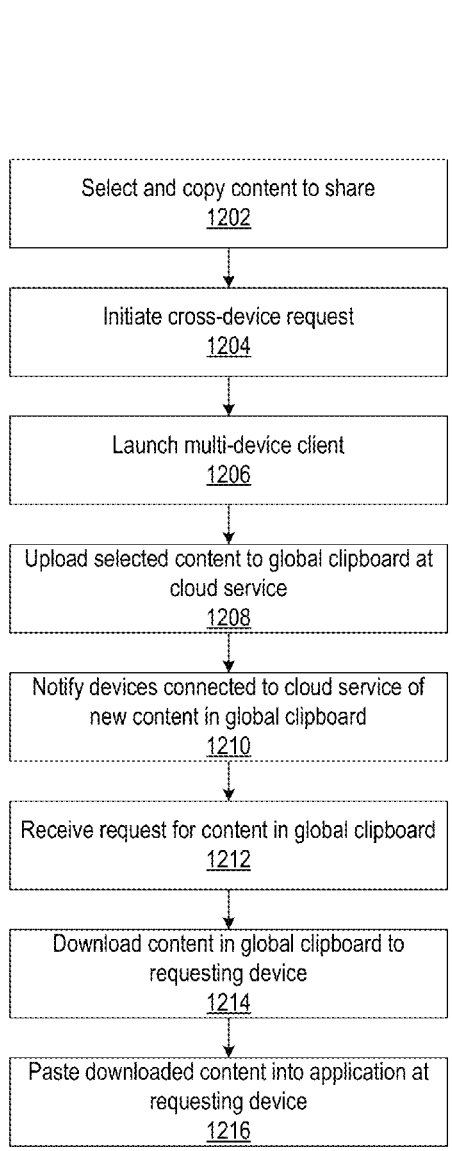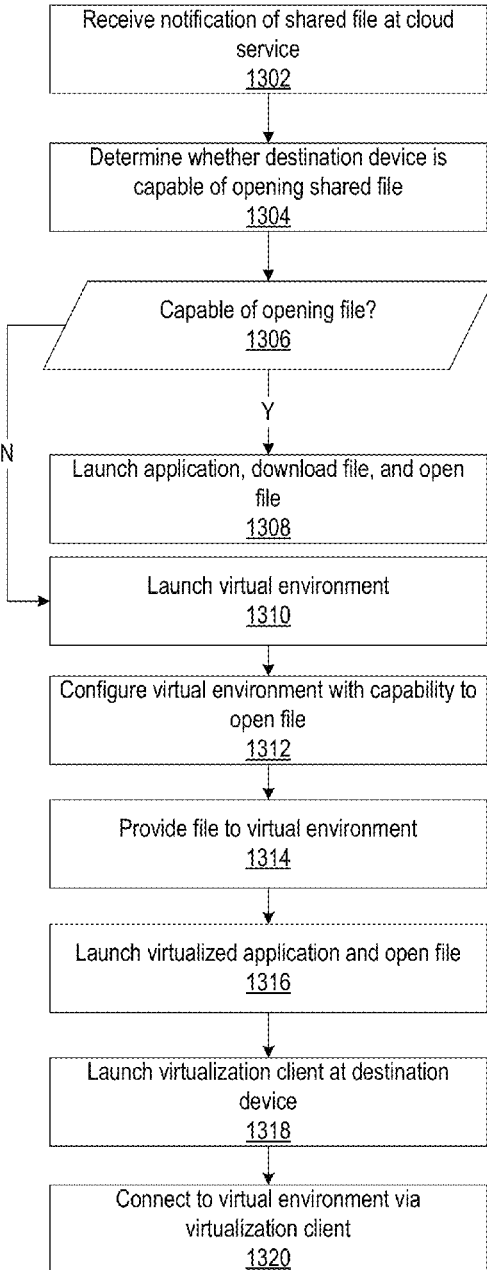
FIG. 12
FIG. 13

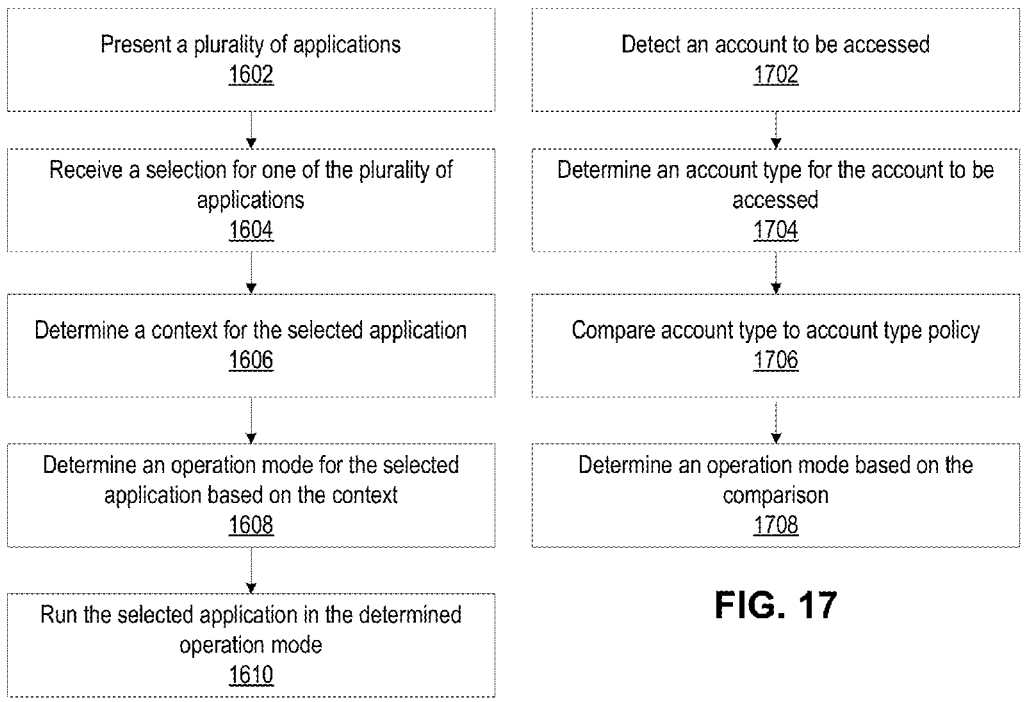
FIG. 16
FIG. 17
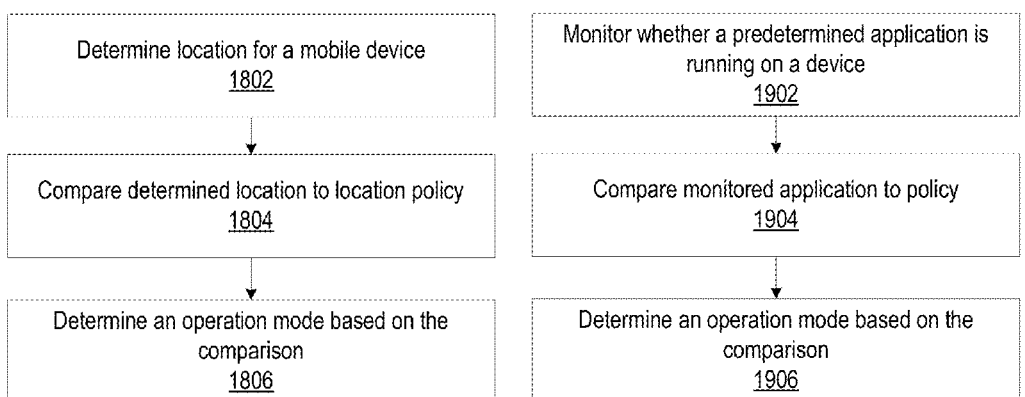
FIG. 18
FIG. 19

IN RESPONSE TO COPYING OF DATA FROM AN UNSECURE APPLICATION INTO THE GENERAL CLIPBOARD, A SECURE APPLICATION RECEIVING NOTICE OF THE COPY EVENT (I) READS THE DATA FROM THE GENERAL CLIPBOARD, (II) ENCRYPTS THE DATA TO FORM ENCRYPTED DATA, AND (III) WRITES THE ENCRYPTED DATA TO THE HIDDEN ENCRYPTED PASTEBOARD FOR USE BY SECURE APPLICATIONS

EXAMPLE DATA SHARING FLOW

3300

3400

3500

CONTROLLING DEVICE ACCESS TO ENTERPRISE RESOURCES IN AN ORCHESTRATION FRAMEWORK FOR CONNECTED DEVICES

CROSS-REFERENCE TO RELATED APPLICATIONS

This application claims the benefit of U.S. Provisional Patent Application No. 61/861,199 entitled "ORCHESTRATION FRAMEWORK FOR CONNECTED DEVICES" and filed on Aug. 1, 2013, which is incorporated by reference in its entirety in this disclosure.

This application also claims the benefit of U.S. Provisional Patent Application No. 61/712,948 entitled "Frictionless Distributive and Collaborative Work Across Time and Space" and filed on Oct. 12, 2012; U.S. Provisional Patent Application No. 61/712,953 entitled "Mobile Work and Micro Work Using an Activity Interface" and filed on Oct. 12, 2012; U.S. Provisional Patent Application No. 61/712,956 entitled "Multi-Device Interaction" and filed on Oct. 12, 2012; U.S. Provisional Patent Application No. 61/712,962 entitled "Orchestration Framework for Connected Devices" and filed on Oct. 12, 2012; U.S. Provisional Patent Application No. 61/824,204 entitled "Multi-Device Interaction" and filed on May 16, 2013, each of which are incorporated by reference in their entirety in this disclosure. This application is also related to U.S. patent application Ser. No. 13/963,758 entitled "Sharing Content Across Application and Devices Having Multiple Operation Modes in an Orchestration Framework for Connected Devices" and filed on Aug. 9, 2013; U.S. patent application Ser. No. 13/963,739 entitled "Coordinating a Computing Activity Across Application and Devices Having Multiple Operation Modes in an Orchestration Framework for Connected Devices" and filed on Aug. 9, 2013; U.S. patent application Ser. No. 13/963,794 entitled "Managing Dynamic Policies and Setting in an Orchestration Framework for Connected Devices" and filed on Aug. 9, 2013; U.S. patent application Ser. No. 13/963,825 entitled "Single Sign-On Acess in an Orchestration Framework for Connected Devices" and filed on Aug. 9, 2013; U.S. application Ser. No. 13/963,833 entitled "Application Management Framework for Secure Data Sharing in an Orchestration Framework for Connected Devices" and filed on Aug. 9, 2013; and U.S application Ser. No. 13/963,851 entitled "Enterprise Application Store for an Orchestration Framework for Connected Devices " and filed on Aug. 9, 2013.

This application also claims the benefit of U.S. Provisional Patent Application 61/713,718 entitled "Secure Data Sharing Among Managed Applications" and filed on Oct. 15, 2012; and U.S. Provisional Patent Application No. 61/806,577 entitled "Systems and Methods for Enterprise Mobility Management" and filed on Mar. 29, 2013, each of which are incorporated by reference in its entirety in this disclosure. This application is also related to U.S. patent application Ser. No. 13/886,889 entitled "Application with Multiple Operation Modes" and filed on May 3, 2013, which is incorporated by reference in its entirety in this disclosure.

The application also claims the benefit of U.S. Provisional Patent Application No. 61/713,715 entitled "Managing Dynamic Policies and Settings for Mobile Applications" and filed on Oct. 15, 2012, which is incorporated by reference in its entirety in this disclosure.

This application also claims the benefit of U.S. Provisional Patent Application No. 61/714,293 entitled "Managing Encrypted File Vaults for Managed Applications on Unmanaged Mobile Device" filed on Oct. 16, 2012, which is incorporated by reference in its entirety in this disclosure. This application is also related to U.S. patent application Ser. No. 13/649,076 entitled "Gateway for Controlling Mobile Device Access to Enterprise Resources" and filed on Oct. 10, 2012; and U.S. Pat. No. 7,788,536 to Qureshi et al. entitled "Automated Detection of Software Problems in Software Application Deployments" and issued on Aug. 31, 2010, each of which are incorporated by reference in their entirety in this disclosure.

This application is also related to U.S. patent application Ser. No. 13/886,845 entitled "Secured Access to Resources Using a Proxy" and filed on May 3, 2013; U.S. patent application Ser. No. 12/390,110 entitled "Implementing Single Sign-On Across a Heterogeneous Collection of Client/Server and Web-Based Applications" and filed on Feb. 20, 2009; U.S. patent application Ser. No. 12/575,121 entitled "Authenticating a Client Using Linked Authentication Credentials" and filed on Oct. 7, 2009; U.S. Pat. No. 6,681,330 to Bradford et al. entitled "Method and System for a Heterogeneous Computer Network System with Unobtrusive Cross-Platform User Access" and issued on Jan. 20, 2004; and U.S. Pat. No. 6,243,816 to Fang et al. entitled "Single Sign-On (SSO) Mechanism Personal Key Manager" and issued on Jun. 5, 2001 each of which are incorporated by reference in their entirety in this disclosure.

This application also claims the benefit of U.S. Provisional Patent Application No. 61/713,762 entitled "Conveying Data Between Secure Applications Running on an Electronic Mobile Device" and filed on Oct. 15, 2012; and U.S. Provisional Patent Application No. 61/714,469 entitled "Policy-Based Control of a Managed Application Derived from an Unmanaged Application" and filed on Oct. 16, 2012, each of which are incorporated by reference in their entirety in this disclosure.

This application is also related to U.S. Provisional Patent Application No. 61/643,629 entitled "Virtual Machine Receiver with Social Network Integration" and filed on May 7, 2012; and U.S. Provisional Patent Application No. 61/644,060 entitled "Virtual Machine Receiver with Social Network Integration" and filed on May 8, 2012 each of which are incorporated by reference in their entirety in this disclosure.

BACKGROUND

Traditionally, personal computers included operating systems, applications, and user settings for a single user. Personal computers were generally both used and managed by their owners. However, many organizations are now using virtualization, remote access and/or clouds of computing resources to fulfill their computing needs. Clouds of virtualized computing resources generally allow for the operating systems, applications, and user settings of multiple users to be included on a single physical machine. Desktop virtualization technology allows multiple instances of an operating system to be kept separate, so the activity of one user does not affect the experience of other users. Cloud computing environments allow for computers owned by the cloud operator to be managed by the cloud operator but used by cloud users, who may be customers of the cloud operator.

A virtual machine client agent is an application that allows a user a type of virtualized remote access to corporate applications, desktops and data, even when said "remote" resources are on the physical machine the user may be using. Each client agent may communicate with a central enterprise server that lists which applications and other resource have been selected by the user, and which applications and other resources are available for the user to select or request.

As virtualization becomes increasingly popular and more cost effective, new problems arise that aspects described herein address. For example, we are currently in the post PC era, and moving from a single device to a multi device world. This typically involves at least 4 screens—a smart phone, a tablet, a full featured laptop/desktop, and large, room mounted displays. Each of these devices can independently run software such as web browsers, meeting software (such as GOTOMEETING® by Citrix Systems Inc. of Ft. Lauderdale, Fla.), and personal information managers (PIM software), and document/productivity software. However, each of these devices runs independently, largely unaware of other devices. The most linkage that currently occurs between devices typically involves mirroring screens from one device to another. Typical examples of this include displaying a laptop screen on a large, room-mounted display, or displaying a tablet/smart phone display onto a laptop, which then gets displayed on a large, room mounted display.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to an orchestration framework for managing the interaction between interconnected devices in a coordinated fashion.

A first aspect described herein provides a method for managing the storage of content exchanged between computing devices. Computing devices may be interconnected through an orchestration framework that coordinates operation of a computing activity across multiple computing devices of the plurality of computing devices. A request to transfer content from a first computing device to a second computing device may be received. A data vault that stores the content at the first computing device may be identified, a determination may be made of whether the data vault is encrypted. If the data vault is encrypted, the second computing device may be instructed to store the content in a data vault that is also encrypted.

A second aspect described herein provides an apparatus for managing the storage of content exchanged between computing devices. The apparatus may include at least one processor and memory storing computer-readable instructions. The instructions, when executed, may cause the apparatus to interconnect multiple computing devices through an orchestration framework that coordinates operation of a computing activity across the multiple computing devices. The apparatus may receive a request to transfer content from a first computing device to a second computing device. The apparatus may also identify a data vault at the first computing device that stores the content. The data vault may be an encrypted data vault or an unencrypted data vault. The apparatus may instruct the second computing device to store the transferred content based on the data vault of the first computing device.

A third aspect described herein provides non-transitory computer-readable media for managing the storage of content exchanged between computing devices. The instructions, when executed, may cause a computing device to connect to one or more computing devices through an orchestration framework that coordinates operation of a computing activity across the computing devices. The computing device may receive content transferred from another computing device and store the content in an unencrypted data vault or an encrypted data vault.

Some aspects described herein also provide encrypting the content before transferring the content to another computing device and providing the encryption key to the other computing device, transmitting an instruction to one or more computing devices to delete at least a portion of the content stored in one or more respective data vaults at the computing devices, permit or block transfer of content to another computing device based on the types of data vaults available at that computing device, determine a list of computing devices having a desired type of data vault and presenting the list for selection of one of the computing devices as the destination for transferred content. The orchestration framework may be configured to interconnect computing devices via a client-server communication session, a peer-to-peer communication session, and combinations thereof.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 12 is a flowchart of example method steps for cross-device copy-and-paste functionality.

FIG. 13 is a flowchart of example method steps for launching a shared file at a destination device.

FIG. 16 is a flowchart for determining an application mode for an application in accordance with an embodiment.

FIG. 17 is a flowchart for determining an account type context for an application in accordance with an embodiment.

FIG. 18 is a flowchart for determining a location context for an application in accordance with an embodiment.

FIG. 19 is a flowchart for determining a predetermine application status context for an application in accordance with an embodiment.

DETAILED DESCRIPTION

Figure 1:
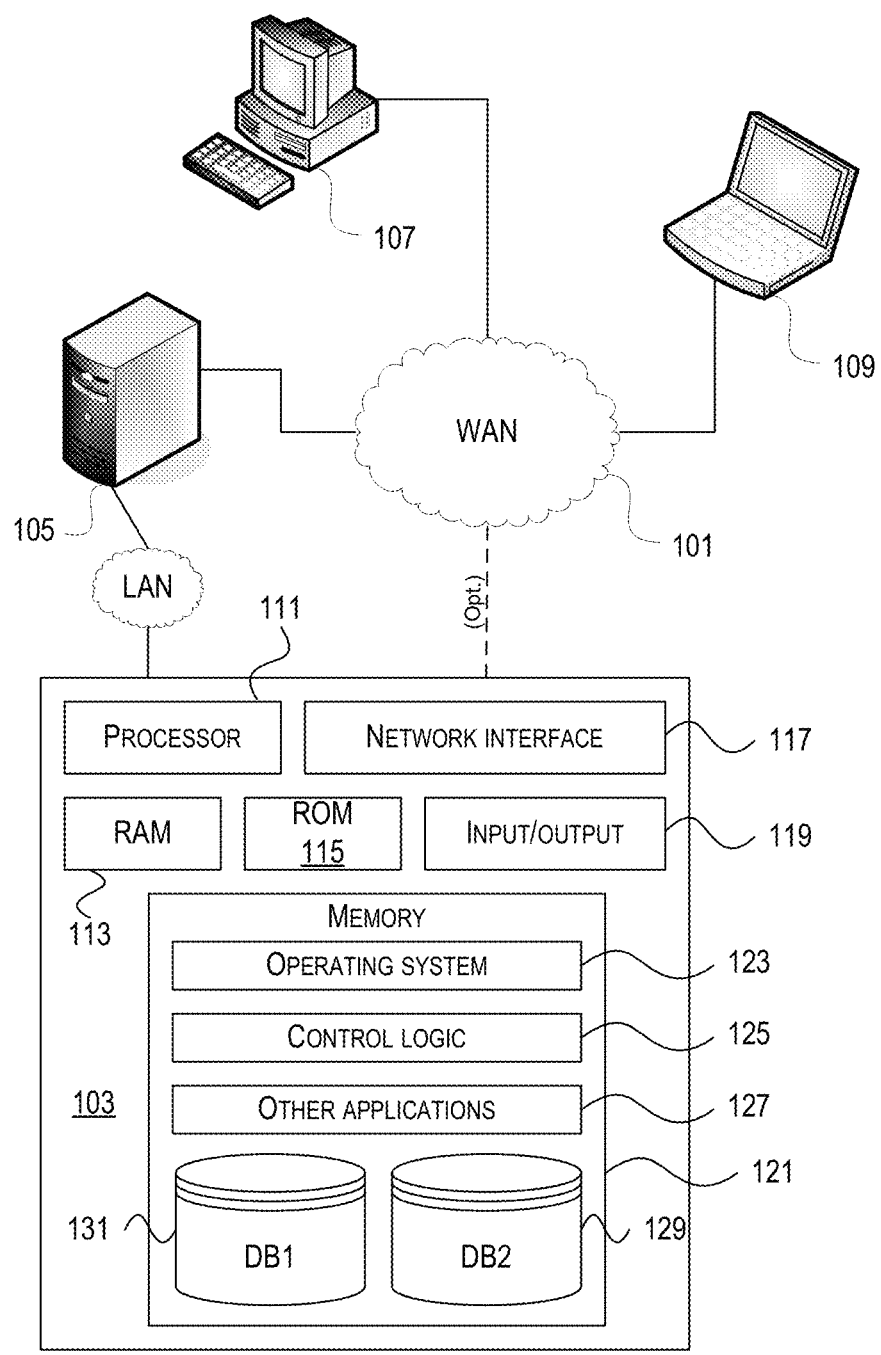
FIG. 1 depicts an illustrative computer system architecture that may be used in accordance with one or more illustrative aspects described herein.

To address the above problems, and others that will be apparent to the reader, aspects described herein allow multiple devices to function as a coherent whole, allowing each device to take on distinct functions that are complementary to one another. Aspects described herein also allow the devices function as a coherent whole when interconnected devices and their respective applications are configured to operate in various operation modes, when management policies are employed to control the operation of the interconnected devices and their respective applications, when transferring content between the interconnected devices and storing the content at those devices, when obtaining access credentials for the interconnected devices that enable the devices to access enterprise resources, when a policy agent applies management policies to control operation of and interaction between the interconnected devices, and when the interconnected devices are used to access a virtual workspace and enterprise application store.

As described in further detail below, an orchestration framework may interconnect multiple computing devices and coordinate operation of a computing activity across the interconnected devices. According to one aspect, the orchestration framework may make content residing at one computing device available to another computing device for presentation at that computing device. For example, the orchestration framework may make video content residing at a tablet computing device available to a larger display device (e.g., a television) that presents the video content. According to another aspect of the orchestration framework, a computing activity may be initiated at a first computing device, and a portion of that computing activity may be performed at one of the other computing devices. For example, an online meeting may be initiated at a mobile cellular telephone, audio from the online meeting may be output at a larger audio output device (e.g., a speaker system), and video from the online meeting may be output to a larger display device. As another example, a document editing application may be initiated at a tablet computing device, input to the application may be received at a keyboard of a desktop computing device, and the interface of the application may be presented at a larger display device. Additional aspects and examples will be appreciated with the benefit of the detailed description provided below.

Stated more generally, functionality, input, and output associated with an application may be spread across multiple devices that are interconnected by the orchestration framework such that the interconnected devices operate as a coordinated whole. In addition, the orchestration framework may also cause the interconnected devices to operate as a coordinated whole by providing applications, credentials, content, and other resources to the interconnected computing devices. The orchestration framework may interconnect the computing devices via client-server communication session, a peer-to-peer communication session, or both. As described in further detail below, each interconnected computing device may include a respective orchestration agent that communicates with an orchestration service at a server during the client-server communication session in order to coordinate operation of the computing activity. The orchestration agents may also communicate with each other during the peer-to-peer communication session to coordinate operation of the computing activity. The orchestration agents may communication with each other to coordinate operation of the computing activity with or without the orchestration service at a server.

Additionally, computing devices and applications respectively residing at those computing device may be described below as managed or unmanaged. If a computing device or application is managed, functionality of the computing device or application may be selectively enabled, disabled, or modified. By managing a computing device or an application, an enterprise may secure the computing device or application as described in further detail below. Accordingly, a computing device or application may also be referred to as secured or unsecured. It will be appreciated, however, that an enterprise may manage a computing device or application in a secured or unsecured way. Therefore, in some examples, a computing device may be a managed computing device that is a secured computing device or an unsecured computing device depending on the particular management policies utilized to manage the computing device or application.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
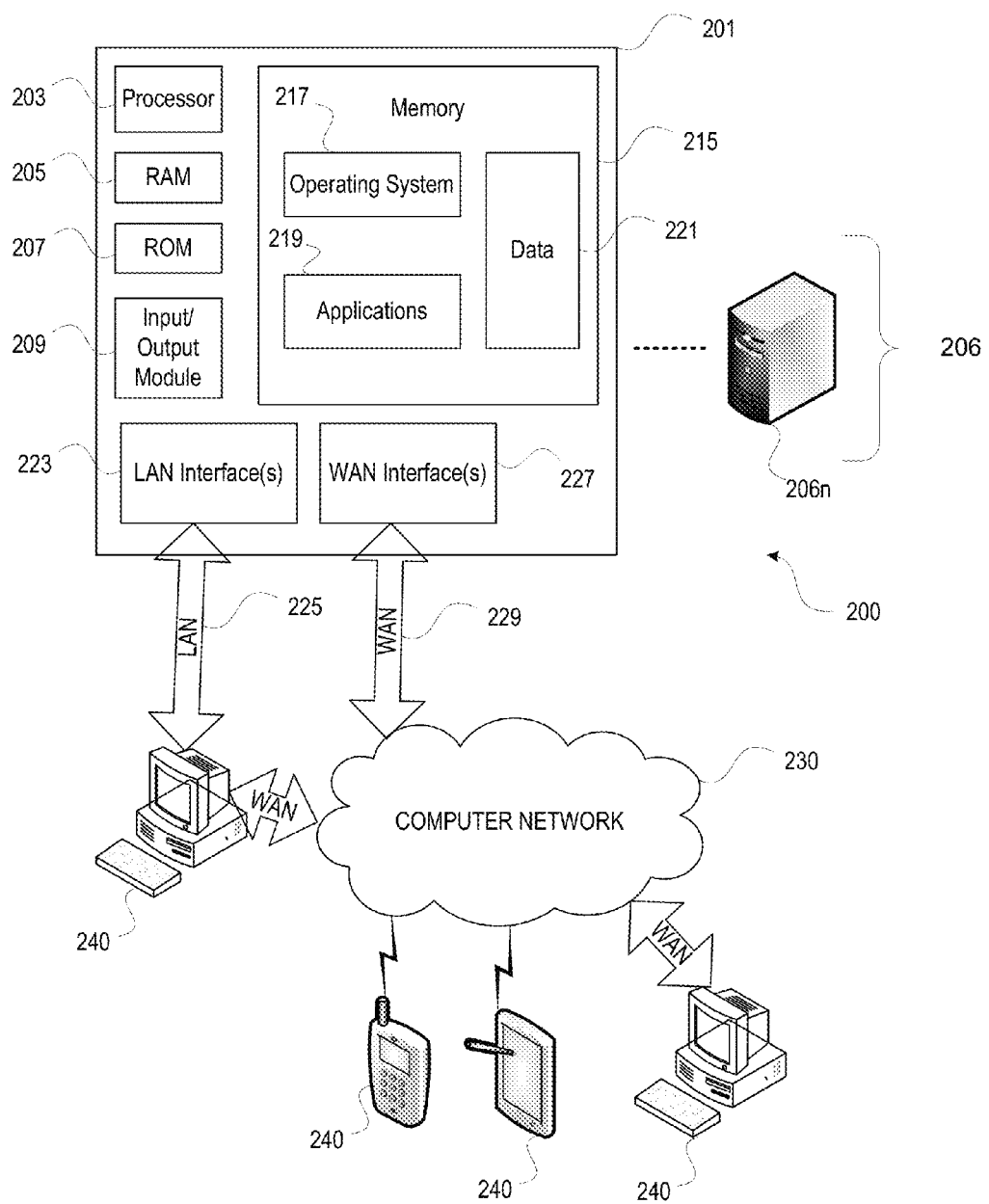
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
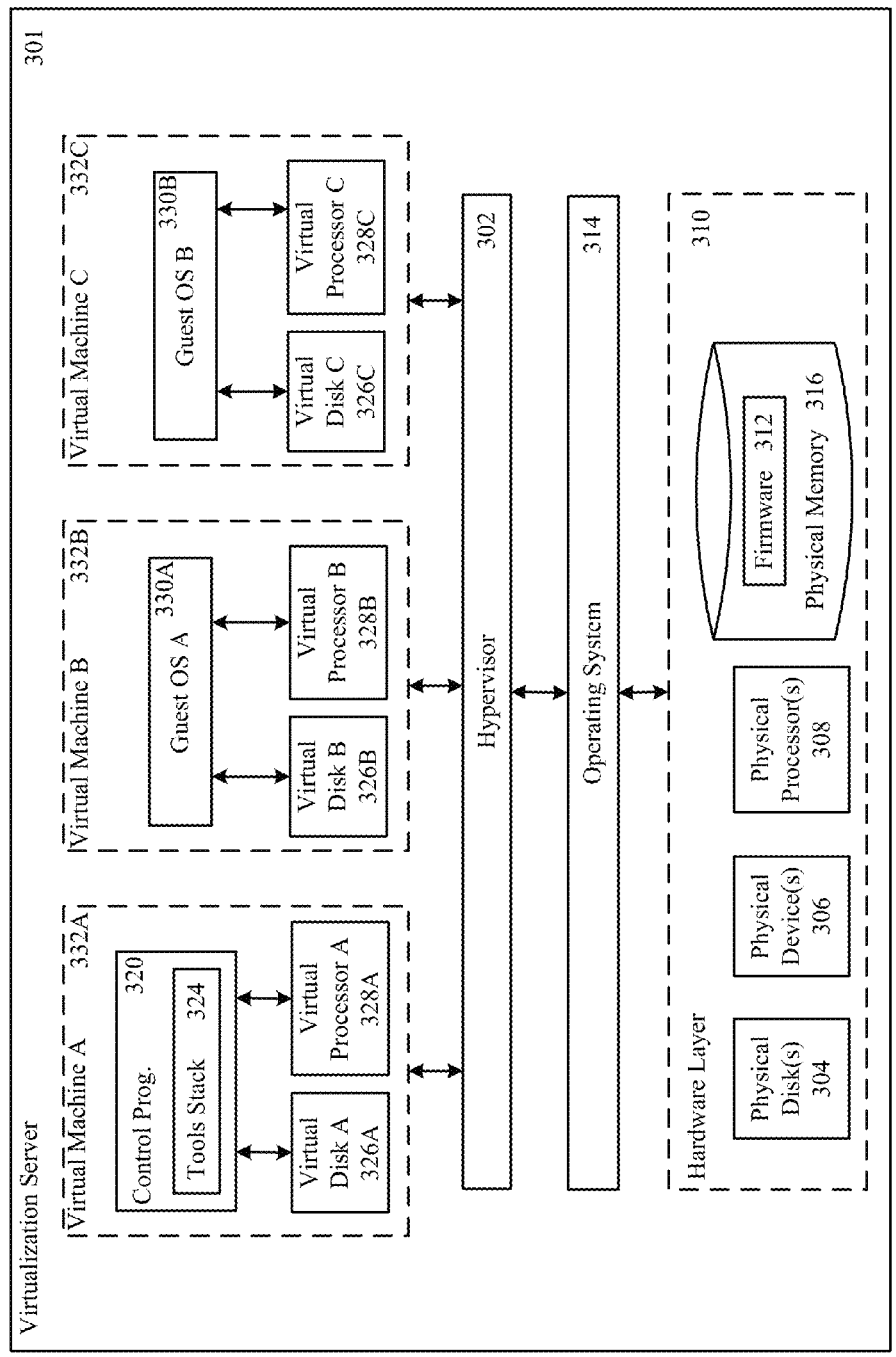
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN® hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER® provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
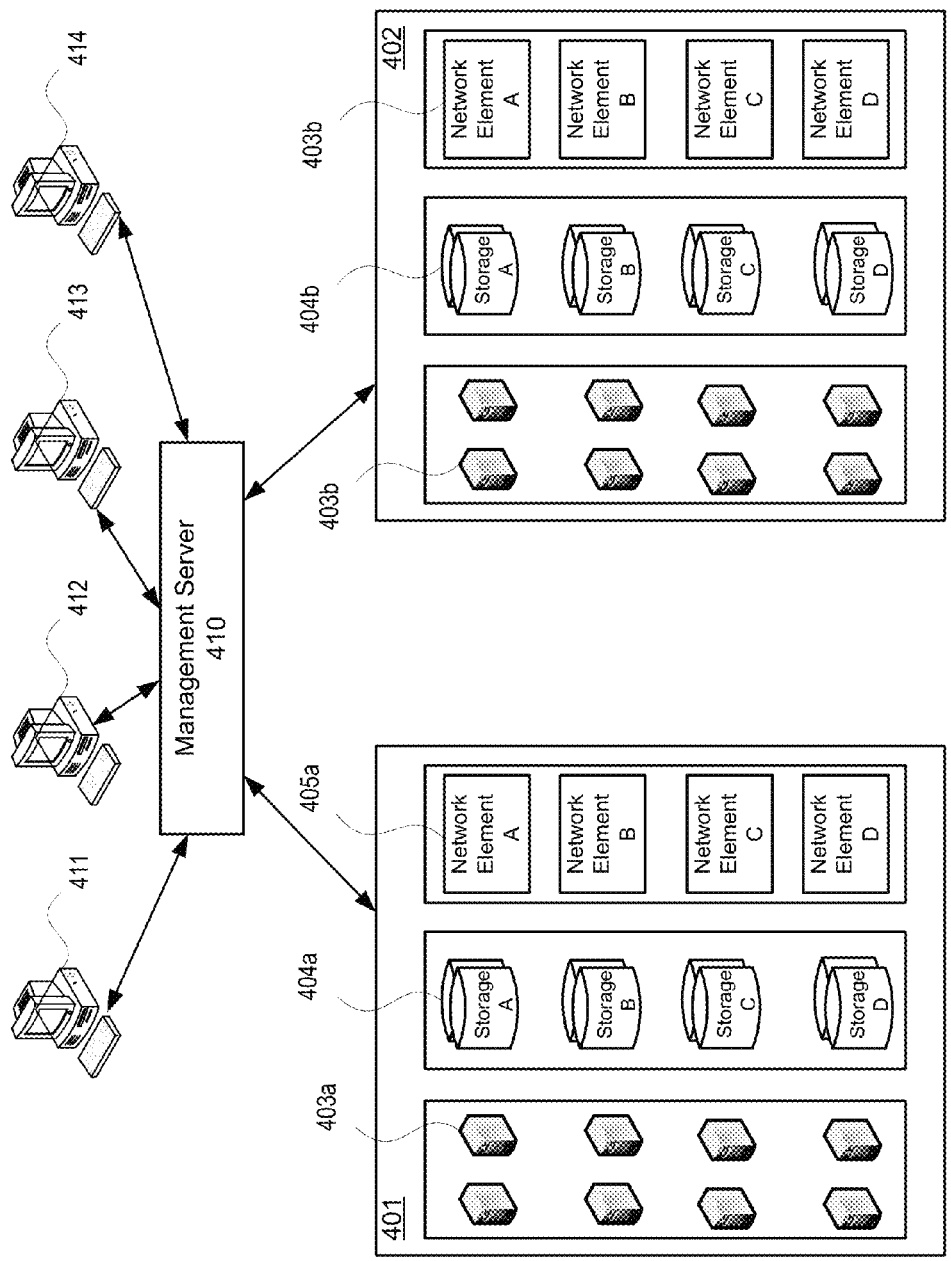
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
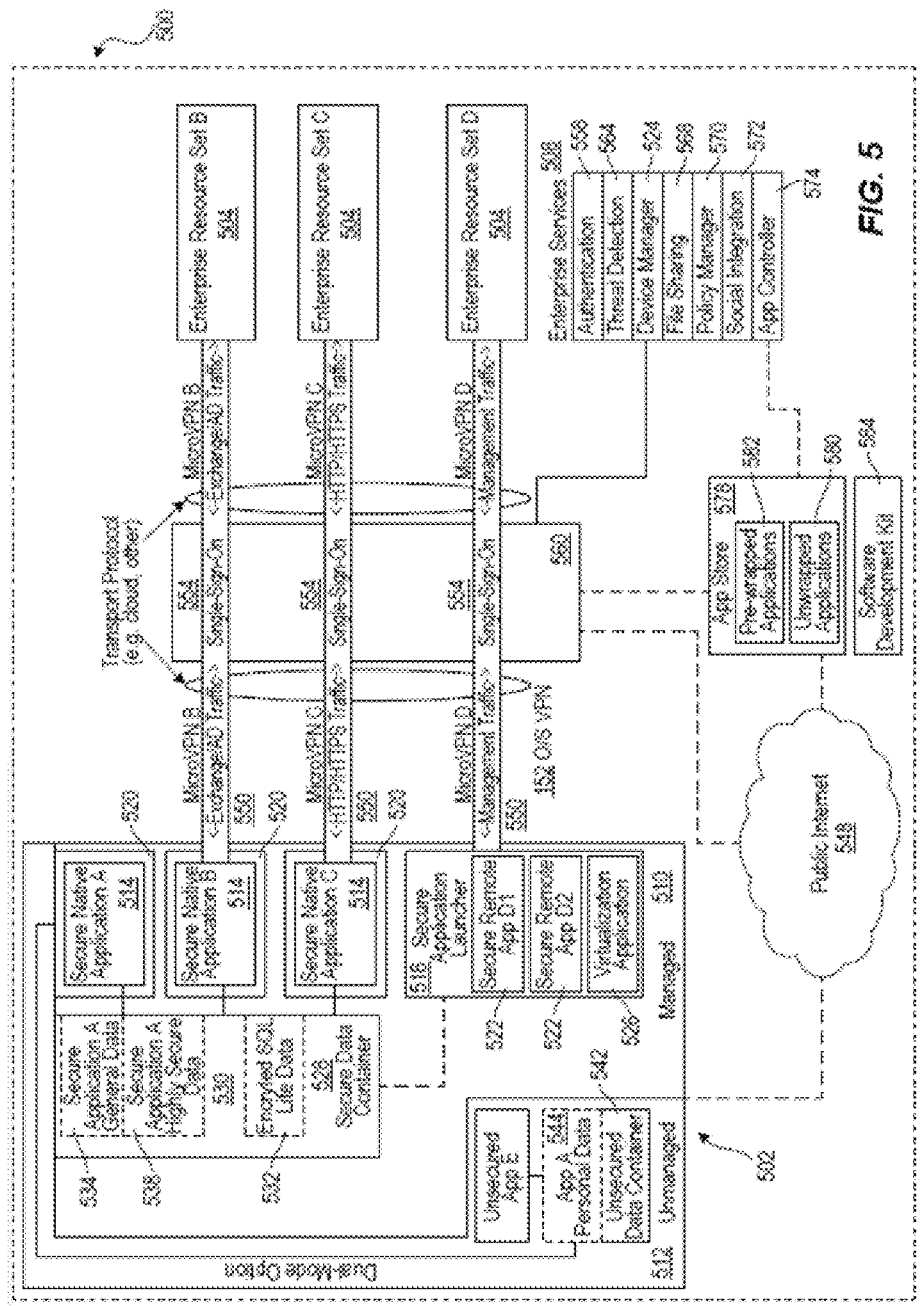
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device may run an iOS operating system, Android operating system, and/or the like. The enterprise may choose to implement management policies to manage the mobile device 504. The management policies may be implanted through a firewall or gateway in such a way that the mobile device may be identified, secured or security verified, and provided selective or full access to the enterprise resources. The management policies may be mobile device management policies, mobile application management policies, mobile data management policies, or some combination of mobile device, application, and data management policies. A mobile device 504 that is managed through the application of mobile device management policies may be referred to as an enrolled device.

The operating system of the mobile device may be separated into a managed partition 510 and an unmanaged partition 512. The managed partition 510 may have management policies applied to it to secure the applications running on and data stored in the managed partition. The applications running on the managed partition may be secure applications. The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated management policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The applications running on the managed partition may be stabilized applications. The stabilized applications may be managed by a device manager 524. The device manager 524 may monitor the stabilized applications and utilize techniques for detecting and remedying problems that would result in a destabilized application if such techniques were not utilized to detect and remedy the problems.

The secure applications may access data stored in a secure data container 528 in the managed partition 510 of the mobile device. The data secured in the secure data container may be accessed by the secure wrapped applications 514, applications executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 254-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured mode. In an unsecured mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections may be specific to particular applications 550, particular devices, particular secured areas on the mobile device, and the like (e.g., 552). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include cloud storage resource servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use user interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
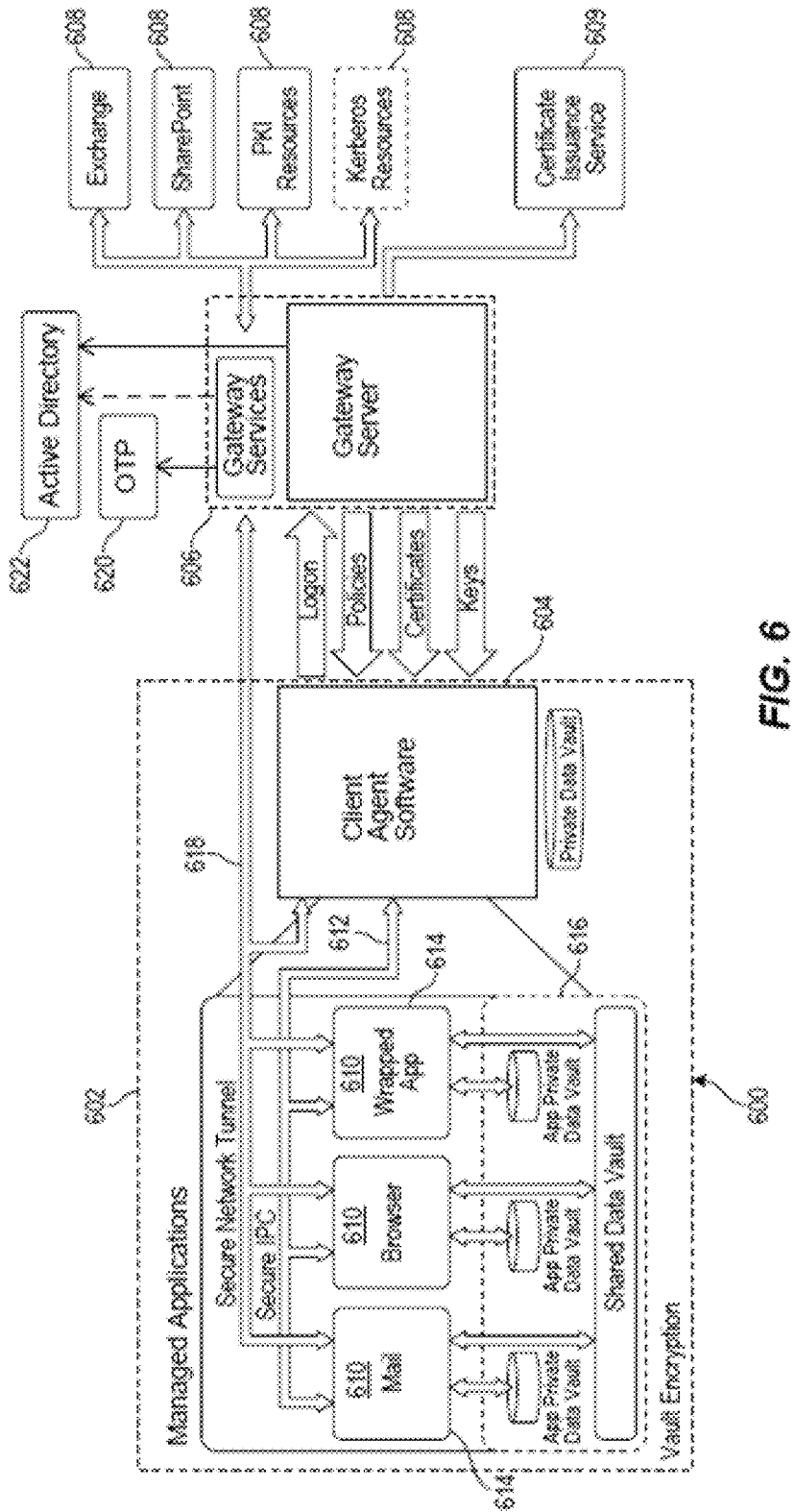
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes access gateway and application controller functionality) to access various enterprise resources 608 and services 609 such as Exchange, Sharepoint, PKI Resources, Kerberos Resources, and Certificate Issuance Service, as shown on the right hand side above. Although not specifically shown, the mobile device 602 may also interact with an enterprise application store (e.g., StoreFront) for the selection and downloading of applications.

The client agent 604 acts as the UI (user interface) intermediary for Windows apps/desktops hosted in an Enterprise data center, which are accessed using the HDX®/ICA® display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy-driven management capabilities and features such as connectivity and SSO (single sign on) to enterprise resources/services 608. The client agent 604 handles primary user authentication to the enterprise, normally to the access gateway (AG) with SSO to other gateway server components. The client agent 604 obtains management policies from gateway server 606 to control the behavior of the managed applications 610 on the mobile device 602.

The secure IPC links 612 between the native applications 610 and client agent 604 represent a management channel, which allows client agent to supply management policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler® Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the secure IPC channel and obtain the management policy for that application. The application management framework 614 may enforce relevant portions of the management policy that apply locally, such as the client agent login dependencies and some of the containment policies that restrict how local OS services may be used, or how they may interact with the application 610.

The application management framework 614 may use services provided by client agent 604 over the secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by the management policy. First use of vaults 616 may require online authentication, and offline access may be limited to at most the management policy refresh period before online authentication is again required.

Network access to internal resources may occur directly from individual managed applications 610 through access gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The mail and browser managed applications 610 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via an enterprise management policy. For example, an enterprise may want the enterprise application store to be accessed in this manner. In this case, the client agent 604 may require the user to set a custom offline password and the AD password is not used. Gateway server 606 may provide management policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application such as an email application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for the application management framework to mediate HTTPS requests).

Application management framework client certificate support on iOS may rely on importing a PKCS 12 BLOB (Binary Large Object) into the iOS keychain in each managed application for each period of use. application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to AD 622, using an AD password or trusted client certificate, and obtain Kerberos service tickets to respond to HTTP negotiate authentication challenges. The limited support feature relates to constrained delegation in AFEE, where AFEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of the enterprise application store and application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Orchestration Framework for Connected Devices

Aspects described herein allow a collection of devices owned by individuals or groups to be used in a coordinated, collective way, beyond simple screen sharing. This collective coordination of devices can be done on either a memorized (for your own personal devices), or an ad hoc basis (such as when two people use their devices collectively).

For example, consider the GoToMeeting® software application by Citrix Systems, Inc. It exists on laptops, smart phones and tablets. However, each platform does essentially the same thing and the devices do not work in harmony when used by the same user. According to one aspect, a smart phone may take on the role of microphone for a meeting; a tablet may take on the role of displaying video for the meeting, and a laptop may display a screen sharing element of the meeting.

Other examples of cross device coordination include: assigning web links that get clicked on by a laptop to appear on a tablet device, and transferring an already opened PowerPoint presentation from one device to another.

In addition to the ability to assign specific roles to devices while interacting with devices, aspects allow for the persistent assignment of device roles, to allow efficient usage of multiple devices, without extra interaction on the part of the user. For example, in the GoToMeeting® context, this may involve making the smartphone the microphone, the tablet display video, and the laptop display screen sharing immediately when a meeting starts.

In order to address the above problems, and other problems that will become apparent to the reader, aspects described herein harness and orchestrate devices together to allow complex multi device behaviors that make the internet of things come alive to make a big impact on people's daily lives. One problem solved by aspects described herein is to allow user level customization of behaviors that result when many different devices interact with each other. One problem today is that while many devices can interact with each other, the way they interact with each other is hard wired, and not configurable by the users of the system. The range of behaviors is limited, and often limited to devices from similar vendors, who have already established how devices will interact with each other, based on specific, closed use cases.

Using aspects described herein, a user can configure flexible interactions between different devices to allow orchestration of different devices to work together in harmony. This allows devices which are typically unrelated to work together to trigger different behaviors. For example, if a user has a smartphone, a laptop and a tablet, aspects described herein provide the following illustrative use-case solution:

a. If the user is driving in a car and a meeting starts, then they do not want to have to enter meeting join information—they just want the meeting to call them on the telephone using the PSTN, which allows simple integration with the in car steering wheel phone controls.

b. However, if the user is in the office, then they want to use the device they are currently interacting with.

Aspects described herein give the user the choice to customize these actions according to their preferences, utilizing triggers that are provided by devices. Users can customize these actions either by explicitly specifying them, or they can rely on the system observing user behavior and following their preferences.

One known solution to the above recited problems is to manually carry out the orchestration steps between devices to achieve some of the features the software described herein provides, such as manually connecting to a meeting by dialing the PSTN bridge information while in the car, despite the dangers of doing so.

Other features of the software described herein, such as triggers that invoke when a user is not physically present, cannot be achieved at the moment, and the user lives without such features. Limited known previous attempts at this problem involve solutions such as web mashups, including technologies like OnX and IFTTT. However, these technologies are focused on bringing together different web sites and some features of mobile devices. They are not broader technologies that cover the wider range of devices that are part of "the internet of things". Still other known technologies include standards such as X10, DMX and ZWave. However, these are home automation technologies focused on devices and sensors such as light, motion sensors, and motorized control of items in the home.

Figure 7:
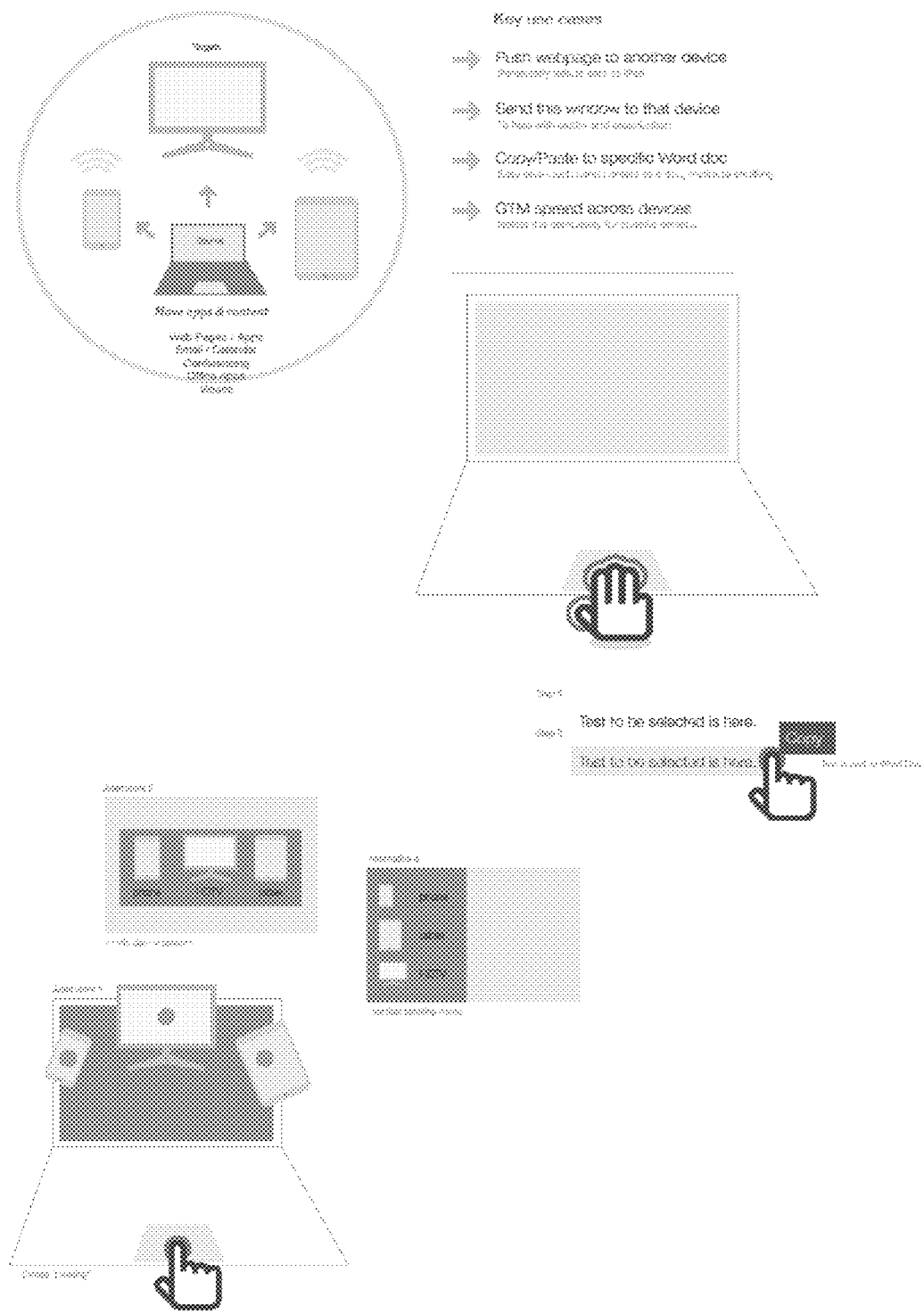
FIG. 7 illustrates multi-device use according to one or more illustrative aspects described herein.

FIG. 7 shows multi-device use according to illustrative aspects described herein. The system of FIG. 7 outlines the way that items are spread across devices, as well as ways that users may trigger cross device interactions. As shown by way of example in FIG. 7, a user may select content at one computing device to share with another computing device. The user may select the content to share and then select one of the other computing devices connected via the orchestration framework. Upon selection of the selected computing device (the destination computing device), the selected content may be transferred to the selected computing device. As seen in FIG. 7, various approaches may be selectively employed to present or display a set of computing devices available for selection as the device to receive the selected content. In one approach, the computing devices available for selection may "peek" in from the edges of the interface as selectable targets of a drag-and-drop action. In another approach the computing devices available for selection may be presented as a set of selectable icons. In a further approach, the computing devices available for selection may be presented as selectable entries in a list of computing devices. Similar approaches may be employed in order to request that a computing device perform at least a portion of a computing activity initiated at another computing device. Moreover, the set of computing devices presented as available for selection may be dynamically generated or configured based on, e.g., the computing devices associated with the computing device, the computing devices associated with a user of the computing device, the computing devices co-located with the computing device, operation modes of the computing device, operation modes of applications at the computing devices, whether the computing devices are capable of presenting the content or performing the computing activity, based on whether the computing devices are permitted to present the content or perform the computing activity, and additional or alternative criteria that will be appreciated with the benefit of this disclosure.

One known solution to the multi-device problem is to manually dedicate specific devices to specific roles, through manual manipulation of software on devices. For example, in the GoToMeeting® context, this can mean making the laptop screen minimize the video part of the meeting, to allow screen sharing to take up the screen, and mirroring this to the room display. It also means manually muting all speakers other than that of the smartphone, which is acting as the microphone. It also means making the tablet maximize the video display of GoToMeeting®. Once after this is done, a single user appears to be connected multiple times in the list of users in a meeting, which provides a sub optimal user experience. For other situations, such as launching an application from one device onto another, there are no existing solutions in place. Thus, existing solutions, to the extent they exist, are laborious, manually driven and error prone.

Figure 8:
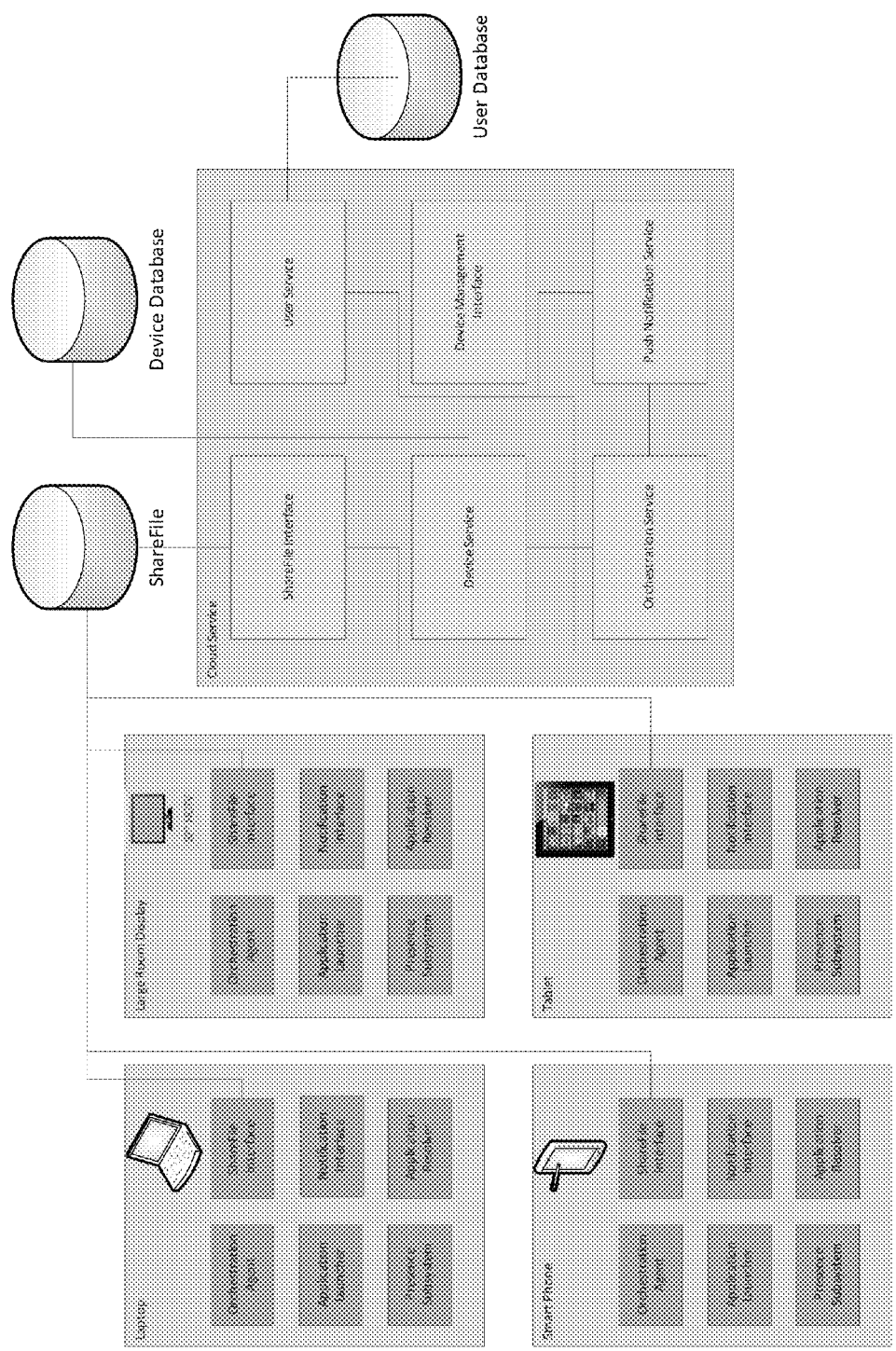
FIG. 8 illustrates a system architecture that may be used according to one or more illustrative aspects described herein.

FIG. 8 shows a system architecture according to one or more illustrative aspects described herein. The system in FIG. 8 shows a cloud service responsible for the server side facilities, and multi-device (MD) software running on client devices responsible for cross device interaction. The MD software on each different kind of client device may be adapted based on the capabilities of that client device. The system of FIG. 8 may include the following: 1) a cloud service, which provides server and the back end services (this can be implemented, e.g., using ASP.NET MVC running in Windows Azure); and 2) different client devices, each representing a different form factor of device. A laptop, smartphone, tablet and large room display are shown in the diagram, but other devices may also be used.

The cloud server components of the system may include:

a. Cloud file interface. This is responsible for communicating with the underlying cloud storage resource. Cloud storage resources may include, e.g., ShareFile®, DropBox, GoogleDocs, Box, etc.

b. Cloud file service. In this example, this is a cloud storage resource, which acts as an external data provider in the context of this disclosure.

c. Device Service. This is responsible for maintaining knowledge of all the devices that a user has, and the capabilities of each device, such as what kind of device it is, what applications it is capable of running, and what kind of peripherals (such as cameras), that it has available.

d. Device Database. This database maintains the information used by the Device Service.

e. User Service. This is responsible for maintaining knowledge of all the users available in the system. It is also used for identity management.

f. User Database. This is the database maintaining the information used by the User Service.

g. Device Management Interface. This is an interface that allows users of the system to define what specific roles or actions occur on what specific devices. It allows the user to customize how their devices behave for specific situations, such as GoToMeeting® or what device will display web content. It defers the work of actually sequencing what goes to what device to the Orchestration Service.

h. Push Notification Service. This is responsible for leveraging push notification frameworks that are used by iOS, Android, Windows, and other services to notify devices that they need to take action.

i. Orchestration Service. This is responsible for coordinating the different actions related to making devices display certain content. It is a central point within the system and issues instructions to all the other components Client components of the system may be the same, regardless of the kind of device. However, implementation details may vary according to the underlying platform. Client components may include:

a. Cloud file Interface. This is responsible for communicating with the cloud storage resource (e.g., ShareFile®, DropBox, GoogleDocs, Box).

b. Application Resolver. This is responsible for determining how to act upon a request to engage in a cross device request. For example, if the user wants to make use of a tablet as a GoToMeeting® video renderer, then the resolver determines that the request involves launching GoToMeeting® in video output mode only.

c. Notification Interface. Handles notifications that are received from the server to engage in cross device behavior.

d. Application Launcher. Launches an appropriate application on the device, after any data that needs to be brought to a device is on the device.

e. Presence Subsystem. Ensures that the cloud service is aware that a device is online and available. It may also transfer location information or NFC related information, which may be used by the server to determine if devices are co-located.

f. Orchestration Agent. This is responsible for orchestrating work items related to a cross device activity so that a user can accomplish their goals with minimal intervention. For example, if a power point presentation is being transferred to this device from another device, the orchestration agent ensures that the presentation is available on the device, and downloads it to the device if needed. The orchestration agent then makes use of the application resolver to determine the appropriate way to launch the application, and then using the application launcher to launch the application.

As an illustrative example of how these components work together to address the above problems, the following describes the flow of execution during a use-case scenario where a user wants to launch a multi device GoToMeeting® (or similar service), and then display web links on another device to that which the link was clicked upon.

Initially, prior to the meeting, the user has MD software client running on his/her laptop. The presence subsystem of the client on the laptop communicates to the device service of the cloud service, to indicate that the device is available. The presence subsystem of the client on the user's smart phone and tablet indicate that the devices are available. At the time of the meeting, the Orchestration Service decides that it is time to start a meeting. The Orchestration Service consults with the Device Service to determine what devices are available for the user. The Device Service makes use of the Device Database to determine what devices a user has and what their status is. The Orchestration Service uses the Push Notification Service to send messages to the active devices that the user has registered with the MD software. The Notification Interface on the clients receive the notification that a meeting is to be launched and passes this onto the Orchestration Agent, which ensures that the user is asked if they want to join the meeting. The Orchestration Agent uses the Application Resolver to determine what application and what parameters are needed to launch the meeting with the given role. This information may be different for each device. For example, the laptop may be given information indicating that just screen sharing is to be used, whereas the tablet may be given information indicating that just the video is to be used. The Orchestration Agent uses the Application Launcher to start GoToMeeting® with the appropriate information. This sequence may occur for each of the user's active devices.

At the end of the meeting, the user then decides to make use of his/her tablet to display web content for links that are clicked on the laptop. The user clicks on a link in a web browser. The web link used is intercepted by the MD software. The MD software sends the link to the Orchestration Service at the cloud service. The Orchestration Service uses the Device Service to determine if the tablet is available. The Orchestration Service sends a request to the Push Notification Service to send a push notification to the tablet device. The Notification Interface on the client receives the request from the cloud service and passes it onto the Orchestration Agent. The Orchestration Agent uses the Application Resolver to determine which application and what parameters are needed to launch the particular web link. In this example, the information passed back is that the internal web browser needs to be used, and the information to pass to the browser. The Orchestration Agent uses the Application Launcher to launch the web browser with the information passed from the other machine.

Using aspects described herein, the MD software overcomes the difficulties involved in effectively using multiple devices together in a complementary fashion. Without the MD software, multiple devices are not able to work together in harmony, in a complementary fashion. Each device can display applications and content, but there is no coherence or ability to orchestrate across multiple devices.

Using the MD software, for example, provides a user/enterprise the ability to associate a person's devices with their identity in a collaboration system. Collaboration systems such as GoToMeeting® do not currently have any particular association for a user's devices, and consequently cannot take advantage of pre-assigned roles for different devices. The MD software also provides for associating devices with a space or group of people. Examples include conference room devices such as smart displays and speakerphones being associated with a space. These assets can then be shared by a group occupying that space (temporary assignment) or be permanently assigned to a logical group of people. The MD software also provides for the ability to move/assign interactions across devices in the form of applications (native, virtual, web, etc.) with associated content and preferences in such a way that it is seamless to spread work across devices. The MD software also provides the ability to scaffold context/state across devices to afford better user experiences. For example, upon launch of a collaboration, the automatic launch of a meeting onto all a user's devices, with each device launching into its specific role. The MD software may also provide the context of a device.

Using the MD software, for example, provides a user/enterprise the ability to associate a person's devices with their identity in a collaboration system. Collaboration systems such as GoToMeeting® do not currently have any particular association for a user's devices, and consequently cannot take advantage of pre-assigned roles for different devices. The MD software also provides for associating devices with a space or group of people. Examples include conference room devices such as smart displays and speakerphones being associated with a space. These assets can then be shared by a group occupying that space (temporary assignment) or be permanently assigned to a logical group of people. The MD software also provides for the ability to move/assign interactions across devices in the form of applications (native, virtual, web, etc.) with associated content and preferences in such a way that it is seamless to spread work across devices. The MD software also provides the ability to scaffold context/ state across devices to afford better user experiences. For example, upon launch of a collaboration, the automatic launch of a meeting onto all a user's devices, with each device launching into its specific role. The MD software may also provide the context of a device (such as location of the phone) to be used as information for another device (such as a tablet). The MD Software also provides the ability to use device assignment/movement to afford device specific roles in a collaboration system. Examples include a smartphone acting as a speakerphone, a tablet acting as an avatar, or any device acting as a camera. The MD software also provides targeted paste, e.g., allowing an application to be a paste target on one of the devices, subsequent copies on any of the associated devices get pasted automatically into the paste target. This cuts the typical copy and paste operation overhead in half. The MD software provides methods and systems to make a natural user interaction (voice, touch, gesture, keyboard, etc.) action on one device that allows all devices to respond. An example is to bring the focus of an app (such as email) to the front on any of the devices.

Use the aspects described herein to simplify the use of multiple devices by reducing manual configuration and coordination. Other aspects provide the ability to share world knowledge/state between devices to enhance the user experience. This reduces redundant entry of information. Some aspects provide the ability to quickly spread activities across devices by reducing the friction caused by applications, data, and context being locked into devices. Other aspects reduce copy/paste efforts in half. Some aspects provide cross device Natural User Interaction (NUI) that allows less capable devices to participate in natural interaction. Other aspects provide the ability to quickly bring an app to the front on any device, no matter what devices the app was on previously. This allows faster movement between applications, e.g., "show email on my tablet".

According to another aspect, additional applications may benefit from use of MD software, e.g., client agent software in virtualization environments. The MD software may enable migrating client agent applications from one device to another device. This may be performed using push driven Smooth Roaming, which is a feature provided by software such as XenDesktop® from Citrix®. Other aspects of MD software may provide for the ability to share the state of web browser sessions across devices. Still other aspects of MD software may provide ad hoc device discovery using technologies such as NFC and using the Orchestration Service and Orchestration Agent to assign roles for the devices. Other examples Bluetooth, wifi direct or even something as simple as playing a human inaudible tone and devices that pick it up can report back and thus must be co-located.

Figure 9A:
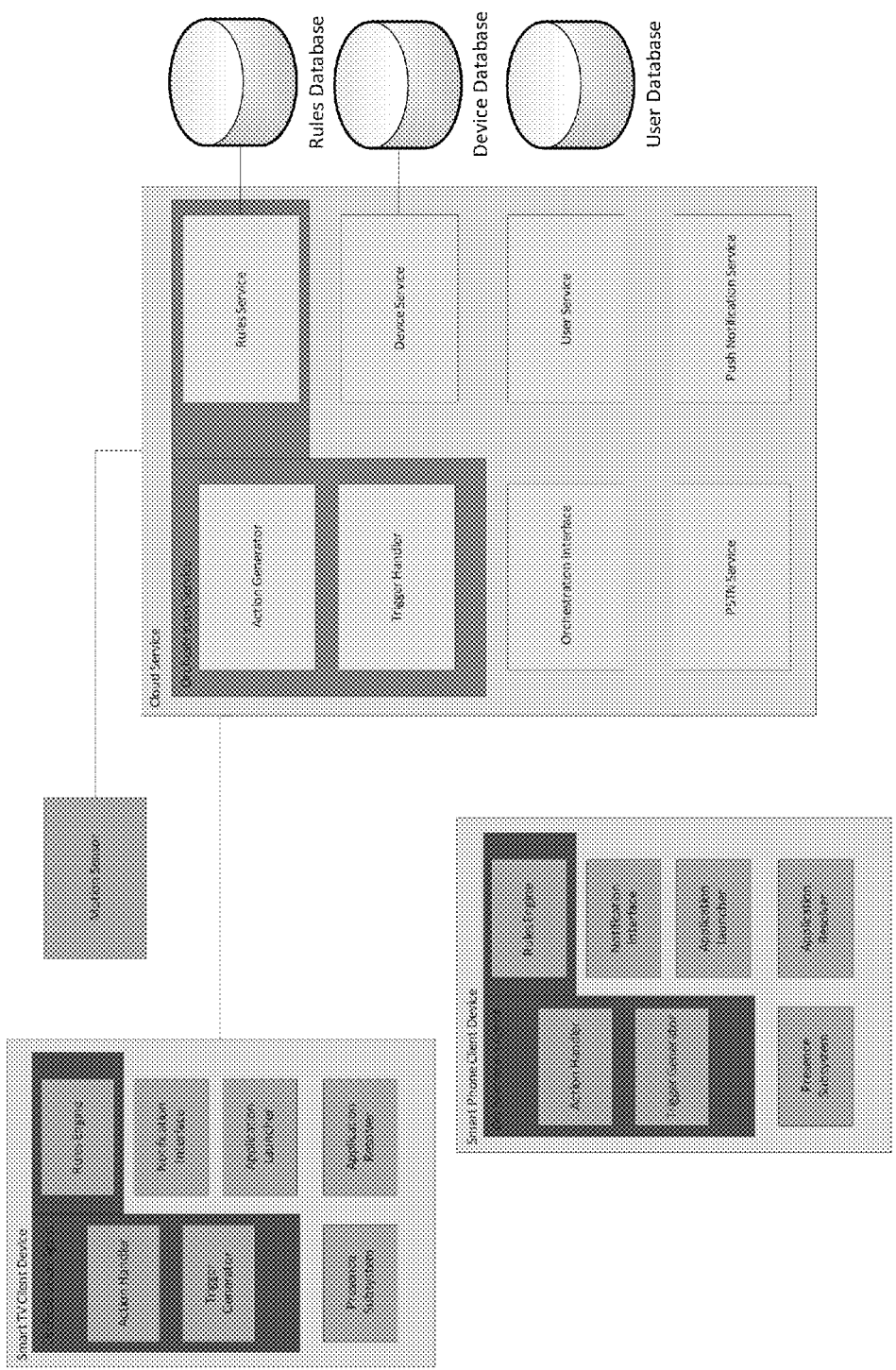
FIG. 9A illustrates a system architecture according to one or more illustrative aspects described herein.

FIG. 9A illustrates a system architecture according to one or more illustrative aspects. FIG. 9A outlines a general structure that may be used. It shows a cloud service responsible for server side facilities and new, dynamic software running on client devices.

The system architecture may include at least three discrete subsystems: 1) a cloud service, which provides the back end services (This may be implemented using ASP.NET MVC running in Windows Azure, as one example); 2) client devices, which run the software the user interacts with for collaboration, deferred work, applications and other software. This software can be running on platforms such as Windows, iOS, Android, Mac or a Smart TV, among others; and 3) internet enabled sensors, such as motion sensors, light sensors, temperature sensors.

Cloud service components of the system include:
 a. Device Service. maintains knowledge of all the devices that a user has, and the capabilities of each device, such as what kind of device it is, what applications it is capable of running, and what kind of peripherals (such as cameras), that it has available.
 b. Device Database. maintains the information used by the Device Service.
 c. User Service. maintains knowledge of all the users available in the system. It is needed for identity management.
 d. User Database. maintains all the information used by the User Service.
 e. PSTN Interface. interface that proactively contacts users via the public switched telephone network (PSTN).
 f. Push Notification Service. leverages push notification frameworks that are used by iOS, Android and Windows (among others) to notify devices that they need to take action.
 g. Orchestration Service. coordinates different actions based on different events, or triggers that happen. The Orchestration Service may include the following components:
  1. Trigger Handler. receives input from different external sources, such as sensors and clients about when specific events occur that can act as a trigger for different actions to occur.
  2. Rules Service. determines what actions to carry out when a particular event, or trigger, occurs. The Rules Service is the core of the system that determines what to do when something occurs.
  3. Action Generator. translates the sequence of actions that need to occur based on what the resultant actions generated from the Rules Service are for a given trigger.
 h. Rules Database. Maintains information used by the Orchestration Service and Rules Service which determines how the software behaves based on different triggers.
 i. Orchestration Interface. Provides an interface for users of the system to customize the behavior of the system for different devices, events and triggers. It is through this interface that the users customize the system.

The client components of the system may be the same, regardless of the kind of device. However, the implementation details may vary according to the underlying platform. Client components may include:
 a. Application Resolver. This is responsible for determining how to act upon a request that involves launching an application. For example, if the user wants to launch Google maps on their tablet when they enter a car, the Application Resolver determines how to launch Google Maps—be it a web application, native application, or client agent published application.
 b. Notification Interface. Handles notifications that are received from the server based on information from the server side.
 c. Application Launcher. Launches an appropriate application on the device.
 d. Presence Subsystem. Ensures that the cloud service is aware that a device is online and available.
 e. Orchestration Agent. Orchestrates the work items related to making deferred and distributed work possible. This includes tasks such as starting meetings in response to events from the server, triggering authentication and general coordination of the client. The Orchestration Agent may include the following components:

1. Trigger Handler. Receives input from different external sources, such as sensors and clients about when specific events occur that can act as a trigger for different actions to occur.
2. Rules Engine. Determines what actions to carry out when a particular event, or trigger, occurs. The Rules Service is the core of the system that determines what to do when something occurs.
3. Action Generator. Translates the sequence of actions that need to occur based on what the resultant actions generated from the Rules Engine are for a given trigger.

To illustrate how these components work together to address the problems the software addresses, the following example use-case scenario shows how a user would set rules to ensure that if they are driving in a car when a meeting starts, that the system should call the user on the PSTN to let them join the meeting.

Initially, the user points their web browser to the Orchestration Interface. The user enters a rule with the following definition:

a. A trigger set to "If a meeting starts".
b. Contextual conditions set to "The motion sensor or GPS in my smart phone indicates that I am moving at a speed greater than 5 km/h".
c. An action set to "Call a specified telephone number and patch me into the meeting automatically."

The rule entered into the Orchestration Interface is sent to the Rules Service, which writes the information to the Rules Database. At this point, the rules are all set up on the server. The Rules Service instructs the Device Service to send each device a message with the new rules. The Presence Subsystem on the client device communicates with the Device Service to indicate that the device is present. The client receives a response back indicating that it needs to update its rules. The Rules Engine on the client requests the latest set of rules that apply to the device from the Rules Service. The Rules Service provides the information back to the client, which stores the information in its internal Rules Engine configuration. Now that the client knows about the rules specified by the user, it can send information about the state of this rule to the server. So, in this case:

a. The Trigger Generator on the client receives a message each time the Presence Subsystem intends to notify the server about its status.
b. The Rules Engine on the client determines that information about the device's motion/speed needs to be sent back to the server.
c. The Rules Engine uses the Action Handler on the client to append information to the data sent back to the server by the Presence Subsystem.

The Device Service on the server side receives the message about the device's presence, and the rule information from the client, which it passes on to the Trigger Handler, which passes it onto the Rules Service. The Rules Service updates its information about the state of the device, relative to the rule relating to meeting starting and motion sensor speed. When a meeting is due to start, the Trigger Handler receives a message from an external service monitoring the user's calendar. The Trigger Handler passes the message about the start of the meeting to the Rules Service. The Rules Service consults the rules database and determines that there is a rule triggered by the start of a meeting. The Rules Service consults the rules database for further information about how the contextual condition for the rule relates to the state of the client device. The status received last from the client indicates that the device is moving and the contextual condition for the rule evaluates to true, namely, carry out the action of the rule.

The Rules Service passes on the result of the rule evaluation to the Action Generator. In this case, it passes on an action of calling the user on a specified telephone number. The Action Generator creates the sequence of instructions needed to call the telephone. The Action Generator issues a request to the PSTN Service to make a telephone call to the specified telephone number. The PSTN Service calls the requested telephone number, and connects to the user's telephone. The Action Generator issues a request to the PSTN Service to dial the appropriate instructions to patch the user into the meeting they are due to attend. At this point, the user is connected into the meeting while they are driving, without having to take their eyes off the road, or enter complex sequences into their smart phone.

The software and systems described herein overcome the difficulties that arise when users have several devices that can work together to automate tasks, yet are not configured out of the box to allow such orchestration, or do not allow flexibility of orchestration. Aspects described herein thus provide the ability to define inferred contextual (temporal, geospatial, situational) and explicit (from all forms of natural interaction across devices) triggers from a variety of devices. Aspects also provide the ability to define actions for devices to perform based upon triggers determined from device context, and for the definition of rules that can be fired based on an inference engine to enable complex automation behaviors across devices. Aspects also provide a question and answer interface to refine desired behaviors, as well as the ability to learn how device behavior triggers based on learning or observing user behavior across devices, instead of only relying on users explicitly scripting the behavior. For example, learning what a user does when they respond to something like a meeting notification, and replicating this behavior the next time, such as automatically muting their microphone, or setting it to a particular volume. Aspects also provide the ability to learn device behavior based upon a question and answer or if/then/else style interface.

While there are existing rules engines and automation frameworks available, they are typically related to one particular application or device. Aspects of the approaches described in this disclosure span across multiple devices and applications that a user has. This provides several advantages, including providing the ability to provide future proof behaviors of devices working together collectively, even if they are not explicitly designed to cooperate with each other. Aspects described herein also provide the ability to define simple triggers, actions, and behavior rules to give a level of flexibility not available out of the box in other solutions. Aspects also provide the ability to learn system behaviors based upon question and answer style interfaces, and/or by observing how a user uses the system can make customization accessible to users without any programming background.

Other aspects described herein provide the ability for users to customize orchestration by providing a learning facility, a question and answer style interface and a traditional scripting approach. The orchestration software may adapt to how users interact with the system, and adjust rules based on user behavior. Thus, the system may learn new interactions and rules, based upon the observed behavior of a user of the system.

As noted above, the cloud service may be utilized for sharing various types of content at a computing device, e.g., for cross-device file sharing, URL sharing, and copy-and-paste functionality. The back-end cloud service advantageously allows cross-device sharing across different operating environments using only a multi-device client installed at the various devices. The content shared across devices may be anything residing at a device including, e.g., document files, image files, audio files, video files, archive files, software applications, URLs, text-based content, presentation meetings, and the like. Moreover, users may share content with devices they are associated with (e.g., a personal mobile telephone, a personal laptop computer, a personal tablet computer, etc.) and may share content with devices associated with other individuals.

In some example implementations, a user may select the particular device selected content it is shared with. In other example implementations, the cloud service may automatically determine which device to share the content with. The cloud service may make the determination based on, e.g., the type of content shared, the devices presently connected to the cloud service, and so forth. This context-based decision-making of the cloud service advantageously provides a seamless and unobtrusive workflow for the users. Allowing users to select which devices content is shared with, however, advantageously gives the users more control over the destination of their shared content. It will thus be appreciated that the cloud service may be selectively configured to share content between devices according to the selections of the users, according to the present context, according to file sharing rule sets, or a combination of such.

Figure 9B:
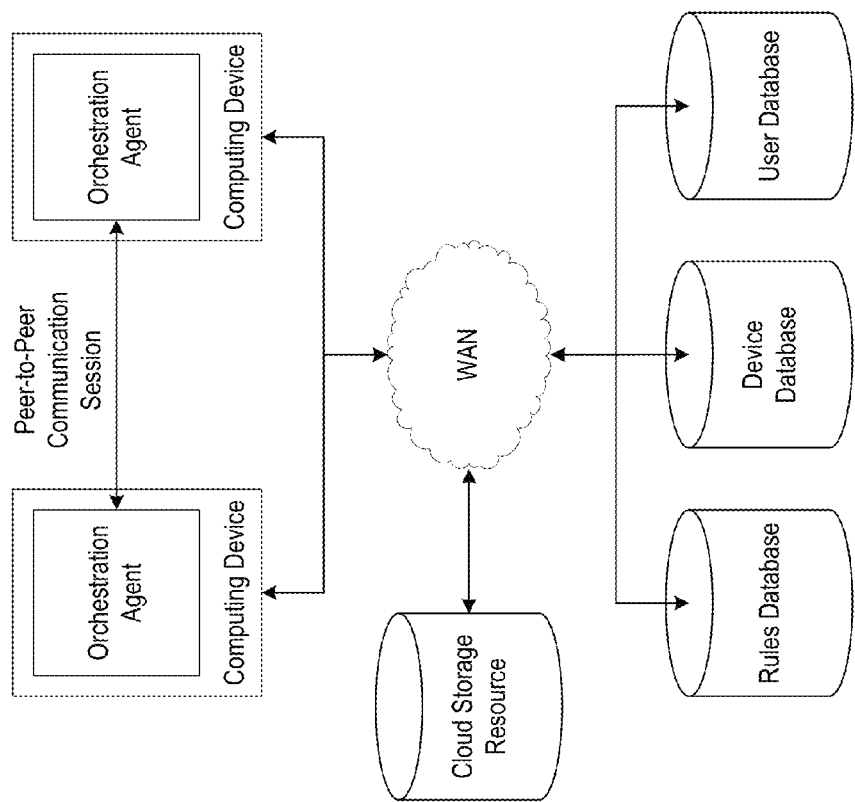
FIG. 9B illustrates a system architecture according to one or more additional illustrative aspects described herein.

As noted above, the orchestration framework may also interconnect computing devices to operate as a coordinated whole via a peer-to-peer communication session. FIG. 9B illustrates an example implementation in which the orchestration agents are interconnected via a peer-to-peer communication session. The orchestration agents may still allow the computing devices to access, e.g., a cloud storage resource, a rules database, a device database, and a user database as described above. It will be appreciated that aspects of the orchestration framework are applicable in the peer-to-peer context as well as the client-server context.

A word processing application (e.g., Microsoft Word) is one example of an application where the orchestration framework may distribute operation of the application across multiple interconnected devices. In this example, a desktop computing device may initiate the word processing application and request that a television display device present the output from the application, e.g., a document being edited. The orchestration framework may distribute the application across other interconnected computing devices such that input for the word processing application may be received from the other computing devices interconnected with the desktop application. For example, a user at a laptop device may provide input at the laptop keyboard in order to edit the document, and another user at a tablet device may provide input at the touchscreen keyboard in order to edit the document. In this way, a user may share a document with other devices while accessing the document at a first device.

In another example, interconnected devices may coordinate with each other if one of the devices does not have the hardware or software needed to carry out a computing activity. Online meetings are provided in this disclosure as one example in which computing devices may be interconnected via an orchestration framework that coordinates operation of a computing activity across the computing devices. In one particular example, a user may only have access to a cellular telephone and a television display device when joining the meeting. In this example, the television display device may not have an audio input device, and the cellular telephone may not have an adequate video output device. Accordingly, the orchestration framework may coordinate the operation of the cellular telephone and the television display device to enable the user to join the online meeting. Respective orchestration agents at the cellular telephone device and the television display device may connect the devices via the orchestration framework as shown by way of example in FIG. 9B. During the online meeting, the orchestration framework may thus cause video of the online meeting to be presented at the television display device and cause audio from the user to be received for the online meeting from the microphone of the cellular telephone device. Additional and alternative examples will be appreciated.

Figure 10:
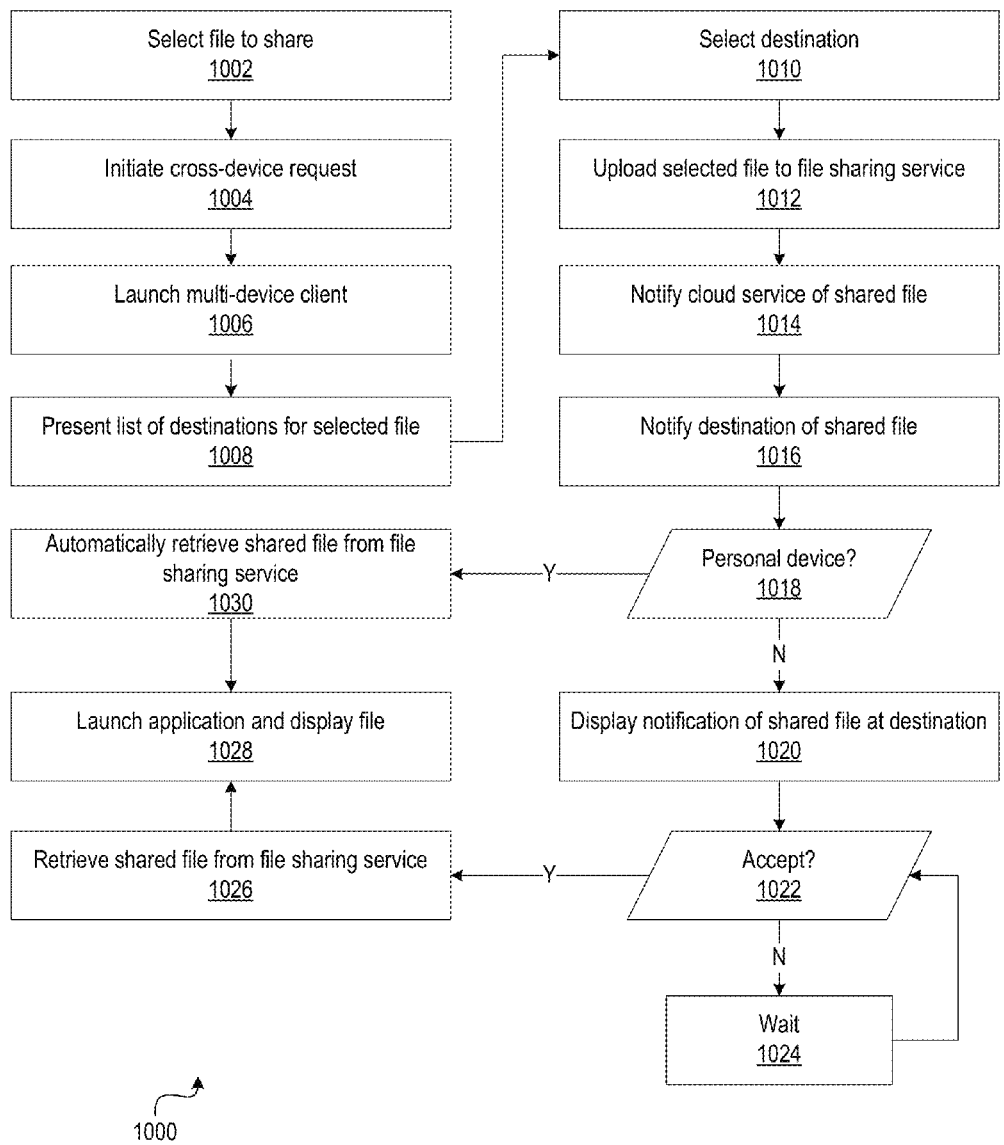
FIG. 10 is a flowchart of example method steps for cross-device file sharing.

FIG. 10 is a flowchart 1000 of example method steps for cross-device file sharing. A user may operate a computing device at which various computer files reside. The user may select one of the files to share with another device (block 1002). With the file selected, the user may initiate a cross-device share request (block 1004). The user may initiate the cross-device share request via, e.g., a keyboard shortcut, menu selection, and the like. Upon initiation of the cross-device share request, the multi-device client may launch or activate at the device (block 1006).

The multi-device client may present a list of destinations the user may transmit the selected file to (block 1008). The list of destinations may include line items corresponding to computing devices associated with the user as well as line items corresponding to individuals. As noted above, the user may select a personal device associated with that user or an individual to transmit the selected file to. As also noted above, the list of line items may include the devices associated with the listed individuals, and the user may select which device associated with an individual to transmit the selected file to. If the user selects an individual rather than a device, the cloud service may automatically determine which device associated with the selected individual to transmit the selected file to. It will be appreciated that the list of individuals may also include the user, and selection of the user may transmit the selected file to a different device associated with the user.

As noted above, the determination of which device to transmit the selected file to may be based on user selection, context, or rule sets. The user may manually select which device or individual to transmit the selected file to. Additionally or alternatively, the cloud service may determine which devices are presently connected to the cloud service, and automatically select one of those devices to receive the selected file. The cloud service may also automatically select a device based on the type of file selected. As an example, the cloud service may select an audio device to receive the selected file when the file is an audio file. As another example, the cloud service may automatically select a large display device to receive the selected file when the file is a video file. The cloud service may also employ one or more rule sets to determine which device should receive the selected file. Users may modify the rule sets according to their preferences, and the rules may consider various characteristics associated with the users (e.g., user role, location, etc.), the devices (e.g., device type, etc.), the selected file, and combinations of such. This rule-based approach to file sharing may advantageously provide greater flexibility in customizing how the cloud service automatically shares files across devices.

Moreover, the list of destinations may be context-sensitive such that the destinations included in the list depend on various factors. In one example implementation, the multi-device client may dynamically filter the list of destinations based on the capabilities of the potential device destinations. In this regard, the multi-device client may be aware of the capabilities of the various devices. The cloud service may maintain capability information corresponding to each device connected to the cloud service and provide this capability information to the multi-device client. In turn, the multi-device client may utilize the capability information when constructing the list of destinations. If a potential device destination is not capable of opening the selected file, then the multi-device client may exclude that device destination from the list of destinations. In this way, the multi-device client may tailor the list of destinations to include only those devices having the capability to open the selected file. The multi-device client may tailor the list of destinations based on additional or alternative criteria. For example, the individuals included in the list of destinations may be the attendees of an ongoing meeting that the user is attending. It will be appreciated that the multi-device client may employ combinations of criteria to construct the list of destinations.

Referring back to FIG. 10, the user may select from the list of destinations a destination to transmit the selected file to (block 1010). Having selected the destination, the multi-device client may upload the selected file to a remote file sharing service that stores the selected file (block 1012). The multi-device client may then notify the cloud service that the selected file is available at the file sharing service (block 1014). The notification to the cloud service may include, for example, the selected destination for the file, the location of the file at the file sharing service (e.g., a URL corresponding to the file), and the like. The cloud service may then notify the destination device that the file is available at the file sharing service (block 1016). The notification to the destination device may likewise include the location of the file at the file sharing service.

The multi-device client at the destination device may respond differently depending on whether the user shared the file with a device associated with that user (e.g., another personal device) or a device associated with another individual. For example, a sender may be notified when a recipient has modified a file shared via the orchestration framework, e.g. where two users are collaborating across time and space. A sender may, in some instances, push a file for sharing purposes and not care if it is ever modified. The sender may, in other instances, share a file for collaborating purposes and does not care of being notified when the file changes. In particular, the multi-device client may present an unobtrusive notification at the mobile device when another user shares a file. In this way, the multi-device client may avoid interrupting users while engaging in other computing activities. As seen in FIG. 10, if the destination device is not a personal device of the user that shared the file (block 1018: N), then the multi-device client at the destination device may display a notification that a new filed has been shared with the destination device (block 1020). Upon receipt of the notification of the shared file, the multi-device client may provide the recipient with the option to accept or reject the shared file. If the recipient does not accept the shared file (block 1022: N), then the multi-device client may wait (block 1024) until the recipient accepts the shared file, e.g., by providing input requesting receipt of the shared file. When the recipient accepts the shared file (block 1022: Y), the multi-device client may retrieve the file from the file sharing service (block 1026). The file sharing service may be located remotely relative to the device the multi-device client resides at, and may be accessible, e.g., via the Internet. Accordingly, the multi-device client may submit a request to the file sharing service using the URL corresponding to the location of the shared file at the file sharing service. The multi-device client may download the file from the file sharing service and launch the appropriate application at the destination device to open the file (block 1028).

In some example implementations, the multi-device client may be configured to automatically respond to a file share. Accordingly, if the destination device is a personal device of the user that shared the file (block 1018: Y), then the multi-device client may automatically retrieve the shared file from the file sharing service (block 1030) upon notification of the shared file. When the multi-device client receives the shared file from the file sharing service, the multi-device client may also automatically launch the appropriate application at the destination device to open the shared file.

It will be appreciated that the example approach described above provides a quick and efficient way to share, e.g., email attachments. Instead of forwarding or creating new emails to share email attachments, users may share email attachments using the cloud service which streamlines the sharing process. The example approach described above also provides a quick and efficient way to share online presentations or meetings with other devices or individuals. Instead of having users launch and log on to join an existing meeting, a user may share the meeting information and details with another individual using the cloud service, and that meeting may automatically launch at a device utilized by the individual. Similarly, the cloud service allows an attendee to transfer an ongoing meeting presented at one device to another device associated with the attendee. As an example, an individual may attended an online meeting using a desktop computing device. If the individual needs to leave the desktop device for any reason, the individual may use the cloud service to transfer the meeting to a mobile device such as a tablet computing device or mobile phone device. In this way, users are not tied to any particular device when attending an online meeting and may advantageously jump between devices while attending the meeting.

Figure 11:
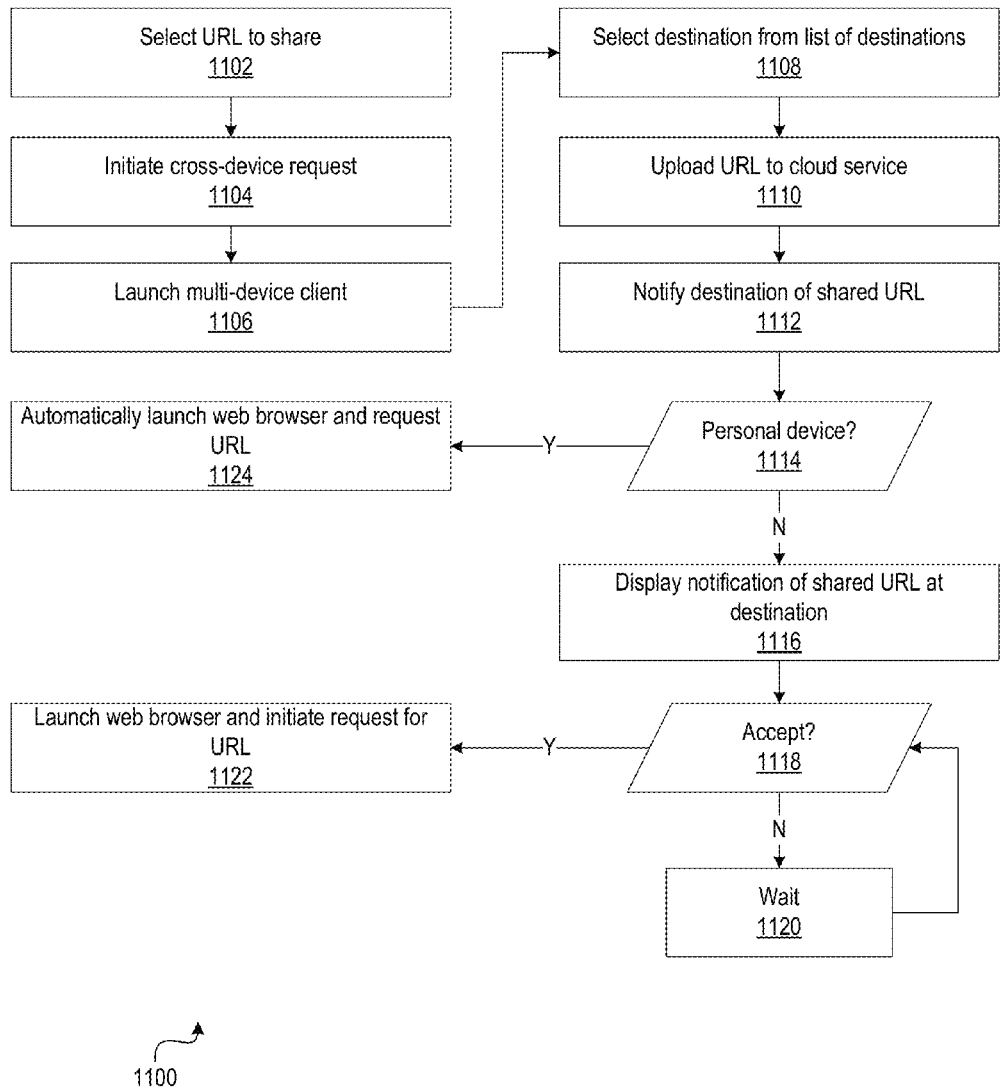
FIG. 11 is a flowchart of example method steps for cross-device URL sharing.

FIG. 11 is a flowchart 1100 of example method steps for cross-device URL sharing. Similar to selecting a file to share, a user may select a URL to share (block 1102), e.g., by highlighting the URL. The user may then initiate a cross-device request as described above (block 1104) and launch the multi-device client (block 1106). The user may select a destination from a list of destinations (block 1108), e.g., another device or an individual. With the destination selected, the multi-device client may upload the URL to the cloud service (block 1110). The cloud service may similarly notify the destination device of the shared URL (block 1112). The notification may include the shared URL.

As with sharing files, the multi-device client at the destination device may respond differently depending on whether the destination device is associated with the user that shared the URL or another individual. As noted above, if the destination device is not a personal device of the user that shared the URL (block 1114: N), then the multi-device client may display a notification indicating the shared URL (block 1116) so as to avoid any interruptions of other computing activities occurring at the destination device. If the individual does not accept the shared URL (block 1118: N), then the multi-device client may wait (block 1120) until input is received indicating acceptance of the shared URL. When the recipient accepts the shared URL (block 1118: Y), the multi-device client may initiate launching of a web browser at the destination device as well as a request for the shared URL (block 1122). If the user shares the URL another personal device (block 1114: Y), then the multi-device client at the destination device may automatically initiate launching of a web browser and request the shared URL (block 1124).

The cloud service may be configured to share URLs in a context-sensitive manner. In particular, the cloud service may recognize URLs for different types of online resources, e.g., a text-based webpage and a video sharing webpage. Accordingly, the cloud service may automatically select a destination device based on the URL type. As an example, the cloud service may recognize that the URL addresses a video sharing website and, in response, select a large display device to share the URL with. In this way, the cloud service may advantageously share the URL with the device suitable for presenting the content addressed by the URL. As another example, the cloud service may recognize that the URL addresses a text-based website and, in response, select a tablet device or desktop device to share the URL with. The cloud service may also employ rule sets to determine which device to share the URL with. For example, a URL sharing rule set may list various websites and the devices or types of devices the cloud service should select when sharing URLs associated with those websites. Users may configure the rule sets according to their preferences in order to customize the behavior of the cloud sharing service when sharing URLs. The rule sets may be associated with individual users for use when those users share the URL, and additionally or alternatively, the cloud service may maintain a global rule set applicable to all users.

FIG. 12 is a flowchart 1200 of example method steps for cross-device copy-and-paste functionality. Stated generally, a user may select content at one device and copy the content to a clipboard at the cloud service from which other users may paste the content at their own devices. A user may first select the content to share (block 1202), e.g., by highlighting text or otherwise selecting the content. The user may then initiate a cross-device request as described above (block 1204), and the multi-device client may launch or otherwise activate (block 1206). The multi-device client may then upload the content to a global clipboard of the cloud service (block 1208). The global clipboard corresponds to a storage location at the cloud service accessible to at least some of the devices connected to the cloud service.

When a user copies content to the global clipboard, the cloud service notifies one or more of the devices connected to the cloud service that new clipboard content is available (block 1210). Users may utilize the multi-device client to paste the global clipboard content at their respective devices. The multi-device client may transmit a request to the cloud service for the global clipboard content. When the cloud service receives the request (block 1212), the cloud service may download the global clipboard content to the device (block 1214). Having received the global clipboard content from the cloud service, the user may paste the content into an application at the device (block 1216).

As set forth above, a device may not have the capability to open a file shared with that device. For example, the application used to open the shared file may not be installed at the destination device. Nevertheless, the cloud service and multi-device client may be configured handle situations where a destination device does not have the capability to open a shared file. As described in more detail below, the cloud service may automatically launch a virtual environment that has the capability to open the shared file, and the multi-device client may launch a virtualization client to connect to the virtual environment when a destination device is not capable of opening a shared file.

FIG. 13 is a flowchart 1300 of example method steps for launching a shared file at a destination device. The cloud service may receive notification of a shared file (block 1302) as discussed above. The cloud service may then determine whether the destination device is capable of opening the shared file (block 1304). As noted above, the cloud service may store device capability information and may thus be aware of the capabilities of the devices connected to the cloud service. Devices may provide the cloud service with their respective capability information during the negotiation process when connecting to the cloud service. If the destination device is capable of opening the shared file (block 1306: Y), the device then downloads the file from the cloud storage service, and then the device may launch the appropriate application to open the shared file, e.g., automatically or in response to receipt of input accepting the shared file as discussed above.

If the destination device is not capable of opening the shared file (block 1306: N), then the cloud service may initiate creation of a virtual environment (block 1310). The cloud service itself may create and maintain the virtual environment locally or, additionally or alternatively, a virtualization server that is located remotely relative to the cloud service may create and maintain the virtual environment. The virtual environment may be configured with the capability to open the shared file (block 1312). As an example, the virtual environment may be configured to include the application used to open the shared file. The virtual environment may also be provided with the shared file (block 1314). As an example, the cloud service may provide the virtual environment with the location of the shared file at the file sharing service, and a multi-device client at the virtual environment may retrieve the file from the file sharing service. In this regard, the virtual environment may also be considered as a destination for the shared file.

Once the virtual environment retrieves the shared file from the file sharing service, the virtual environment may launch a virtualized application to open the shared file (block 1316). The multi-device client at the destination device may launch a virtualization client (block 1318), and the virtualization client may connect to the virtual environment (block 1320). In this way, users may advantageously share files across devices that may not be equipped to open those files. A more particular example may include a 3D formatted computer file that can only be opened using 3D modeling software. A mobile phone may not be equipped with the necessary software to open the 3D file. Using the cloud service and the virtualization approach described above, a virtual environment may launch a virtualized instance of the 3D modeling software, and the virtualization client at the mobile phone may connect to the virtual environment to access 3D files shared with the mobile phone device. Other practical uses will be appreciated with the benefit of this disclosure.

Applications and Devices Having Multiple Operation Modes

An improved technique for managing enterprise applications on mobile devices allows users to access enterprise applications from their own mobile devices, where the enterprise applications securely coexist with the users' own personal applications and data. Enterprise mobile applications are specially created or adapted in such a way that they are forced to interact with other applications and services on a mobile device through respective application management policies. Each enterprise mobile application running on the mobile device has an associated management policy through which it interacts with its environment. The management policy selectively blocks or allows activities involving the enterprise application in accordance with rules established by the enterprise. Together, the enterprise applications running on the mobile device form a set of managed applications. The management policy associated with each of the managed applications includes a record of each of the other managed applications. Typically, policy settings for interacting with managed applications are different from policy settings for interacting with other applications, i.e., applications which are not part of the managed set, such as a user's personal mobile applications. Managed applications are typically allowed to exchange data with other managed applications, but are blocked from exchanging data with other applications, such as the user's own personal applications. In some examples, application management policies of managed applications are configured to allow links and/or icons presented in one managed application to be followed or opened in another application only if the other application is also a managed application.

For example, a managed email application can be configured, through its management policy, to allow an attachment to be opened in a managed PDF annotator. But the same managed email application can be configured to prevent the same attachment from being opened in a PDF annotator that is not part of the managed set.

By constraining managed applications to interact on a mobile device through enterprise-administered management policies, the managed set of applications can thus be made to operate with other applications in the managed set of applications, but can be prevented from operating with applications that are not part of the managed set. Leakage of enterprise information out of the managed set of applications can thus be prevented, as can be receipt of personal information into the managed set of applications. Certain embodiments are directed to a method of managing applications of an enterprise on a mobile device. The method includes installing a set of managed applications of the enterprise on the mobile device, wherein other applications are installed on the mobile device that are not part of the set of managed applications. The method further includes receiving a set of application management policies, wherein each of the set of managed applications is associated with a respective management policy of the set of application management policies. The method still further includes selectively allowing a first application of the set of managed applications to provide data to a second application installed on the mobile device, responsive to accessing a management policy of the first application and reading an indication from the management policy of the first application that the second application is a member of the set of managed applications, and selectively blocking the first application from providing data to a third application installed on the mobile device, responsive to accessing the management policy of the first application and failing to read an indication from the management policy of the first application that the third application is a member of the set of managed applications.

An improved technique for managing enterprise applications on mobile devices allows users to access enterprise applications from their own mobile devices, where the enterprise applications securely coexist with the users' own personal applications and data.

Figure 14:
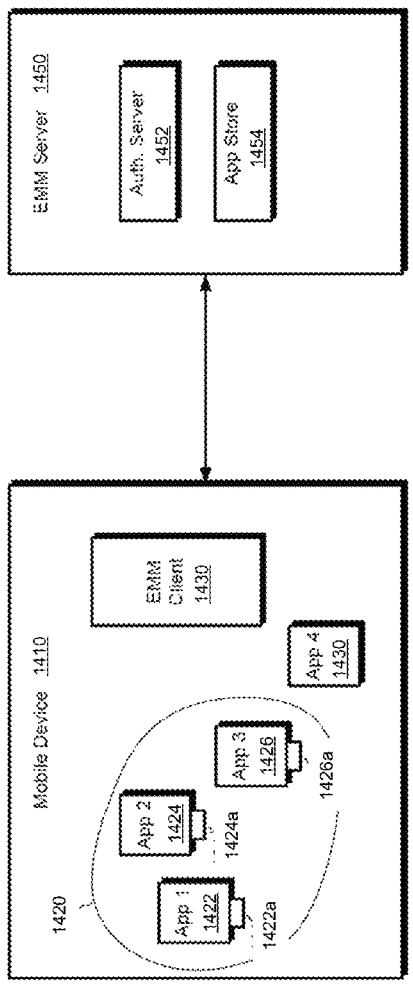
FIG. 14 is a block diagram of an example environment in which embodiments hereof can be practiced.

Secure data sharing is accomplished by creating a managed set of applications that can share files and/or data with one another, but are selectively prohibited from sharing files and/or data with applications that are not part of the managed set. Thus, two objectives are achieved: (1) data are prevented from leaking out of the managed set and (2) data are allowed to be shared among the applications within the managed set. FIG. 14 shows an example environment in which embodiments hereof can be practiced. Here, a mobile device 1410, such as a smartphone, tablet, PDA, and the like, has installed upon it various mobile applications. The mobile applications include a set 1420 of managed applications 1422, 1424, and 1426, and a personal application 1430. In some examples, an enterprise mobility management (EMM) client 1440 is also installed on the mobile device 1410. The EMM client 1440 is configured to connect, e.g., via a network such as the Internet, with an EMM server 1450, which typically includes an authentication server 1452 and an application store 1454. An example of the EMM client 1440 is a client agent available from Citrix. An example of the EMM server 1450 is a gateway server that provides access to enterprise resources and/or cloud resources. Each application in the set 1420 of managed applications is associated with a respective management policy. For example, application 1422 is associated with a management policy 1422a, application 1424 is associated with a management policy 1424a, and application 1426 is associated with a management policy 1426a. In some examples, the management policies 1422a, 1424a, and 1426a are provided in the form of files, such as XML or JSON files, in which the respective management policy is expressed as a set of key/value pairs. In an example, each management policy 1422a, 1424a, and 1426a includes a record of all applications within the set 1420 of managed applications. Each of the set 1420 of managed applications is specially designed or adapted for use with the enterprise. Some of the set 1420 of managed applications may be designed specifically for the enterprise. Others of the set 1420 of managed applications are more widely used applications (e.g., available to the public) that have been specifically adapted for use with the enterprise. Each of the set 1420 of applications includes injected code that enables the application to conform to a framework of the enterprise. The injected code can be compiled into the application using an SDK. Alternatively, the injected code can be applied as a wrapper around a general-use application, to adapt it for use with the enterprise. In general, the injected code serves to divert API calls from the application to its associated management policy, such that the management policy can selectively allow or block activities specified by the API calls.

In typical operation, a user of the mobile device 1410 starts the EMM client 1440, logs on to the EMM server 1450 via the authentication server 1452, and accesses the application store 1454. The user can then peruse enterprise applications available from the application store 1454, select desired applications, and download them to the mobile device 1410, where the downloaded applications are included in the set 1420 of managed applications. For each application downloaded, a corresponding management policy is also downloaded to the mobile device, and the management policies of all applications in the set 1420 are updated to reflect all members of the set 1420. In an example, management policies (e.g., 1422a, 1424a, and 1426a) are refreshed periodically and/or in response to particular events, such as each time the respective application is started and/or each time the user logs onto the EMM server 1450. Management policies can thus be adapted over time and dynamically transferred to the mobile device 1410 from the EMM server 1450.

Depending on settings of the management policies 1422, 1424, and 1426, applications within the set 1420 of managed applications can be constrained to exchange files and/or data only with other applications within the set 1420. For example, API calls from the application 1422 are intercepted by the injected code of the application 1422. The management policy 1422a is read, and the operation specified by the API call is either blocked or allowed depending on the settings in the management policy 1422a. Because the management policy 1422a has a record of all applications in the set 1420 of managed applications, the application 1422, by reading the management policy 1422a, can test whether the requested operation of the API call involves an application inside or outside the set 1420, and allow or block activity accordingly. Thus, based on management policy settings, movement of data can be restricted such that data within the set 1420 of managed applications is not commingled with data outside the managed set (e.g., with application 1430).

In some examples, applications in the set 1420 of managed applications on the mobile device 1410 can be assigned to different groups. In such cases, management policies (e.g., 1422a, 1424a, and 1426a) are updated to include records of groups and group members. The flow of files and/or data between applications can thus be further restricted to members of particular groups. Providing different groups of mobile applications within the managed set 1420 can help to segregate applications handling highly sensitive data from those that handle less sensitive data.

It is understood that the above-described process of intercepting an API call, consulting an application's management policy, and allowing or blocking the operation specified by the API call based on the management policy can be carried out in a number of contexts. In one example, the above process can be applied for selecting a set of applications on the mobile device 1410 that can be used to open a file or data element identified by a link or icon (e.g., using Open In). In another example, the above process can be applied for copying data or data objects from one application and pasting the data or data objects in another application (e.g., via a hidden, encrypted paste buffer). In yet another example, the above process can be applied for moving files into and/or out of a protected file vault. Essentially, any operation used to move data into and/or out of an application can make use of the above technique.

It is further understood that this techniques can apply not only to movement of data to other applications, but also to recording, pictures, printing, playback of audio, and other functions.

Operating system extensions may be obtained for the mobile device 1410. One such operating system extension responds to a user pointing to a link or icon representing a data object, such as a file, by displaying a list of applications on the mobile device 1410 that are capable of opening that data object. An example of such an operating system extension is "Open In," which is available on iOS devices. Similar extensions are available for Android and Windows 8 devices.

In an example, applications within the set 1420 of managed applications support the use of Open In, but the list of applications displayed for opening a selected data object is limited based on the management policies of the respective applications. For example, the list of applications displayed when Open In is invoked from the application 1422 can be limited, in accordance with the management policy 1422a, only to other applications in the managed set 1420. Thus, in this example, Open In lists only applications that are both (1) within the managed set 1420 and (2) compatible with the data object. On mobile operating systems, such as iOS, Android, and Windows 8, each application runs in its own sandbox. These apps use a very high level content sharing mechanism like Open In in iOS, Intents/activities in Android and Charms in Windows8. On a BYOD (bring your own device) mobile device, it will have a mix of managed and un-managed/personal applications running on the device. Here, we focus on how to enable data sharing among the managed set of applications.

On modern mobile operating systems like iOS, the file system is not really exposed to the end user by design to hide complexity. The focus is rather on the applications and the data they handle.

There are many ways data can move in and out of the device. Primary examples include email, cloud storage resources (e.g., ShareFile®, DropBox, GoogleDocs, Box), browsers, etc. Then the data needs to be moved among the managed applications to get actual work done.

A method and system for operating an application with multiple modes are described. A plurality of applications may be presented to a user on a mobile device and one of the displayed applications may be selected. The selected application may have one or more contexts that are determined. For example, a context for the selected application may be that the application is configured to access an enterprise account. Based on the context, the selected application may be run on the mobile device in one of a plurality of operations modes. The operation modes may comprise managed, unmanaged, and partially managed modes.

In an embodiment, the context for the selected application may comprise an account to be accessed by the selected application, a location for the mobile device that will be running the selected application, a determination as to whether a predetermined application is running on the mobile device, one or more network connections for the mobile device, and one or more settings for the mobile device. One or more of these contexts may be compared to management policies to determine an operation mode for the selected application.

In another embodiment, an operation mode may be switched for a selected application. One or more contexts may be monitored for the selected application while running and a change in operation mode may be detected based on the monitoring. For example, one or more contexts may change for the selected application and a management policy may define that an operation mode for the selected application is to be changed. Accordingly, the operation mode may be switched to the updated operation mode.

Figure 15:
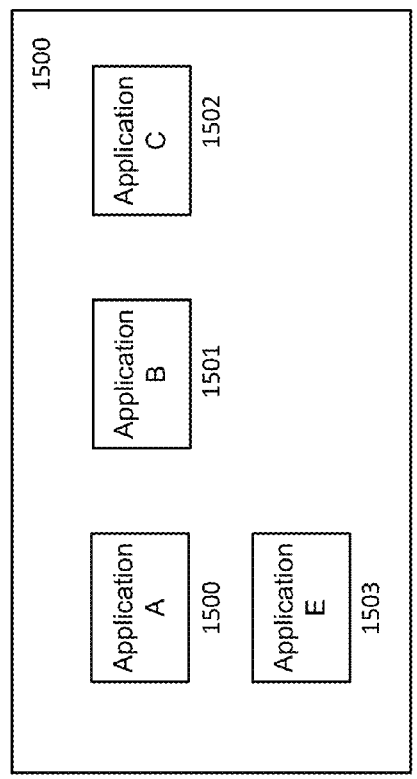
FIG. 15 depicts a sample interface of a mobile device in accordance with an embodiment.

FIG. 15 illustrates a sample interface of a mobile device, and FIGS. 16-22 illustrate sample embodiments of methods for determining an operation mode for an application. The methods depicted in FIGS. 16-22 may be combined in any suitable manner in various embodiments. The sample interface depictured in FIG. 15 may be displayed on a mobile device, such as device 107, 109, 240, 502, and/or 602, and the methods depicted in FIGS. 16-22 may be implemented by such a mobile device.

In FIG. 16, a flowchart of example method steps for determining an application mode for an application is shown. The method of FIG. 16 may begin at step 1602, where a plurality of applications are presented. For example, a plurality of applications may be presented to a user on a mobile device. FIG. 14 illustrates an embodiment where user interface 700 displayed on a mobile device (e.g., tablet, smart phone, or the like) presents Applications A 700, B 701, C 702, and E 703 to a user. This is merely an example, and the plurality of applications may be presented in any suitable manner. In an embodiment, the plurality of applications may comprise email applications, web browsing applications, software-as-a-service (SaaS) access applications, and the like.

The method of FIG. 16 may proceed from step 1602 to step 1604, where a selection for one of the plurality of applications is received. With reference to an embodiment depicted in FIG. 14, a user of a mobile device may select one of the presented applications by, for example, pressing a display of the mobile device to select the application. This is merely an example, and the application may be selected in any suitable manner.

The method of FIG. 16 may proceed from step 1604 to step 1606, where a context for the selected applications is determined based on one or more operational parameters of the device executing the selected application. For example, a context may be based on an account to be accessed by the application, a location of the mobile device or a network connectivity status of the mobile device executing the application, or based on any other operational parameter. The methods of FIGS. 17-21, further described below, illustrate various embodiments where example contexts are described.

The method of FIG. 16 may proceed from step 1604 to step 1606, where an operation mode for the selected application is determined based on the context. In an embodiment, the operations modes may comprise unmanaged, managed, and partially managed modes. The operation mode may be determined based on one or more determined contexts.

In an embodiment, the determined context may be compared to a stored management policy in order to determine an operation mode. A mobile device, such as mobile device 502, may store one or more management policies used to determine an operation mode for an application. In an embodiment, the management policies may be stored remotely, such as at policy manager 570, described above with reference to FIG. 5. In an example, a context may comprise a selected application configured to access a secure account, such as an email application configured to access a secure email account. This context may be compared to a stored management policy. For instance, the stored management policy may define that an email application that is configured to access a secure email account is to be run as a managed application. Additional contexts and management policies will be described with respect to FIGS. 17-21.

The method of FIG. 16 may proceed from step 1606 to step 1608, where the selected application is run in the determined operation mode. For example, the operation mode may be determined as managed, unmanaged, or partially managed, and the selected application may be run in the determined mode.

In an embodiment, an application that is capable of running in managed mode or unmanaged mode may be controlled by partition, by policy, by one or more sandboxes, or any other suitable configuration. For example, a managed operation mode may include running the application as a part of the managed partition 510 of mobile device 502, as described above with reference to FIG. 5. As such, the managed application may be run as secure native applications 514, secure remote applications 522 executed by a secure application launcher 518, virtualization applications 526 executed by a secure application launcher 518, and the like. The applications running on the managed partition may be stabilized applications such that device manager 524 monitors the stabilized applications to detect and remedy problems that might result in a destabilized application, such as pushing updates to the stabilized applications.

In an embodiment, an application running in managed mode may access data stored in a secure data container 528 in the managed partition 510 of the mobile device. The data stored in the secure data container 528 may include data restricted to a specific secure application 530, shared among other secure applications, and the like. Data restricted to a secure application may include secure general data 534 and highly secure data 538. Secure general data may use a strong form of encryption such as AES 128-bit encryption or the like, while highly secure data 538 may use a very strong form of encryption such as AES 254-bit encryption. In an embodiment, an application running in managed mode may save, modify, or delete data in secure data container 528. The data saved or modified may be encrypted similar to other data stored in secure data container 528. The data saved or modified may be encrypted similar to other data stored in secure data container 528. In this example, an unmanaged operation mode may include running the application as part of unmanaged partition 512, as described above.

In an embodiment, an application running in managed mode or unmanaged mode may be controlled by policies. As such, one or more policies may define that the application running in managed mode may access secured data (e.g., data in secure data container 528, encrypted data, such as data encrypted with a particular key, or any other suitable secured data), may communicate with a secure server (e.g., gateway server 560), may be managed by a device manager (e.g., device manager 524), or any other suitable policy. One or more policies may also define that the application running in unmanaged mode may not access secure data (e.g., data in secure data container 528, encrypted data, such as data encrypted with a particular key, or any other suitable secured data), may not communicate with a secure server (e.g., gateway server 560), may access unsecured data (e.g., unsecured data container 542, unencrypted data, or any other unsecured data), or any other suitable policy. In this example, an application running in managed mode and an application running in unmanaged mode may either include partitions (e.g., managed partition 510 and unmanaged partition 512) or may not include partitions.

In an embodiment, an application running in managed mode or unmanaged mode may be controlled by one or more sandboxes. A sandbox may comprise a physical or virtualized portion of a device where applications running in the sandbox may include access policies that are different from access policies for applications that are not running in the sandbox. For example, an application running in managed mode may run in a sandbox that includes policies for the managed mode, such as the policies described herein. In another example, an application running in unmanaged mode may run in a sandbox that includes policies for the unmanaged mode, such as the policies described herein. In this example, an application running in managed mode and an application running in unmanaged mode may either include partitions (e.g., managed partition 510 and unmanaged partition 512) or may not include partitions.

In an embodiment, an application running in managed mode may connect to enterprise resources 504 and enterprise services 508 through virtual private network connections, as described about with reference to FIG. 5. The virtual private network connections may be specific to particular application, such as the selected application, particular devices, particular secured areas on the mobile device, and the like. For example, wrapped applications in a secured area of the phone may access enterprise resources through an application specific VPN such that access to the VPN would be granted based on attributes associated with the application, possibly in conjunction with user or device attribute information.

In an embodiment, an application running in managed mode may encrypt data transmitted from the application. For example, an application running in managed mode may be communicating with a computing device over a network, and the data transmitted from the application to the device may be encrypted. In addition, the data communicated from the computing device to the application may also be encrypted, and the application running in managed mode may be configured to decrypt the received data.

In an embodiment, an application running in managed mode my access a secure portal. For example, an application may connect to a computing device over a network, for example, a microVPN, and may access a secure portal that might not be access by unsecured applications, such as applications running in unmanaged mode.

In an embodiment, an unmanaged operation mode may include running the application as a part of the unmanaged partition 512 of mobile device 502, as described above with reference to FIG. 5. In an unmanaged mode, the application may access data stored in an unsecured data container 542 on the unmanaged partition 512 of the mobile device 502. The data stored in an unsecured data container may be personal data 544.

In an embodiment, an application running in partially managed mode may be run similar to an application running in managed mode, but might not include all aspects of the latter. For example, an application running in partially managed mode may have the information transmitted from the application over a network encrypted, but the application might not have access to secure data container 528, as described with reference to FIG. 5. In another example, an application running in partially managed mode may have access to secure data container 528, but might not be able to connect to enterprise resources 504 and enterprise services 508 through virtual private network connections. Accordingly, depending on the determined context, an application running in partially managed mode may include aspects of an application running in managed mode and aspects of an application running in unmanaged mode.

In FIGS. 17-21, flowcharts of example method steps for determining a context and operation mode for an application are shown. In an embodiment, steps 1606 and 1608 of FIG. 16 may comprise the method steps of any one or more of FIGS. 17-21. The method of FIG. 17 may begin at step 1702, where an account to be accessed by a selected application is detected. For example, a selected application may comprise an email application and an email account that the email application is configured to access may be detected. In this example, the email application may be able to access multiple email accounts, such as an enterprise email account and a personal email account, and the account that the email application is configured to access at the time of running may be determined as the context account to be accessed.

The method of FIG. 17 may proceed from step 1702 to step 1704, where an account type of the account to be accessed may be determined. The account type may comprise a context for the selected application. For example, a selected application may comprise an email application and the email application may be configured to access an enterprise account. In another example, the email application may be configured to access a personal account.

The method of FIG. 17 may proceed from step 1704 to step 1706, where an account type may be compared with an account type management policy. For example, a management policy may define that an email application that is to access an enterprise account should run in managed mode and an email application that is to access a personal account should run in unmanaged mode. The method of FIG. 17 may proceed from step 1706 to step 1708, where an operation mode is determined based on the comparison.

The method of FIG. 18 may begin at step 1802, where a location for a mobile device is determined. For example, a mobile device, such as mobile device 502, may implement the method of FIG. 18, and a location for the mobile device may be determined. The location may be determined by GPS, signal triangulation, or any other suitable or otherwise known manner. The location may comprise a context for the selected application.

The method of FIG. 18 may proceed from step 1802 to step 1804, where a determined location may be compared with a location management policy. For example, a management policy may define that a selected application run in managed mode when in a certain location, for example, on company premises. In an embodiment, a management policy may define that a selected application run in partially managed mode when in a certain location, for example, when the determined location is inside the United States but off company premises. For example, the partially managed mode may encrypt communication to and from the selected application, but might not allow access to enterprise resources, such as resources 504. In another embodiment, a management policy may define that a selected application run in unmanaged mode when in a certain location, for example, when the determined location is outside the United States. The method of FIG. 18 may proceed from step 1804 to step 1806, where an operation mode is determined based on the comparison.

The method of FIG. 19 may begin at step 1902, where it is monitored whether a predetermined application is running on a device. For example, a mobile device, such as mobile device 502, may implement the method of FIG. 19, and the mobile device may be monitored to determine whether a predetermined application is running. The predetermined application may comprise any application capable of running on the mobile device, such a client agent 604 as described with reference to FIG. 6. The monitored predetermined application may comprise a context for the selected application.

The method of FIG. 19 may proceed from step 1902 to step 1904, where a monitored application is compared against a management policy. For example, a management policy may define that a selected application run in managed mode when a predetermined application, such as client agent 604, is running and that the selected application run in unmanaged mode when the predetermined application is not running. The method of FIG. 19 may proceed from step 1904 to step 1906, where an operation mode is determined based on the comparison.

Figures 20, 21:
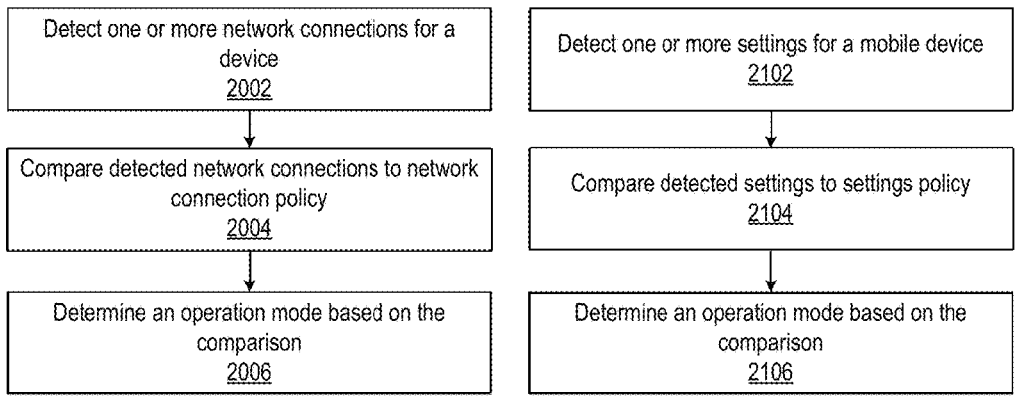
FIG. 20 is a flowchart for determining a network connection context for an application in accordance with an embodiment.
FIG. 21 is a flowchart for determining a settings context for an application in accordance with an embodiment.

The method of FIG. 20 may begin at step 2002, one or more network connections are detected. For example, a mobile device, such as mobile device 502, may implement the method of FIG. 20, and the network connections that the mobile device makes may be detected. In an example, network connections may comprise a connection to a cellular network, a connection to a WIFI network, or a connection to a Wireless Local Area Network (WLAN), or the like. The one or more network connections may comprise a context for the selected application.

The method of FIG. 20 may proceed from step 2002 to step 2004, where detected network connections are compared against a network connection management policy. For example, a management policy may define that a selected application run in managed mode when a mobile device is connected to an internal network, such as a WLAN internal to a company, and that the selected application run in unmanaged mode when the mobile device is only connected to a wireless network, such as cellular network or WIFI network. The method of FIG. 20 may proceed from step 2004 to step 2006, where an operation mode is determined based on the comparison.

The method of FIG. 21 may begin at step 2102, where one or more settings for a mobile device are detected. For example, a mobile device, such as mobile device 502, may implement the method of FIG. 21, and one or more settings for the mobile device may be detected. In an example, it may be detected whether the mobile device has a lock screen, such as a PIN required for using the mobile device, or it may be detected whether the mobile device is jailbroken, e.g., has received after-market modifications. The one or more settings may comprise a context for the selected application.

The method of FIG. 21 may proceed from step 2102 to step 2104, where detected settings are compared against a settings management policy. For example, a management policy may define that a selected application might not run in managed mode if the mobile device does not have a lock screen or if the mobile device is jailbroken. The method of FIG. 21 may proceed from step 2104 to step 2106, where an operation mode is determined based on the comparison. In an embodiment, when running the selected application in the determined mode, an indicator may be displayed on the mobile device that informs a user of certain management policies, such as a requirement for a mobile device to have a lock screen before the mobile device is allowed to run the selected application in managed mode. FIGS. 17-21 describe a plurality of contexts, and any other suitable context and corresponding management policy may be implemented.

In an embodiment, one or more of the contexts described in FIGS. 17-21 may be combined and these contexts may be compared against a management policy for the selected application. For example, contexts for a selected application may comprise an account type to be accessed as an enterprise email account and a detected network connection as a cellular network. In this example, the management policy may define that when an enterprise account is attempted to be accessed over a cellular network, the selected application should be run in managed mode. The management policy may be defined in this way because the selected application may encrypt the communication with the enterprise email account, and therefore the risk of sending secure traffic over a cellular network may be mitigated.

In another example, contexts for a selected application may comprise a determined location outside of the United States and a network connection with a WLAN internal to a company. A management policy may define that a selected application is to run in managed mode when a determined location is outside the United States and a network connection is with a WLAN internal to a company. The management policy may be defined in this way because a network connection with a WLAN internal to a company mitigates the risk associated with secure communications outside of the United States.

In an embodiment, the one or more contexts as described in FIGS. 17-21 may include a priority. For example, a context for a selected application may comprise a mobile device setting as jailbroken and a management policy may define that a selected application is to run in unmanaged mode when a context indicates a jailbroken mobile device, regardless of what other contexts indicate. Accordingly, a jailbroken mobile device will have a selected application run in unmanaged mode even when the mobile device is connected to a WLAN internal to a company or if the selected application is attempting to access an enterprise account.

In an embodiment, a management policy may indicate that a selected application is to be run in partially managed mode based on a plurality of contexts as described in FIGS. 17-21. For example, contexts for a selected application may comprise an account type to be accessed as an enterprise email account and a detected network connection as a cellular network. In this example, the management policy may define that when an enterprise account is attempted to be accessed over a cellular network, the selected application should be run in partially managed mode. The partially managed mode may encrypt communication to and from the selected application, but might not allow access to enterprise resources, such as resources 504. The management policy may be defined in this way because the encrypted communication with the enterprise email account may be a low risk communication, and allowing access to enterprise resources may be a high risk communication.

Figure 22:
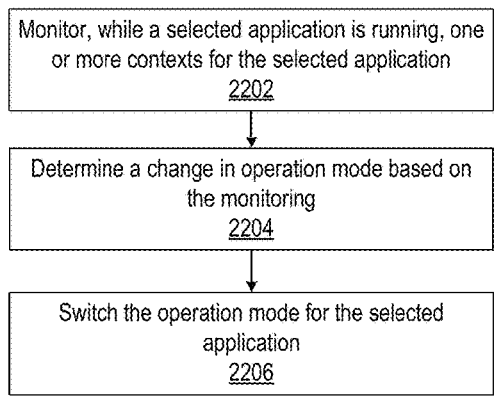
FIG. 22 is a flowchart for switching an application mode for an application in accordance with an embodiment.

In FIG. 22, a flowchart of example method steps for switching an operation mode for an application is shown. For example, the method steps of FIG. 22 may follow the method steps of FIG. 16. The method of FIG. 22 may begin at step 2202, where one or more contexts may be monitored while a selected application is running. In an embodiment, one or more of the contexts described with reference to FIGS. 17-21 may be monitored. For example, a mobile device running a selected application may be connected to a cellular network and while the selected application is running, the mobile device may make a new network connection with a WLAN internal to a company.

The method of FIG. 22 may proceed from step 2202 to step 2204, where a change in an operation mode for a selected application is detected based on the monitoring. Stated differently, the mobile device may detect a change in information that formed the basis for selecting a particular operational mode. For example, a selected application may be running in unmanaged mode, and once a mobile application running the selected application connects to a WLAN internal to a company, a management policy may define that the operation mode for the selected application should switch to managed mode. The method of FIG. 22 may proceed from step 2204 to step 2206, where the operation mode for the selected application is switched.

Managing Dynamic Management Policies and Settings for Mobile Applications

An improved technique ensures that a wide range of management policies, including application-specific management policies and settings, can be composed, configured through an administrative interface, and delivered to the deployed applications, without requiring changes to control point software.

Some embodiments are directed to a method for specially prepared enterprise applications delivered and managed through an enterprise mobile application management system to (a) define the available set of application management policies in an open-ended manner such that new management policies can be contrived easily, (b) describe the required user interface elements and range of possible management policy settings values sufficient for the control point software to dynamically compose an administrative user interface for the setting in question without explicit knowledge of the particular setting or its meaning, and/or (c) roll up all applicable management policy settings for a particular managed application (taking into account user and access scenario) and deliver them to the application at run time such that these settings can be queried dynamically by the application as needed for proper enforcement.

An improved technique ensures that a wide range of management policies, including application-specific management policies and settings, can be composed, configured through an administrative interface, and delivered to the deployed applications, without requiring changes to control point software.

Enterprises create (or adapt) their native mobile applications using tools and SDKs associated with the enterprise mobility management (EMM) solution they have chosen to deploy. Depending upon the tools or SDK version used to prepare such applications, one can expect that there will be a default set of management policies that the EMM system software provides automatically. These default management policies can be further augmented by the application developer defining their own application specific management policies and settings.

All management policies and settings should be defined using a declarative syntax (metadata) that includes the following elements associated with each setting:

Setting group or category ID;

Setting dictionary name;

Setting type (Boolean, integer, string, multistring, enum, uri, etc);

Range of possible settings values;

Default setting value;

Setting friendly name string (default language plus resource ID for localized name);

Setting units and other U/I display strings (default language plus references to resource ID for localized strings);

Explanation and extended help text strings (default language plus references to resource ID for localized strings);

In an example, the above-described metadata is provided in the form of an XML document that defines individual elements listed above for each setting.

The application preparation tools should assemble the management policy metadata for the default EMM-system-provided management policies as well as any application-specific management policies provided by the application developer packaging these setting descriptions directly into the application bundle that will be uploaded to the management control point of the EMM server.

When a managed application is uploaded to the control point for the purpose of publishing the application for the enterprise users to consume, the control point will read the management policy metadata of the application and dynamically compose an administrative user interface for all setting all application management policies and settings. The IT administrator interacts with the various controls choosing settings that are appropriate for each or leaving them to their default value. In an example, the output of this step is a simple JSON or XML dictionary of key/value pairs representing each defined setting name (dictionary name) and its assigned value.

Once uploaded and configured on the control point, these enterprise managed applications are made available to an organization's employees to peruse and choose to install based on their role within the organization. Alternatively, such applications can be pushed directly to mobile devices for employees who have enrolled their device with a corporate MDM server.

When an employee executes a managed application on the mobile device, they are typically challenged to authenticate their corporate identity along with passwords and other factors as dictated by corporate management policy. After having authenticated the user and device, the access manager components of the system verify that the user is entitled to the application in question and downloads the JSON or XML management policy document representing the settings that have been established by the enterprise administrator for this user when using this specific application.

The configured settings held therein are consulted by the application or embedded EMM software whenever a management policy decision is needed at run time. The application management policy document would typically be cached and periodically refreshed to ensure continued compliance with configured administrative settings should they change in the future. Indeed, one of the embedded management policy settings should dictate required update frequency.

As new versions of the EMM toolkit or SDK become available and as new applications are developed and adapted to this system, the available set of management policy settings needed by current application mix can grow dramatically. However, no change in control point software is needed to offer administrative control over the new settings surfaced by these newly deployed applications.

By relying on a comprehensive metadata description of all management policies and settings associated with managed enterprise applications embedded within the application bundle itself, the administrative control point for these management policies can dynamically compose user interface for these settings, thereby decoupling the back end EMM server software from the specific knowledge of management policies to be offered.

Further, this data driven description of management policy settings makes it very easy to deliver management policy settings dynamically to an application at runtime without any middleware knowledge of the semantics of these settings.

Figure 23:
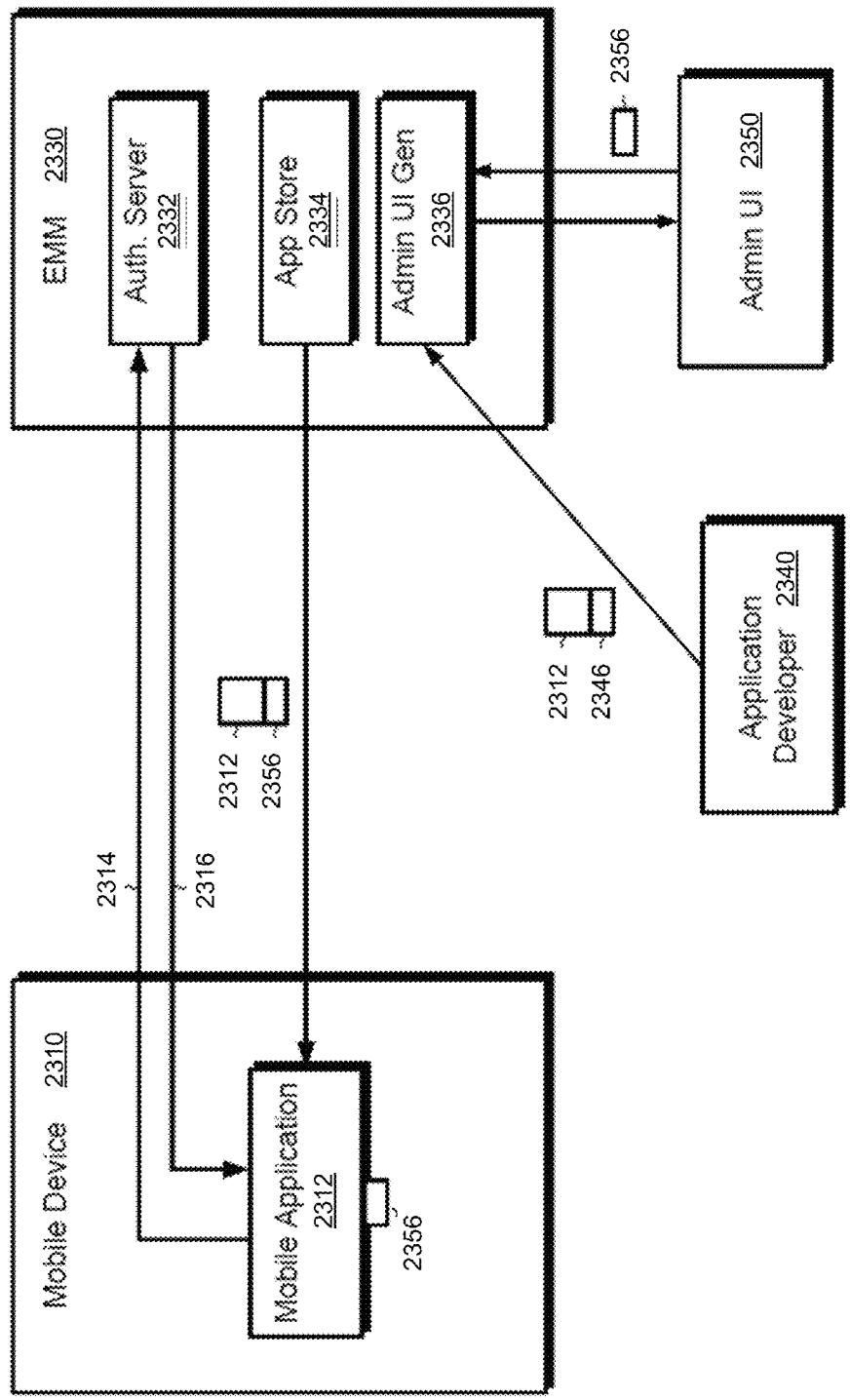
FIG. 23 is a block diagram of an example environment in which embodiments hereof can be practiced.

FIG. 23 shows an example environment in which embodiments hereof can be practiced. As shown, a mobile device 2310 communicates, e.g., over the Internet or some other network, with an EMM 2330. The EMM 2330 includes an authentication server 2332, an application store 2334, and an administrative user interface generator 2336. Other constructs maybe included, as well, but these are omitted from FIG. 9A for simplicity.

In operation, an application developer 2340 develops a mobile application 2312. The application developer also produces management policy metadata 2346. The management policy metadata 2346 defines a set of management policies for controlling data flow into and/or out of the mobile application 2312. Typically, the management policy metadata includes a first set of management policy metadata that is general to the EMM 2330 and a second set of management policy metadata that is specific to the mobile application 2312. It is understood that the application developer 2340 (or multiple developers) may develop multiple mobile applications, each with metadata general to the EMM 2330 and with application-specific metadata.

The mobile application 2312 and management policy metadata 2346 are sent to the EMM 2330 and received by the administrative UI generator 2336. Upon receiving the mobile application 2312 and management policy metadata 2346, the administrative UI generator 2336 dynamically generates an administrative UI 2350. An administrator then views the management policy metadata 2346 (e.g., an XML file) via a viewer, and customizes the management policy settings in the metadata, e.g., based on rules of the EMM 2330 and/or other considerations. The result of the administrator's customizations is an application management policy 2356. In an example, the application management policy 2356 is provided in the form of a dictionary of management policy names and values, which may be rendered as an XML or JSON file, for example.

With the settings of the application management policy 2356 established, the mobile application 2312 is made available to users via the application store 2334. Users, such as a user of the mobile device 2310, can log on to the EMM 2330 by submitting authentication requests 2314 to the authentication server 2332 and receiving authentication responses 2316. Authenticated users can view mobile applications in the application store 2334 and download them to their mobile devices. For example, the user of the mobile device 2310 can download the mobile application 2312 from the application store 2334.

When the user downloads the application 2312, the user also receives the application management policy 2356. The mobile application 2312 is then constrained to operate on the mobile device 2310 in accordance with the application management policy 2356.

Generally, the mobile application 2312 is specially designed or adapted for use with the enterprise, i.e., it is not an application that general users can download for their own personal activities (e.g., news apps, Facebook app, etc.). In some examples, the mobile application 2312 is specially designed for the EMM 2330. In other examples, the application 2312 is a widely used application that is adapted specifically for use with the EMM 2330. For example, the application is provided with additional code that enables the application to conform with the framework of the EMM 2330. Such code can be compiled into the application using an SDK. Alternatively, such code may be applied as a wrapper around the general-use application, to adapt it specifically for use with the EMM 2330. In general, the additional code serves to divert API calls from the mobile application 2312 through the application management policy 2356, such that the management policy 2356 can control the behavior of the mobile application 2312 on the mobile device 2310.

The application developers 2340 can periodically provide updated versions of the management policy metadata 2346. These are used to generate (via the administrative UI generator 2336) an updated application management policy 2356. In some examples, the updated application management policy 2356 is pushed to the mobile device 2310 to update the management policy in use.

In some examples, the application management policy 2356 residing on the mobile device 2310 is refreshed periodically, or in response to certain events, such as starting the mobile application 2312 on the mobile device 2310.

Controlling Device Access to Enterprise Resources

An improved technique for managing encrypted data vaults for storing data on mobile devices includes directing read and write operations from an application running on a mobile device to an enterprise-generated management policy, specific to that application, which designates an encrypted vault for the data specified by the read and write operations.

Figure 24:
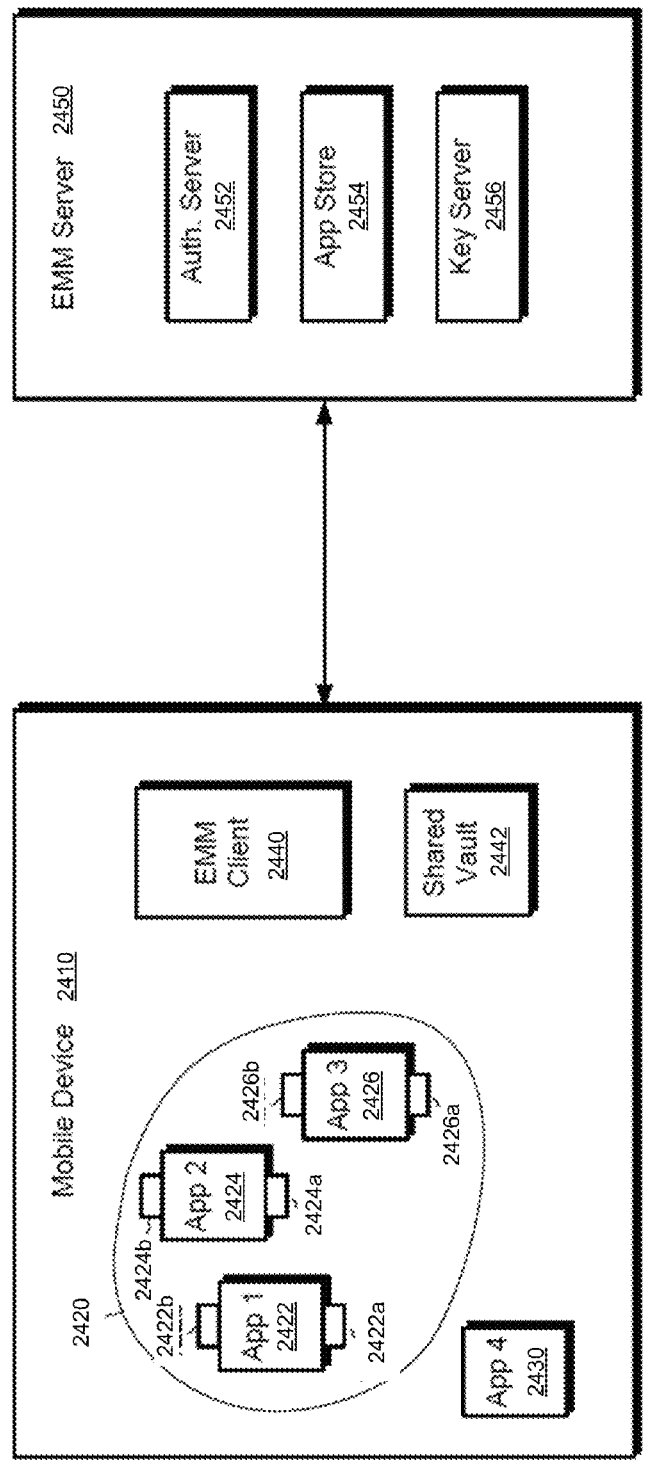
FIG. 24 is a block diagram of an example environment in which embodiments hereof can be practiced.

FIG. 24 shows an example environment in which embodiments hereof can be practiced. Here, a mobile device 2410, such as a smartphone, tablet, PDA, and the like, has installed upon it various mobile applications. The mobile applications include a set 2420 of managed applications 2422, 2424, and 2426, which are managed by the enterprise, and a personal application 2430, which is not managed by the enterprise. In some examples, an enterprise mobility management (EMM) client 2440 is also installed on the mobile device 2410. The EMM client 2440, also referred to herein as a "broker," is configured to connect, e.g., via a network such as the Internet, with an EMM server 2450, which typically includes an authentication server 2452, an application store 2454, and a key server 2456. An example of the EMM client 2440 is a client agent available for Citrix. An example of the EMM server 2450 is a gateway server that provides access to enterprise resources and/or cloud resources.

The illustrated mobile device 2410 also includes a shared data vault 2442. The shared data vault 2442 includes encrypted files and/or data objects accessible to each of the set 2420 of managed applications.

Each application in the set 2420 of managed applications is associated with a respective management policy. For example, application 2422 is associated with a management policy 2422a, application 2424 is associated with a management policy 2424a, and application 2426 is associated with a management policy 2426a. In some examples, the management policies 2422a, 2424a, and 2426a are provided in the form of files, such as XML or JSON files, in which the respective management policy is expressed as a set of key/value pairs. In an example, each management policy 2422a, 2424a, and 2426a includes a record of all applications within the set 2420 of managed applications.

In some examples, each application in the set 2420 of managed applications is also associated with a respective private application vault. For example, application 2422 is associated with a private application vault 2422b, application 2424 is associated with a private application vault 2424b, and application 2426 is associated with a private application vault 2426b. Encryption keys for the private application vaults 2422b, 2424b, and 2426b, as well as an encryption key for the shared vault 2442 are obtained from the key server 2456 on the EMM server 2450 and can be held temporarily within the mobile device.

Each of the set 2420 of managed applications is specially designed or adapted for use with the enterprise. Some of the set 2420 of managed applications may be designed specifically for the enterprise. Others of the set 2420 of managed applications are more widely used applications (e.g., available to the public) that have been specifically adapted for use with the enterprise. Each of the set 2420 of applications includes injected code that enables the application to conform to a framework of the enterprise. The injected code can be compiled into the application using an SDK. Alternatively, the injected code can be applied as a wrapper around a general-use application, to adapt it for use with the enterprise. In the context of the improvements disclosed herein, the injected code serves to divert API calls for reading and writing from the application to its associated management policy, such that the read or write requests are redirected to a designated secure vault in accordance with the settings of the management policy.

In typical operation, a user of the mobile device 2410 starts the EMM client 2440, logs on to the EMM server 2450 via the authentication server 2452, and accesses the application store 2454. The user can then peruse enterprise applications available from the application store 2454, select desired applications, and download them to the mobile device 2410, where the downloaded applications are included in the set 2420 of managed applications. For each application downloaded, a corresponding management policy is also downloaded to the mobile device, and the management policies of all applications in the set 2420 are updated to reflect all members of the set 2420.

In an example, management policies (e.g., 2422a, 2424a, and 2426a) are refreshed periodically and/or in response to particular events, such as each time the respective application is started and/or each time the user logs onto the EMM server 2450. Management policies can thus be adapted over time and dynamically transferred to the mobile device 2410 from the EMM server 2450.

Depending on settings of the management policies 2422, 2424, and 2426, applications within the set 2420 of managed applications can be constrained to exchange files and/or data only with other applications within the set 2420. For example, API calls from the application 2422 specifying file reads or writes are intercepted by the injected code of the application 122. The management policy 2422a is read, and the read or write operation specified is diverted to an encrypted vault (e.g., the private vault 2422b or the shared vault 2442), depending on the settings in the management policy 2422a.

In some examples, applications in the set 2420 of managed applications on the mobile device 2410 can be assigned to different groups. In such cases, management policies (e.g., 2422a, 124a, and 2426a) are updated to include records of groups and group members. The flow of files and/or data between applications can thus be further restricted to members of particular groups. For example, each group may be provided with its own shared vault 142. Providing different groups of mobile applications within the managed set 2420 can help to segregate applications handling highly sensitive data from those that handle less sensitive data.

It is understood that the above-described process of intercepting an API call, consulting an application's management policy, and allowing, blocking, or redirecting the operation specified by the API call based on the management policy can be carried out in a number of contexts. In one example, the above process can be applied for selecting a set of applications on the mobile device 2410 that can be used to open a file or data element identified by a link or icon (e.g., using Open In). In another example, the above process can be applied for copying data or data objects from one application and pasting the data or data objects in another application (e.g., via a hidden, encrypted paste buffer). In yet another example, the above process can be applied for moving files into and/or out of a protected file vault, as described herein. Essentially, any operation used to move data into and/or out of an application can make use of the above technique.

Figure 25:
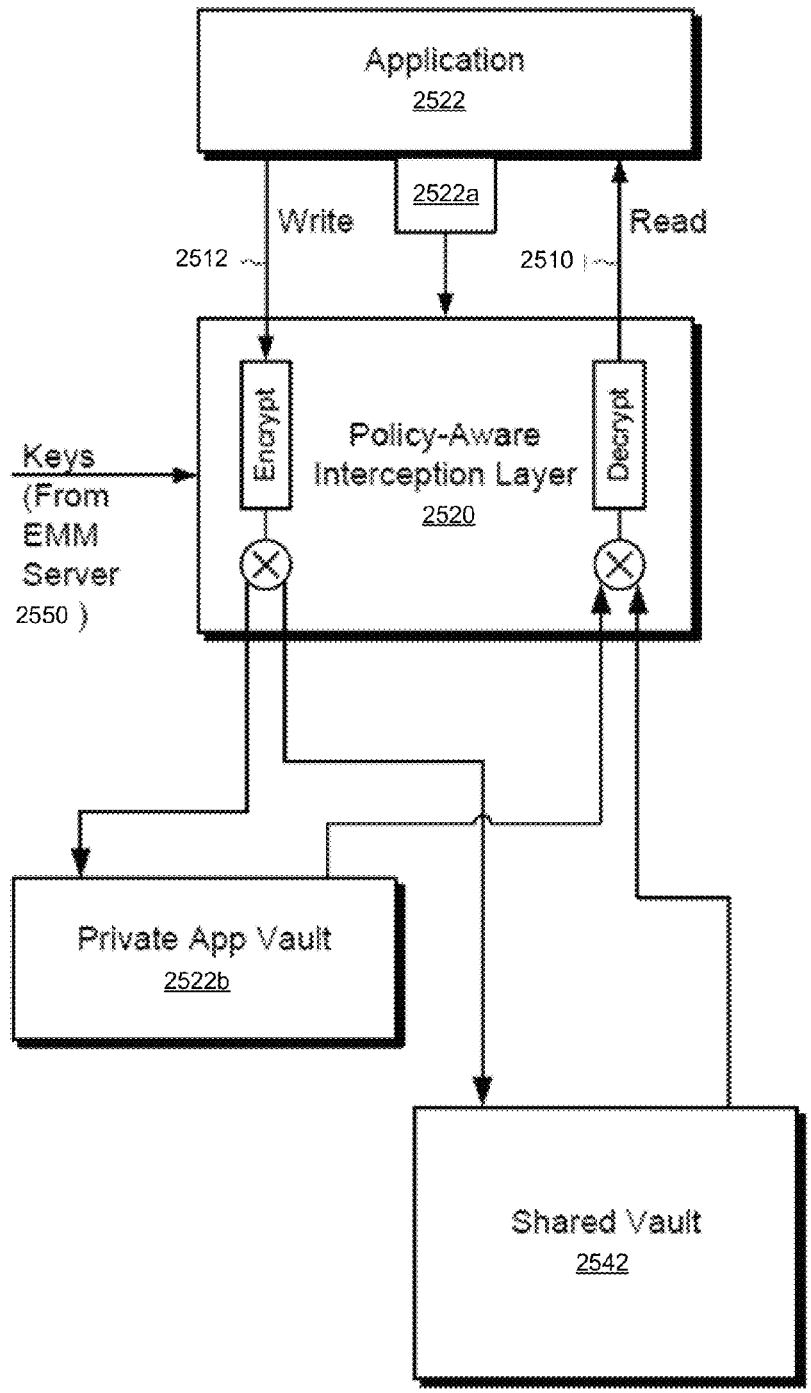
FIG. 25 is a block diagram of various features of the mobile device of FIG. 24.

FIG. 25 shows various features of the mobile device 2510 in additional detail. Here, the application 2522 (representative of any of the applications of the managed set 2420) issues read operations 2510 and write operations 2512 to persistent space on the mobile device 2510. In non-managed applications, such read and write operations would typically be directed to the application's sandbox. Here, however, read and write operations are intercepted by the management policy-aware interception layer 2520 and directed to an appropriate encrypted vault. For read operations 2510, the management policy-aware interception layer 2520 inspects the type of data to be read and consults the management policy 2522a. If the management policy 2522a specifies that the identified type of data is stored in the private application vault 2522b, the management policy-aware interception layer 2520 obtains the data from the private application vault 2522b. However, if the management policy 2522a specifies that the identified type of data is stored in the shared data vault 2542, the management policy-aware interception layer 2520 obtains the data from the shared data vault 2542. The management policy-aware interception layer 2520 then decrypts the data (using an encryption key from the EMM server 2550), and returns the data to the application 2522.

In the case of write operations 2512, the management policy-aware interception layer 2520 inspects the type of data to be written and consults the management policy 2522a. If the management policy 2522a specifies that the identified type of data is to be stored in the private application vault 2522b, the management policy-aware interception layer 2520 encrypts the data and stores the data in the private application vault 2522b. However, if the management policy 2522a specifies that the identified type of data is to be stored in the shared data vault 2542, the management policy-aware interception layer 2520 encrypts the data and stores the data in the shared data vault 2542.

Figure 26:
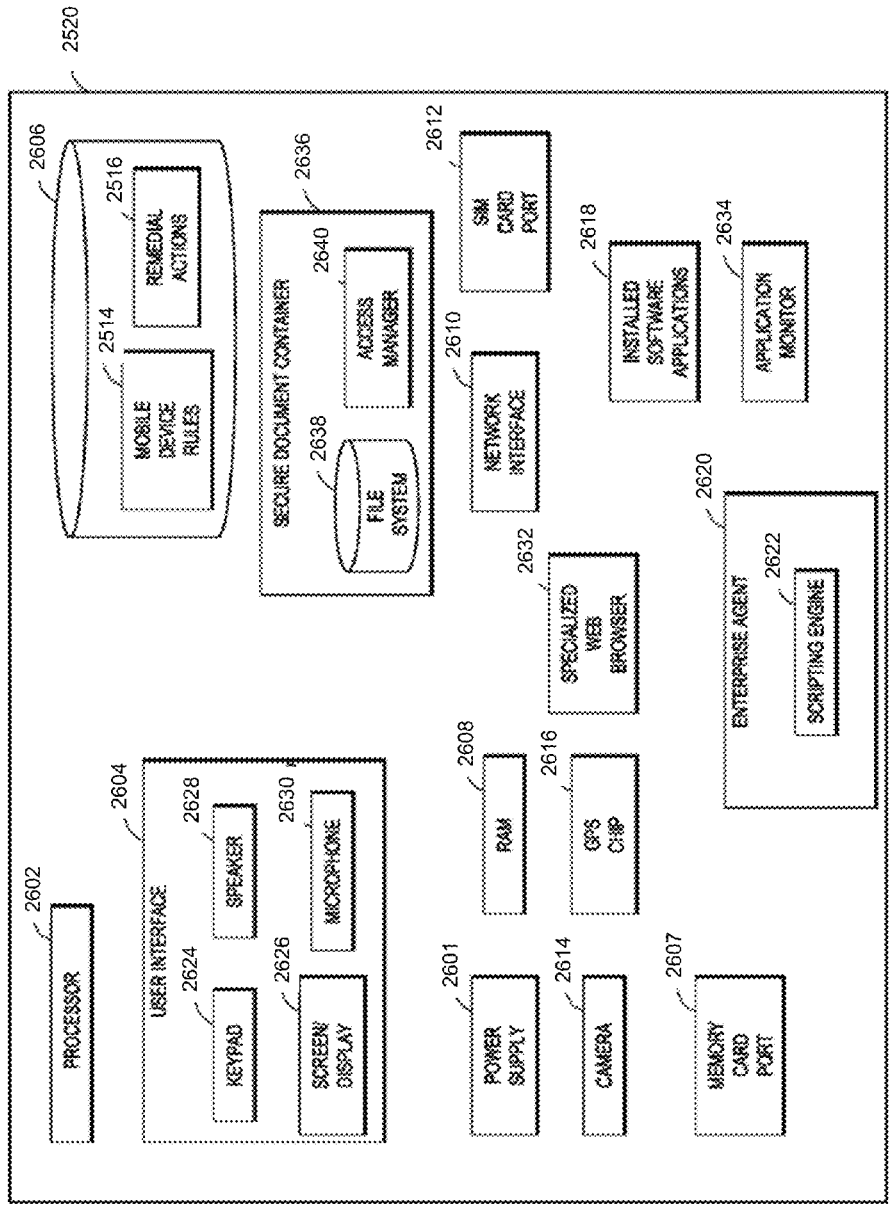
FIG. 26 is a schematic illustration of an embodiment of a mobile device.
Figure 27:
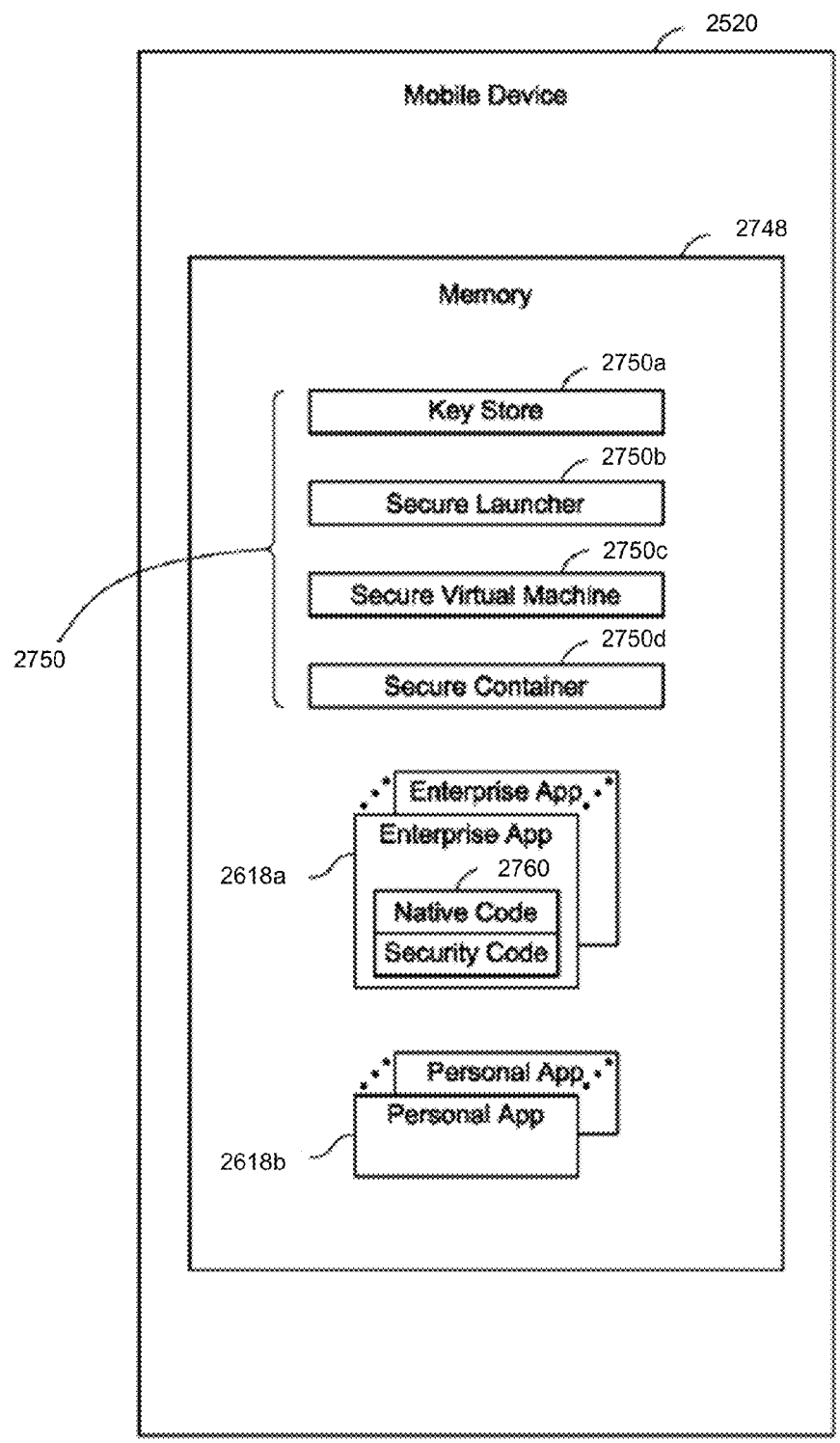
FIG. 27 illustrates security-related components and application that may be installed on a mobile device.

Reference is made again to FIGS. 26-27. In some embodiments, a mobile device 2620 can include a secure document container 2636, which can be referred to as a "container." As explained herein, the container 2636 can help prevent the spread of enterprise information to different applications and components of the mobile device 2620, as well as to other devices. The enterprise system (which can be partially or entirely within the cloud) can transmit documents to the devices 2620, which can be stored (e.g., by the enterprise agent 2620) within the container 2636. The container 2636 can prevent unauthorized applications 2618 and other components of the device 2620 from accessing information within the container 2636. For enterprises that allow users to use their own mobile devices 2620 for accessing, storing, and using enterprise data, providing containers 2636 on the devices 2620 helps to secure the enterprise data. For instance, providing containers 2636 on the devices 2620 can centralize enterprise data in one location on each device 2620, and can facilitate selective or complete deletion of enterprise data from the device 2620.

As used in this context, a "document" can comprise any computer-readable file including text, audio, video, and/or other types of information or media. A document can comprise any single one or combination of these media types.

The secure document container 2636 can compose an application that implements a file system 2638 that stores documents and/or other types of files. The file system 2638 can comprise a portion of a computer-readable memory of the mobile device 2620. The file system 2638 can be logically separated from other portions of the computer-readable memory of the mobile device 2620. In this way, enterprise data can be stored in secure document container 2636 and private data can be stored in a separate portion of the computer-readable memory of the mobile device 2620. The container 2636 can allow the enterprise agent 2620, mobile device applications 2618 and/or other components of the device 2620 to read from, write to, and/or delete information from the file system 2638 (if authorized to do so). Deleting data from the container 2636 can include deleting actual data stored in the container 2636, deleting pointers to data stored in the container 2636, deleting encryption keys used to decrypt data stored in the container 2636, and the like. The container 2636 can be installed by, e.g., the agent 2620, IT administrators of the enterprise system, or the device 2620 manufacturer. The container 2636 can enable some or all of the enterprise data stored in the file system 2638 to be deleted without modifying private data stored on the mobile device 2620 outside of the container 2636. The file system 2638 can facilitate selective or complete deletion of data from the file system 2638. For example, a component of the enterprise system can delete data from the file system 2638 based on, e.g., encoded rules. In some embodiments, the agent 2620 deletes the data from the file system 2638, in response to receiving a deletion command from the enterprise system. In other embodiments, the data is deleted without the assistance of the agent 2620, for example if an agent 2620 is not provided.

The secure document container 2636 can comprise an access manager 2640 that governs access to the file system by applications 2618 and other components of the mobile device 2620. Access to the file system 2638 can be governed based on document access management policies (e.g., encoded rules) stored in the documents and/or the file system 2638. A document access management policy can limit access to the file system 2638 based on (1) which application 2618 or other component of the device 2620 is requesting access, (2) which documents are being requested, (3) time or date, (4) geographical position of the device 2620, (5) whether the requesting application 2618 or other component provides a correct certificate or credentials, (6) whether the user of the device 2620 provides correct credentials, (7) other conditions, or any combination thereof A user's credentials can comprise, for example, a password, one or more answers to security questions (e.g., What is the mascot of your high school?), biometric information (e.g., fingerprint scan, eyescan, etc.), and the like. Hence, by using the access manager 2640, the container 2636 can be configured to be accessed only by applications 2618 that are authorized to access the container 2636. As one example, the access manager 2640 can enable enterprise applications installed on the mobile device 2620 to access data stored in the container 2636 and to prevent non-enterprise applications from accessing the data stored in the container 2636.

Temporal and geographic restrictions on document access may be useful. For example, an enterprise administrator may deploy a document access management policy that restricts the availability of the documents (stored within the container 2636) to a specified time window and/or a geographic zone (e.g., as determined by a GPS chip 2616) within which the device 2620 must reside in order to access the documents. Further, the document access management policy can instruct the container 2636 or agent 2620 to delete the documents from the container 2636 or otherwise make them unavailable when the specified time period expires or if the mobile device 2620 is taken outside of the defined geographic zone.

Some documents can have access management policies that forbid the document from being saved within the secure document container 2636. In such embodiments, the document can be available for viewing on the mobile device 2620 only when the user is logged in to the enterprise system.

The access manager 2640 can also be configured to enforce certain modes of connectivity between remote devices (e.g., an enterprise resource or other enterprise server) and the container 2636. For example, the access manager 2640 can require that documents received by the container 2636 from a remote device and/or sent from the container 2636 to the remote device be transmitted through application tunnels, for example, as described above. Such application tunnels can use the tunneling mediator of the enterprise system. The access manager 2640 can require that all documents transmitted to and from the container 2636 be encrypted. The enterprise agent 2620 or access manager 2640 can be configured to encrypt documents sent from the container 2636 and decrypt documents sent to the container 2636. Documents in the container 2636 can also be stored in an encrypted form.

The secure document container 2636 can be configured to prevent documents or data included within documents from being used by unauthorized applications or components of the mobile device 2620 or other devices. For instance, a mobile device application 2618 having authorization to access documents from the container 2636 can be programmed to prevent a user from copying a document's data and pasting it into another file or application interface, or locally saving the document or document data as a new file outside of the container 2636. Similarly, the container 2636 can include a document viewer and/or editor that does not permit such copy/paste and local save operations. Moreover, the access manager 2640 can be configured to prevent such copy/past and local save operations. Further, the container 2636 and applications 2618 programmed and authorized to access documents from the container 2636 can be configured to prevent users from attaching such documents to emails or other forms of communication.

A mobile device application 2618 can be programmed to lookup and find the secure document container 2636 (or a secure web browser 2632, described below, that includes the container 2636) as a resource of the mobile device 2620. In certain embodiments, the application 2618 can run in a secure virtual machine separate from a virtual machine of an operating system of the mobile device 2620. According to some other embodiments, the application can run within the secure web browser 2632. An application 2618 can be programmed to write enterprise-related data only into the container 2636. For instance, the application's 2618 source code can be provided with the resource name of the container 2636. Similarly, a remote application (e.g., an enterprise resource 2430) can be configured to send data or documents only to the containers 2636 of one or more mobile devices 2620 (as opposed to other components or memory locations of the devices 2620). Storing data to the container 2636 can occur automatically, for example, under control of the application 2618, the enterprise agent 2620, or the web browser 2632. An application 2618 can be programmed to encrypt or decrypt documents stored or to be stored within the container 2636. In certain embodiments, the container 2636 can only be used by applications (on the device 2620 or remote) that are programmed to look for and use the container 2636, and which have authorization to do so.

The secure document container 2636 can serve as a temporary repository for documents and other files sent to the mobile device 2620. Remote applications can be configured to send documents to the container 2636 (e.g., via application tunnels) on a onetime or periodic basis. For example, a sales-related enterprise resource 130 can be programmed to send sales-related documents (e.g., most recent price sheets) every morning to the containers 2636 of a team of users having sales-related roles (e.g., sales persons). The sales-related documents can have document access management policies such that the documents will "self-destruct" (e.g., be automatically deleted from the container 2636—the deletion being performed by, e.g., the container 2636 itself or the enterprise agent 2620) at a certain time or at the expiration of a time period beginning at a defined event (e.g., the user's opening of a document). Document distribution management policies (e.g., encoded rules) can be provided (e.g., within the mobile device management system) to control when and how remote applications (e.g., enterprise resources) send documents to the containers 2636, to which users the documents are sent, what restrictions (e.g., temporal or geographic restrictions) are placed on the use and availability of the documents (e.g., in the form of document access management policies as described above), etc.

Remote applications that send documents to one or more secure document containers 2636 of mobile devices 2620 can be configured to integrate with other repositories, for the purpose of sending documents from such repositories to the containers 2636. Such other repositories can be stored, for example, within the enterprise system (e.g., enterprise document repositories such as a Microsoft Sharepoint™ repository) or in a cloud computing system (e.g., a Box.net™ repository).

EMM solutions have traditionally taken the approach of managing entire mobile devices through mobile device management (MDM) servers. Increasingly EMM solutions are focusing on a mobile application management solution that seeks only to manage the enterprise applications and their associated data which may be installed and running on an employee's mobile device. Such systems generally use role-based access to provision specially prepared enterprise apps that are specifically designed to protect corporate assets. Such applications often require employees to logon to corporate servers in order to access the managed applications. Additionally, such applications may be associated with management policies established by an enterprise administrator to control application access while also seeking to protect and control information held by the application.

One of the biggest challenges in managing enterprise applications on an otherwise unmanaged mobile devices is ensuring that information used by the managed application cannot escape from the set of trusted enterprise applications that IT administrators make available to their enterprise users. Information can escape in any number of ways, and a robust EMM system will provide management policies and enforcement mechanisms to prevent such information leakage where IT administrators deem it proper and to provide management policy overrides, where appropriate. However, even with a robust set of information containment management policies, there are other threats to the security of the information managed by applications on mobile devices.

One such threat is that applications may store some information persistently on the mobile device by writing files or other data into the flash memory or other persistent storage on the device. Most mobile platforms will segregate persistent data recorded by applications into private application sandboxes. However this sandboxing is trivially defeated with common tools capable of rooting or jail-breaking the device. Rooting and jail-breaking are techniques that seek to replace parts of the mobile device operating system platform often with goal of defeating app sandboxing, app integrity checks, and other OS provided security mechanisms. Rootkits and jail-breaking software for most popular mobile platforms are readily available on the public Internet and easy to use. Since rooting and jail-breaking are so easy to accomplish, most enterprises do not wish to rely on mobile device OS enforced sandbox as the only means of protecting data that an application may need to persist.

Some mobile device platforms additionally allow information to be encrypted in its persistent form and some applications do take advantage of these features. Invariably, such encryption mechanisms rely on the encryption keys being held on the device itself with the keys themselves protected by a user supplied PIN or passcode. The fact that the keys are held on the device and protected by weak cryptographic factors means that the data is not particularly well protected from hacking, particularly if a device is stolen and hacker has ample time to try to unlock the keys. Also, since the keys are in possession of the device holder, an enterprise is powerless to remove them or revoke access for a terminated employee unless they can recover the device.

Another issue with app sandboxing that occurs on mobile platforms is that it is problematic to have a single repository of documents that are available to all managed applications on the mobile device and potentially synced offline to cloud based storage. Mobile applications work around the sandbox limits in various ways, all of which have drawbacks. Often, they will exchange files of certain fixed types with other applications that have registered to accept certain those same types. The drawback here is that one ends up with multiple copies of a particular file in each app's sandbox. If one or more apps wish to edit the file content, keeping track of which app has latest versions is problematic for users.

One can overcome the issue highlighted above if users are trained to always send their modified documents back to a common sync agent application which might also be charged with syncing documents to/from cloud based storage. The Citrix ShareFile® mobile application is an example of an application that permits this sort of data exchange with cloud-based sync. The drawback here is that these extra steps are easy to forget. Also, they are not required when using equivalent desktop applications that operate on the notion of shared documents folders for all applications. These two facts can lead to data file consistency issues and poor user experience if users are not properly trained.

Another approach to this problem is to save the files that one wishes to share into shared storage on those mobile platforms that support this concept. This has the downside that shared storage is world readable and therefore shared with all applications. Once information is placed into shared storage, containment of the information is lost since any application on mobile device can read it. Also the data can trivially be accessed by anyone who gains physical access to the device using standard file viewers and development tools.

The challenges of information containment and sharing of documents between trusted applications that are highlighted above are overcome by introducing the concept of an encrypted file vault. An encrypted file vault is a logical container into which all persistent data read/written by a mobile application (which would otherwise end up in a writeable file in the app sandbox) will be redirected. The contents of the vault are themselves written into file(s) held inside an app sandbox. But the contents of all files and the file metadata itself (name, size, access times, etc.) are all encrypted.

Strong encryption algorithms (e.g. FIPS 140-2 certified) are used to protect all information placed into the vault with keys that are managed by the enterprise rather than the users themselves. Keys would typically be assigned based on a tuple of user, device, and application or app group. That implies that distinct key sets are used each unique combination of user, device, and application/app group. The keys are maintained off device in an enterprise key management server. The keys may be downloaded temporarily to the mobile device to enable data access, but only after strongly authenticating the user, device, and application in question.

An application can certainly be written in such a way that it is aware of the presence of file vault services. Applications written with this awareness can utilize any number of file vaults, which they can identify explicitly with vault name identifiers. However applications will not always be written with such awareness. Correspondingly, administrator defined management policies can be used to configure a default file vault for each application. The default file vault of an application is used for the transparent redirection of all application file I/O that would otherwise end up in a writable portion of the application sandbox or shared storage.

The typical mechanism for assigning apps to a default file vault dictates that the administrator place each configured mobile application into a named security group by management policy. Then all applications that share the same security group inherit the same default file vault. In this manner, applications not only gain the security of the encrypted container for their data, but apps configured with the same default file vault will see a single consistent view of their data shared with other similarly configured file applications.

It should be noted that not all writable areas in the app sandbox are appropriate for sharing with other applications, for example the application's /tmp directory. The implication here is that there is always an app private file vault that would be used to hold certain files and directories. If the app is not configured into a shared group, then all files are redirected to the app private vault. However if an app were configured into shared group, documents and other such files would be redirected to the common vault but files designated for special private directories like /tmp would continue to flow to the app's private vault.

It should also be noted that the notion of a shared file vault does imply the existence of a common broker that manages the shared files on behalf of all applications. Without such a broker, one would not be able to share files transparently. While such a broker could be a network-attached service that does not exist on the mobile device itself, such a design would preclude offline access to the encrypted file vault. For this reason, another application installed on the mobile device will generally serve this role. An EMM client agent like the Citrix client agent mobile application would be the typical host of this shared vault broker.

The above-described technique thus offers the unique combination of transparent file access, strong encryption with keys managed by the enterprise, and dynamic reconfiguration of the vaults by management policy.

Enterprises may create (or adapt) their native mobile applications using tools and SDKs associated with the enterprise mobility management (EMM) solution they have chosen to deploy. In preparing their app for EMM deployment, they certainly have the freedom to (re)write specific application logic to utilize encrypted file vault services exposed by the EMM developer SDK as needed for their application. However, most often, an application will already be written to use standard file system APIs of the platform for which they were developed. As such, it is far more convenient for the application developer if the EMM SDK and tools can transparently redirect these native file access services to one or more file vaults dictated by administrative management policy rather than rewriting their application. This approach also allows an administrator to reconfigure targeted file vaults without directly modifying and recompiling the application.

When taking this approach, the application developer need not worry about the specifics of how to interface with the native file vault services. Instead, by integrating the header files, libraries, and run-time support of the EMM system framework code with the application, all file system APIs called by the application will be redirected to a management policy-aware interception layer. Assuming the encrypted file vault feature is configured, then based on the management policies in force for the current user, device, and app, a set of default file vaults will be selected and the file system API interception layer will be configured to target them.

After preparing the application for the specific EMM system, the managed application is uploaded to the EMM server for the purpose of publishing the application for the enterprise users to consume. As part of this app publishing workflow, an IT administrator will choose management policies and settings that apply to the application and associated user roles. Once uploaded and configured, the applications is made available to organization's employees to peruse and install based on their role within the organization. Alternatively, such applications can be pushed directly to mobile devices for employees who have enrolled their device with a corporate MDM server.

When a user executes a managed application on the mobile device, the user is typically challenged to authenticate their corporate identity along with passwords and other factors as dictated by corporate management policy. After having strongly authenticated the user, device, and application, the access manager components of the system verifies that the user is entitled to the application and downloads the configured management policies for this specific app and user.

Based on those management policies, the EMM framework that is delivered with the managed app configures itself. It will select one or more default file vaults to use and configure the file system API interception layer to target the selected vaults. If a configured file vault does not already exist, a new empty vault is initialized. This ensures that a change in file vault management policies that would select a not-previously-used vault will appear to the application as if it had been recently installed (e.g. empty writable directories).

As the application begins to utilize the file system APIs, the file system API interception layer looks for file accesses that intersect the writable portions of the app sandbox or shared storage. Such files are flagged and tracked by the file system interception layer such that all subsequent file I/O is passed through encryption/decryption before being placed into the real file container that holds the data.

In order to accomplish this encryption, the required keys first need to be recovered. These are retrieved from the key management server and cached locally. If this is the first access to the protected files in a long time, the user will be forced to do a strong authentication by logging on to the EMM server. Periodically these keys will need to be refreshed as dictated by the time to live management policy setting for the keys. When refreshing, as long as user has maintains an active logon with EMM server, this refreshing of keys can occur without user interaction. If user logs off or their logon session expires, then the refreshing of keys will need to be strongly authenticated again.

When the file vault is private to the application, the file vault services layer directly uses the mobile platform's file I/O functions to read and write encrypted version of the data. Also, all file directory access functions are also similarly intercepted such that the real file names and sizes can be obscured.

To support random access to any range of bytes within an encrypted file, a scheme that uses encrypted blocks is may be used. For this to work, the keys used to encrypt/decrypt each of the file block are derived mathematically from base keys and the file/block offset. Similarly, different files will use initialization vectors for the cryptography as well. These techniques represent sound and reasonably standard practices for the encoding encrypted file volumes using a single set of cryptographic keys.

For efficiency, the system may read ahead or delay writing of data to encrypted data content as necessary to optimize application performance. Delayed write of encrypted data must be flushed prior to closing files or exiting the application.

When the file vault is to be shared with another application, the same processes described above are used, but they must occur in a common file system repository under the control of common file system broker application. The implication is that when the file system interception layer is operating on shared file vault, the file vault services will operate not by directly reading/writing encrypted data, but rather by redirected these services via remote procedure call mechanism to the brokering application. Within the brokering application, the same local file vault services used for private vault files are utilized for the shared vault content.

There are certainly other possible designs for implementing shared vaults. For example, one can use shared storage coupled with inter-process synchronization mechanisms to coordinate access. But in any workable design, the key factor to be noted is that same underlying encrypted file vault services are used to encrypt the actual file data regardless of where the encrypted data will be retained or how concurrent access to it coordinated.

By providing strong and transparent file encryption services with keys managed by enterprise servers, security of information held and stored locally by managed mobile applications can be made secure without the need to rewrite applications to use new file access paradigms.

Adding the notion a management policy directed file vault configuration that permits multiple applications to be bound to the same default file vaults further permits secure sharing of documents between properly configured managed applications.

The architecture described in this specification can be used by a corporation or other enterprise to flexibly implement a management policy, such as a corporate owned device, BYOD (bring your own device) management policy, for allowing enterprise users to use their mobile devices to securely access enterprise resources (documents, confidential data, corporate application and database servers, etc.). This is accomplished through various security features that, for example, enable the enterprise to specify and implement management policies for controlling mobile device accesses to particular enterprise resources. The management policies may, for example, control mobile device accesses to enterprise resources based on a variety of criteria, such as the role of the respective user (e.g., which department the user is in), the configuration of the mobile device (e.g., whether any blacklisted mobile applications are installed), the logged behaviors of the user, the location of the mobile device, and/or the time at which access to the enterprise resource is requested. The architecture further enhances security, in some embodiments, by creating application tunnels that enable enterprise mobile applications to securely communicate over a network with the enterprise system. The architecture may also enable IT staff to selectively (and remotely) wipe a user's mobile device of enterprise application(s) and corporate data when, for example, the user discontinues employment or violates a corporate management policy (such as if they jailbreak their device or otherwise use it in a disallowed configuration).

The use of passcodes (or other types of authentication information) for enterprise applications reduces the likelihood that enterprise resources will be improperly accessed when, for example, the mobile device is lost or stolen, or when the mobile device is used by an employee's children to play games. In some embodiments, the secure launcher (or another component installed on the mobile device) further reduces this risk by performing a selective wipe of the mobile device when, for example, the user attempts but fails to enter a valid passcode a threshold number of consecutive times (e.g., 5 or 10). The selective wipe operation deletes some or all of the enterprise applications and associated data from the mobile device, without deleting any personal applications or data. In some embodiments, the enterprise's IT department can initiate a selective wipe of a particular mobile device by remotely issuing a wipe command to the device.

In some embodiments, when a selective wipe operation is performed, some or all of the documents and data stored in the secure container are deleted from the mobile device or are otherwise made inaccessible.

In another example, a meta-application can be configured to create gateway rules based at least partly on the time(s) at which a mobile device was "wiped" (e.g., deletion of some or all data stored on the device or removal of software application(s) from the device).

A system and process will now be described for enabling non-developers, such as members of a company's IT department, to add to or otherwise modify the behaviors of an existing mobile application, such as an Android, iOS, or Windows Mobile application. The system and process can be used, as one example, to create different versions of a mobile application (with different privileges, access rights, etc.) based on a user's role within the enterprise. For instance, different versions of the mobile application can be created for different job categories (e.g., executive, non-executive employee, intern, etc.) and/or different departments (sales, IT, human resources, etc.). The processes described in this section can be implemented in an application modification or "wrapping" tool or utility that is made available to enterprises that use the disclosed system. This utility may, for example, be hosted on a server (e.g., as a web service) that is accessible to enterprises, or may be provided to the enterprises (e.g., as a PC application).

In a typical use case scenario, the mobile application to be modified is a custom application developed for a particular enterprise. However, this need not be the case. For example, the disclosed system and process are also applicable to commercially available mobile applications available in app stores. The mobile applications can be modified without being specially written to support or enable such modifications. For example, the developer need not include any special code or functionality in the application to enable or facilitate the modifications, and need not be involved in the disclosed process of modifying the application.

The behaviors that are modified typically include or consist of behaviors that involve standard API calls or classes. The following are examples of some of the types of behaviors that can be added or modified via the disclosed process:

A mobile application can be modified to enable an enterprise to remotely initiate deletion of the application's data on a particular mobile device of a particular employee, without affecting other users of the application. As mentioned above, such selective wipe operations may also be executed when, for example, a user fails to enter a valid enterprise passcode a threshold number of times.

Additional code may be added, if applicable, to implement one or more features or behaviors that do not require the replacement of any existing API calls. As one example, code may be added for enabling an authorized administrator to remotely trigger the deletion, on a user-specific or mobile device specific basis, of the application's data stored on a particular mobile device. In this example, the code added would add functionality for receiving and processing a message containing a command to perform such a selective wipe or deletion operation.

Single Sign-on Access and Identity Management

Figure 28:
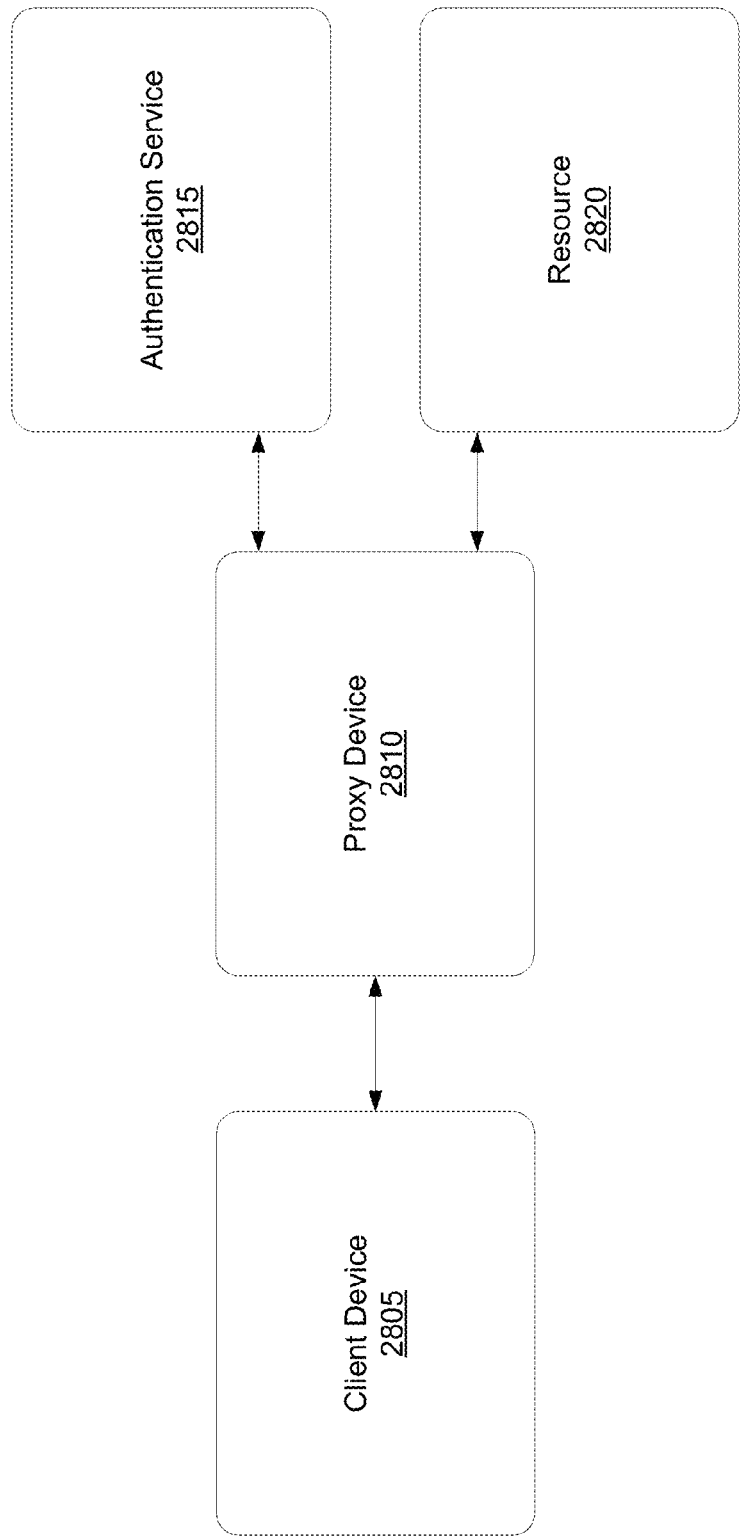
FIG. 28 depicts an illustrative system having a client, a proxy, resource(s), and/or authentication service(s).
Figure 29:
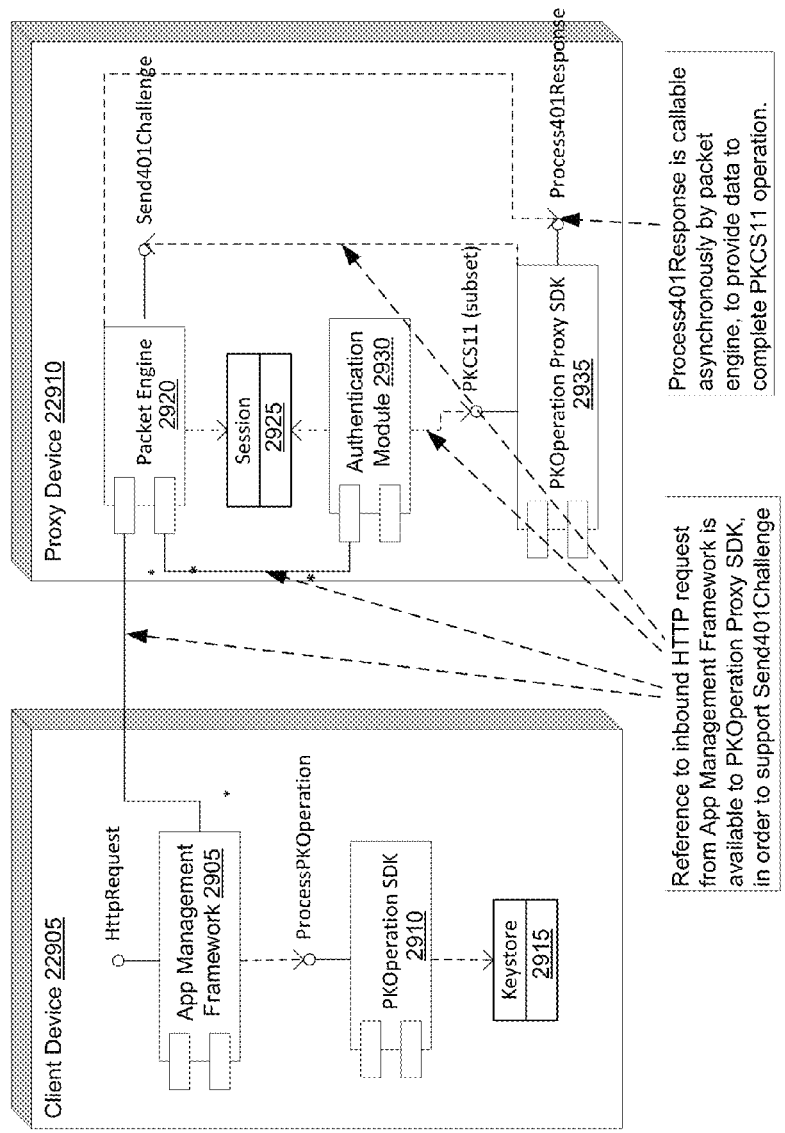
FIG. 29 depicts an illustrative detailed view of a client and a proxy.

FIG. 28 depicts an illustrative system having a client device 2805, a proxy device 2810, resource(s) 2820, and/or authentication service(s) 2815. FIG. 29 depicts an illustrative detailed view of the client device 2805 and proxy device 2810. These elements may implement one or more aspects described herein. A brief summary of these aspects will now be provided, with additional examples provided below. The client device 2805 may communicate with one or more resources 2820 and/or authentication services 2815 using a proxy device 2810. In some aspects, the client device 2805 might not be configured to communicate directly with the resources 2820 and/or authentication services 2815. For example, the client device 2805 and resources 2820 may use different authentication and/or communication protocols. The proxy device 2810 may translate between these different protocols. Additionally or alternatively, the proxy device 2810 may provide additional benefits, as will be described in the examples below.

The client device 2805 may send a request for resources 2820, such as documents, emails, services, files, and the like, to the proxy device 2810. The proxy device 2810 may forward the request to the resource 2820, and in response, authentication between the proxy device 2810 and resource 2820 may be initiated. At one or more points during the authentication, the resource 2820 may request a signature, such as from a client certificate. The proxy device 2810 might not directly have access to the client certificate, so the proxy device 2810 may involve the client device 2805 in the authentication process, such as if the client device 2805 controls access to the client certificate. For example, the proxy device 2810 may request that the client device 2805 sign or decrypt an authentication message using the client certificate (or a private key included therein), or return a list of available security certificates or a selection by the user of a particular security certificate.

The proxy device 2810 may provide the client device 2805 with context information that identifies the authentication session between the proxy device 2810 and the resource/authentication server. For example and as will be described in further detail in the examples below, the context information may identify a data structure of authentication information exchanged (or to be exchanged) between the proxy device 2810 and resource 2820 and/or the proxy device 2810 and the authentication service 2815. The client device 2805 may use the context information to verify or otherwise confirm the authentication session between the proxy device 2810 and the resource/authentication server. Once the context information is verified, the client device 2805 may provide the requested signature to the proxy device 2810, and the proxy device 2810 may complete authentication with the resource 2820 and/or the authentication service 2815. Then, the proxy device 2810 may retrieve the resource requested by the client device 2805 and provide it to the client device 2805.

The client device 2805 may comprise any of an end point device, client computers 107 or 109, terminals 240, client computers 411-414, mobile device 502, mobile device 602, or any other device. For example, the mobile device may comprise any of a smartphone, a tablet, and the like. One or more applications may be running on the client device 2805. An application may desire to access a protected resource, such as an enterprise resource, and a module included in the application (or other applications) may facilitate access to those protected resources. For example and with reference to FIG. 29, an application running on the client device 2805 may send a request for a resource (e.g., an HTTP request) to MAMP Framework 2905, which may facilitate communications with the proxy device 2810. In some aspects, the MAMP Framework 2905 may run as a privileged application on the client device 2805. The MAMP Framework 2905 may comprise all of or a portion of the functionalities provided by the MAMP framework 614, as previously described.

The client device 2805 may also have a PKOperation SDK module 2910 that facilitates access to a keystore 2915 that stores one or more client certificates that may be used to sign for authentication purposes. For example, the client device 2805 may authorize access to or have possession of client certificate representing the user of the client device 2805. In some aspects, the certificate may be an enterprise-issued certificate. The certificate may be bound to a physical smart card having a cryptographic module. In other words, the cryptographic secret may be confined to the smart card. The user may authorize the client device 2805 to access the smart card protected certificate. Alternatively, the certificate may be bound to a virtual smart card, which may use hardware and/or software modules to protect the key. The client device 2805 and/or a removable hardware module of the client device 2805 may be authorized by a provisioning process to store the certificate and private key. The user may be required to enter a PIN code using the client device 2805 to authorize operations involving the client certificate private key. Another external device separate from the client device 2805 (e.g., another smartphone) may control the certificate, and the client device 2805 may utilize a custom reader interface to access the certificate controlled by the external device.

In some embodiments, the client certificate and/or private key might be confined to the client device 2805 or to a physical smart card. Accordingly, the client device 2805 may maintain control of the key. If authentication using the key is required, the client device 2805 may need to be involved in the authentication process. This allows the client device 2805 to have assurance that operations performed with the certificate private key are ones that the client device 2805 intended. Some organizations may use smart cards to achieve non-repudiation for certain operations, which may require users to have authority over all uses of a certificate issued by the organization. For example, document signing may require explicit user authority, whereas authentication to certain systems might not require explicit user authority. Suitable mechanism(s) for providing such assurance may depend on the nature of the resource being accessed, the proxy device involved, and how the client device 2805 operates.

The proxy device 2810 may comprise one or more of a server (e.g., servers 201, 206, 301, 410), computing device, access gateway 560, gateway server 606, or any other device. The proxy device 2810 may facilitate communications between the client device 2805 and enterprise resources or other networks. For example, a user of the client device 2805 may wish to access enterprise resources that require authentication, and the proxy device 2810 may mediate access. The client device 2805 may use the proxy device 2810 to access resource if, for example, the client device 2805 is not able to directly access the resources. For example, the client device 2805 might not be configured for a protocol utilized by the enterprise resources. In some aspects, the enterprise resource may implement Kerberos with PKINIT for authentication, but the client device 2805 might not implement Kerberos with PKINIT. Similarly, the enterprise resource may implement SSL with client certificate authentication, but the client device 2805 might not implement SSL with client certificate authentication. Instead, the client device 2805 and proxy device 2810 may communicate using a protocol having standard components and fitting well-known authentication frameworks. The proxy device 2810 may translate between a first protocol to the resource (e.g., Kerberos or SSL) and a second, different protocol to the client device 2805 (e.g., HTTP or HTTPS). By utilizing the proxy device 2810, client devices might not need to understand and operate a complex or different protocol used by the enterprise resource. In these examples, the proxy device 2810 may play the client role. However, the proxy device 2810 might not have control of the client certificate private key.

The proxy device 2810 may be used to facilitate access to resources in other circumstances, such as if the client device 2805 is not permitted to directly access the resources, if access capabilities of the client device 2805 are limited, and/or if the proxy device 2810 enhances access by improving performance or offering a preferable interface. The proxy device 2810 may also facilitate enhanced security. For example, Kerberos resource authentication may require obtaining service tickets from Kerberos KDCs (e.g., Active Directory domain controllers). However, the KDCs themselves may comprise sensitive enterprise resources that should not be directly accessible to some client devices. For these cases, Kerberos authentication may require use of a trusted proxy device 2810. As another example, the proxy device 2810 may be a hardened communication gateway deployed in the DMZ network of an enterprise. To provide extra security benefits, the proxy device 2810 may be able to inspect communications being proxied to enterprise resources, rather than allowing a transparent end to end communication flow between the client device 2805 and the enterprise resources as if the proxy device 2810 were not present. That is, the proxy device 2810 may have knowledge of what resources the client device 2805 is using and the protocols the client device 2805 utilizes. As will be discussed in further detail in the examples below, the proxy device 2810 may also provide, to the client device 2805, context information that identifies one or more aspects of the authentication session between the proxy device 2810 and an authentication service 2815 and/or resource 2820. The client device 2805 may use this context information to determine whether or not to sign data provided by the proxy device 2810 that requires a signature.

With reference to FIG. 29, the proxy device 2810 may include a packet engine 2920, which may be a hardware module and/or software module. The packet engine 2920 may facilitate communications with the client device 2805 and/or the resource. The proxy device 2810 may also include a session cache 2925. As will be described in further in the examples below, the session cache 2925 may store a session key and/or ticket (e.g., for Kerberos sessions) to enable communications between the proxy device 2810 and one or more resources or servers storing the resources. The proxy device 2810 may include a client-side authentication module 2930 configured to manage authentication with the client device 2805, such as obtaining a signature from the client device 2805. For Kerberos authentication, the client-side authentication module 2930 may comprise a PKINIT module (which may be referred to as a likewise daemon) that implements the client side of the public key form of the Kerberos authentication protocol (e.g., a PKINIT protocol). For example, this could be the kinit command line program that is available from open source implementations of Kerberos.

The proxy device 2810 may also include a library module 2935 (e.g., a PKOperation Proxy SDK 2935) used by the client-side authentication module 2930 to abstract details for accessing the client certificate private key. For Kerberos, a PKOperation Proxy SDK 2935 that implements a PKCS#11 API specification for accessing client certificates bound to smart cards may be used. The PKOperation Proxy SDK 2935 may implement portions of PKCS#11 and package the relevant certificate operations into a form that can be remoted to the client device 2805. By using the PKCS#11 API, the Kerberos implementation, which may comprise a standard Kerberos implementation, such as MIT, need not be modified. This makes it easier to maintain the Kerberos product, such as if security fixes are made to the product. The packet engine 2920, session cache 2925, client-side authentication module 2930, and PKOperation Proxy SDK 2935 may comprise hardware and/or software modules, and the operations that they may perform will be described in further detail in the examples below. In some aspects, the proxy device 2810 may comprise one or more processor and memory storing computer-executable instructions that, when executed by the processor, cause the proxy device 2810 to provide the packet engine 2920, session cache 2925, client-side authentication module 2930, and PKOperation Proxy SDK 2935 and/or to perform the operations of the packet engine 2920, session cache 2925, client-side authentication module 2930, and PKOperation Proxy SDK 2935.

The client device 2805 and the proxy device 2810 may communicate using a standard framework, such as an HTTP framework. In some aspects and as will be described in the examples below, the client device 2805 and proxy device 2810 may exchange one or more authentication messages. They may exchange HTTP status codes, such as HTTP 401 codes for requesting authentication, and/or challenge-response messages. In some embodiments, if the client device 2805 which receives a 401 authentication challenge does not support secured exchange of client private certificates, the client device 2805 may recognize the 401 message as an authentication challenge that the client device 2805 does not understand. The client device 2805 may react with the appropriate error handling behavior, such as displaying a message to the user that an operation could not be completed because the client device 2805 does not support secured exchange of client private certificates. The HTTP level encoding to support public key operation remoting may be relatively simple. The Packet Engine 2920 and the MAMP Framework 2905 may process the HTTP level encoding. Communications may be structure similar to the HTTP Negotiate authentication scheme described in RFC 4559, which is incorporated herein by reference in its entirety. Base64 encoded blobs may be exchanged back and forth between the client device and proxy device using WWW-Authenticate and/or Authorization headers. The blobs may be generated and processed at each device by the respective PKOperation SDKs (810, 2935).

In some embodiments, components in the communication path between the client device 2805 and the proxy device 2810 that are HTTP aware might not interface with the authentication process. For example, an HTTP proxy server between the client device 2805 and the proxy device 2810 may be aware that the connection to the proxy device 2810 should not be reused to send requests from other client devices and/or users. Furthermore, caching of any HTTP data returned from the proxy device 2810 should be correctly scoped so that the data is not sent to another client device.

In some aspects, authentication between the client device 2805 and proxy device 2810 may utilize a standard authentication framework, such as web authentication or Generic Security Services Application Program Interface (GSSAPI) with a custom mechanism. Objects may be transmitted from the proxy device 2810 to the client device 2805. The client device 2805 may process the objects and validate them by standard cryptographic mechanisms, such as certificate path validation with a name check.

A specialized communication channel between the client device 2805 and proxy device 2810 may be created. For example, the specialized communication channel may be used to relay certificate operation requests and results. Utilizing the specialized communication channel may provide extra cryptographic protection beyond that provided by a standard SSL channel between the client device 2805 and the proxy device 2810. This may be appropriate given the sensitivity of the inputs and outputs of the cryptographic operations being remoted. In some examples, a Diffie-Hellman key exchange between the client device 2805 and the proxy device 2810 may occur. The exchange may provide mutual authentication between client device 2805 and proxy device 2810. In some embodiments, mutual authentication may already have been established prior to a resource access request by the client device 2805. Channel binding, as described in RFC5929, which is hereby incorporated by reference in its entirety, may be used to cryptographically link the specialized communication channel to an outer SSL session. With brief reference to FIG. 29, setting up the specialized communication channel for data, such as PK operation payloads, may utilize multiple exchanges between the client device 2805 and the Packet Engine 2920. This may be opaque to everything except the PKOperation SDK 2910 and PKOperation Proxy SDK 2935.

One reason for providing extra protection via the specialized communication channel is that SSL, in practice, may be terminated by a networking device, such as an offload device, in front of the proxy device 2810. Offload devices may be optimized for SSL connection processing, such as by using specialized hardware for accelerating CPU intensive operations involved in SSL connections. The hardware module may also be certified to meet commercially important cryptographic processing standards, such as the Federal Information Processing Standard (e.g., FIPS-140). Another reason for providing extra protection is that an inspection device may be given access to the SSL certificate key in order to decode communications. The inspection device may comprise a security device designed to monitor network traffic for compliance with security management policies, such as by detecting attempts to send confidential information outside of a trusted network zone, or attempts to communicate with untrusted or unauthorized servers. Some of these inspection devices may be configured to impersonate other servers during SSL connection handshakes, in order to prevent the inspection process from being foiled by the use of encrypted communication channels. Using the specialized communication channel may prevent unnecessary and/or inappropriate exposure of sensitive data to the offload device and/or inspection device. Accordingly, non-repudiation properties expected from using smart card equivalent client certificates may be protected. For example, the specialized communication channel may prevent the data to be signed from being modified by external devices and/or leaks of decrypted data.

The specialized communication channel may be implemented in many ways. For example and as previously noted, a custom GSSAPI mechanism operating inside a standard HTTP authentication protocol may be utilized. This implementation provides several non-exclusive benefits. First, the proxy device 2810 may indicates to the client device 2805 in a standard way (e.g., HTTP) that authentication to a resource and/or authentication server is required to complete the requested resource access. Second, an arbitrary binary protocol may be conducted between the client device 2805 and the proxy device 2810, with multiple rounds if necessary. Third, the implementation allows for secure communication mechanisms to be negotiated and applied to transfer data in a standard way (e.g., at the GSSAPI level). In some implementations, the custom GSSAPI mechanism operating inside a standard HTTP authentication protocol can also allow for a platform implementation of GSSAPI to be used with a custom mechanism being added, such as the MICROSOFT NegoEx mechanism.

Referring to FIG. 28, one or more authentication service 2815 (or server running the authentication service 2815) may exist. Authentication service 2815 may implement one or more types of authentication, including Kerberos or SSL. The aspects described herein may be implemented for any authentication protocol that involves client certificate private key operations. For example, for Kerberos, the authentication server may be tasked with issuing tickets, including ticket granting tickets and/or session tickets. The authentication server may communicate with the proxy device 2810 over one or more channels. Furthermore, the one or more channels may use a communication protocol different from the communication protocol used by the client device 2805 to communicate with the proxy device 2810. In some aspects, the authentication services 2815 might remain unchanged, even with implementation of the aspects described herein. In other words, the authentication services 2815 may exist in a traditional infrastructure. The authentication services 2815 may include, for example, the authentication services 558 noted above.

One or more resources 2820 (or servers storing the resources 2820) may exist. The resource 2820 may communicate with the proxy device 2810 using one or more of the same or different protocols as the authentication server uses to communicate with the proxy device 2810. In some aspects, the resources might remain unchanged, even with implementation of the aspects described herein. In other words, the resources may exist in a traditional infrastructure. Non-limiting examples of resources may include, but are not limited to, file resources, web resources, mail resources, Sharepoint resources, and the like. These resources may include Structure Query Language (SQL) databases, remote procedure call (RPC) servers, Distributed Component Object Module (DCOM) servers, Simple Object Access Protocol (SOAP) web services, Representational State Transfer (REST) web services, and other proprietary resources that may use GSSAPI or a similar security framework for authentication. One or more of these resources may be directly accessed by internal devices, such as computers on the same network as the resources or in another protected network. The resources may comprise the enterprise resources 504, 508, and/or 608 and/or the enterprise services 508 and/or 609 noted above. Furthermore, the resources may be stored on one or more servers, such as servers 206 illustrated in FIG. 2. The resources may be accessed through a multi-tier system. The proxy device 2810 may communicate with a front-end server that may in turn communicate (and authenticate as a requesting user) with a back-end server. Kerberos with unconstrained delegation may be used for this type of system, and the proxy device 2810 may supply a forwarded TGT for the user to the front-end server.

Figure 30A:
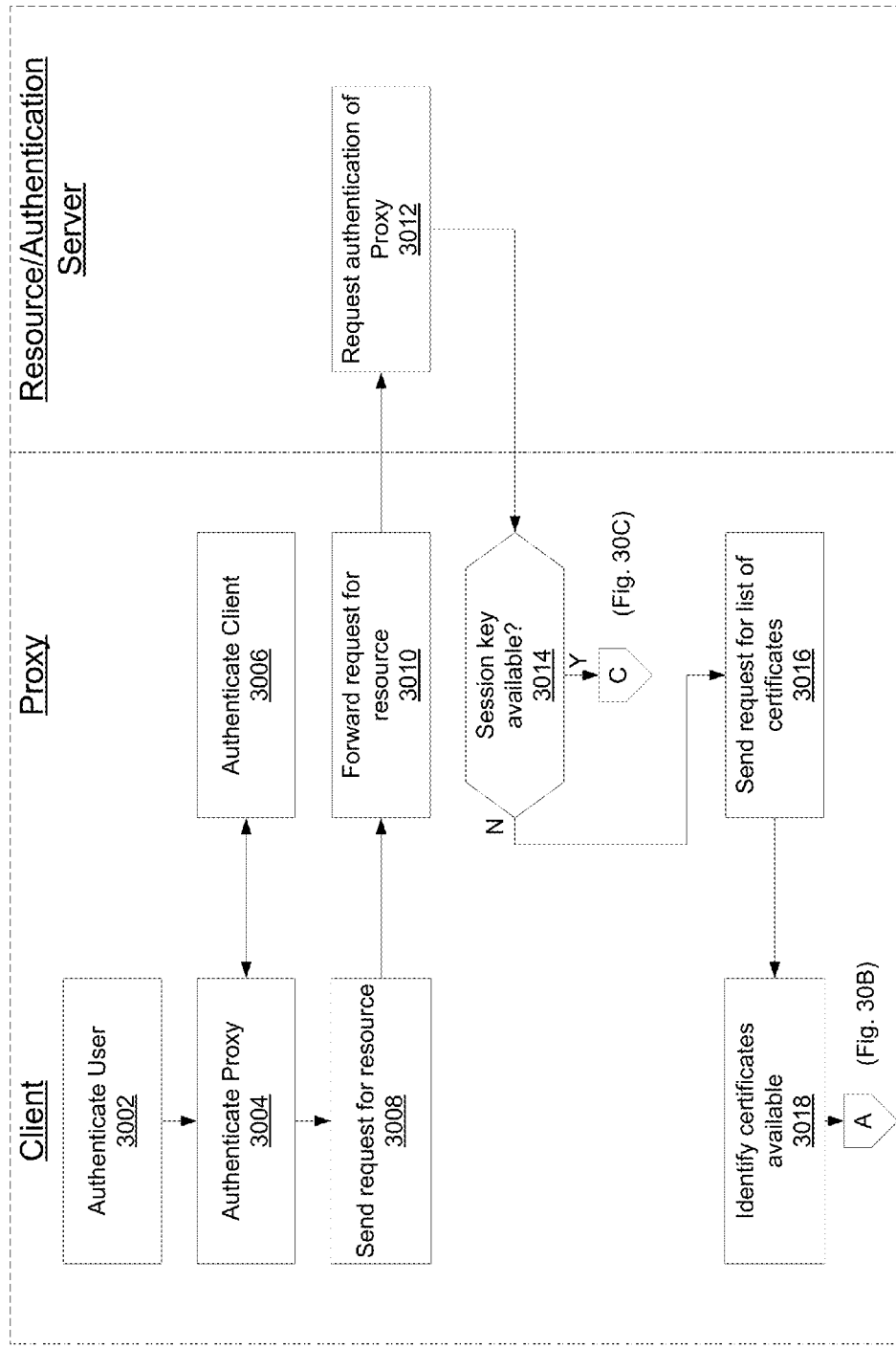
FIG. 30A is a flowchart of example method steps for authentication and/or providing secured access to resources using a proxy.
Figure 30B:
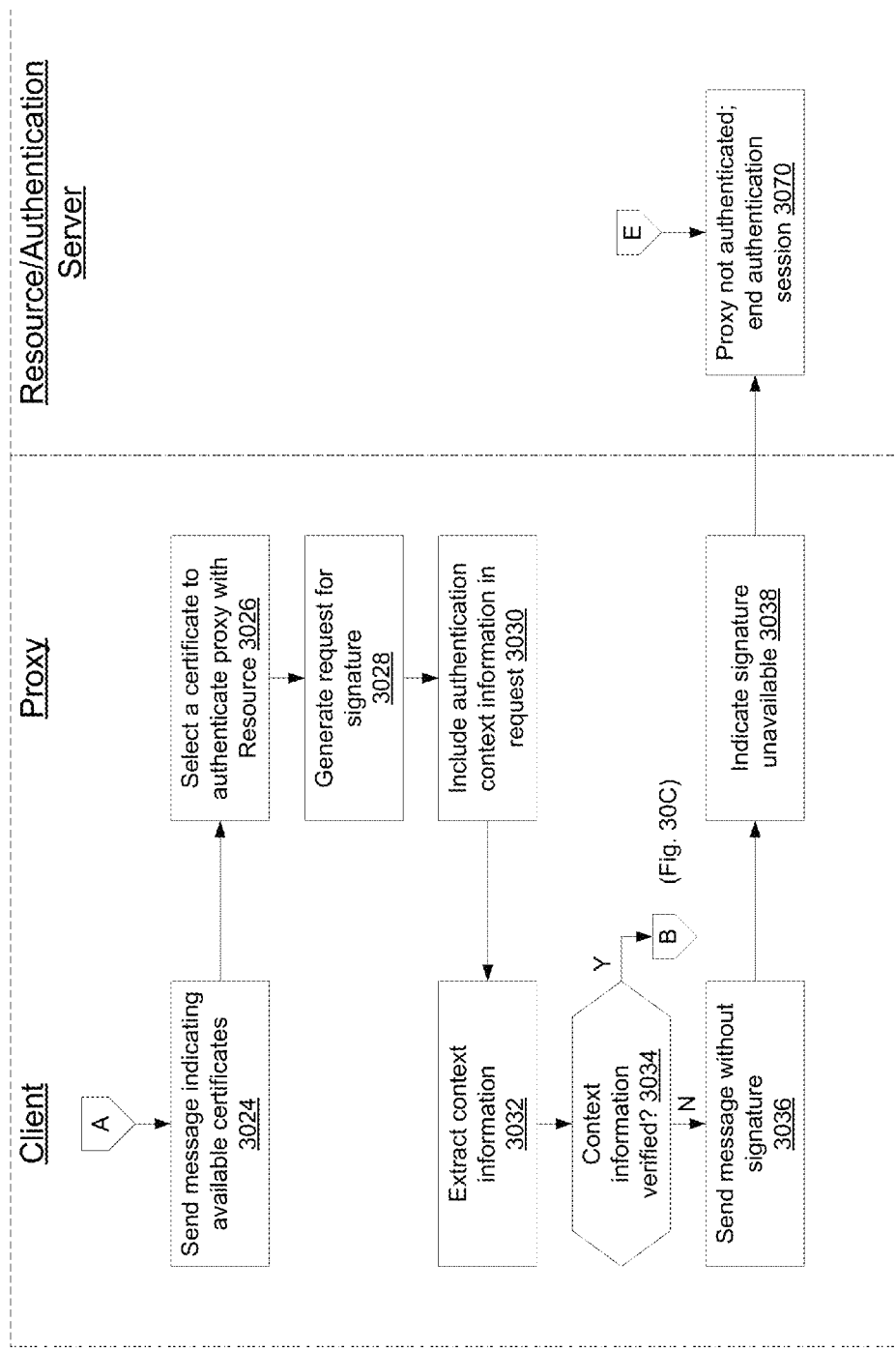
FIG. 30B is a flowchart of additional example method steps for authentication and/or providing secured access to resources using a proxy.
Figure 30C:
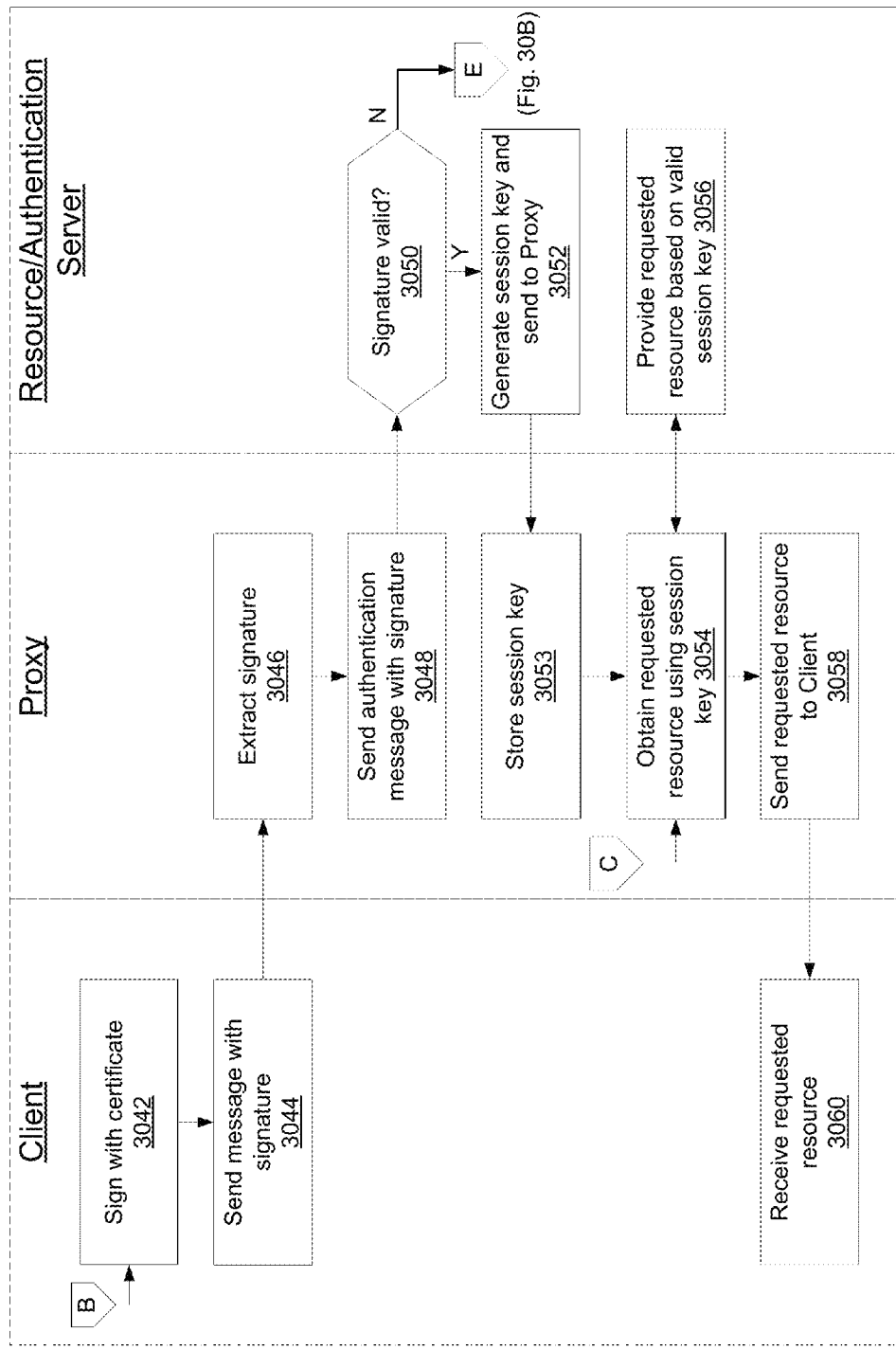
FIG. 30C is a flowchart of yet additional example method steps for authentication and/or providing secured access to resources using a proxy.

FIGS. 30A-C are flowcharts of example method steps for authentication and/or providing secured access to resources using a proxy. FIGS. 30A-C illustrate each step being performed by one of the client device 2805, proxy device 2810, authentication service(s) 2815, and/or resource(s) 2820. However, the method steps may be performed by any of the client device 2805, proxy device 2810, authentication service(s) 2815, resource(s) 2820, and/or a combination thereof. As previously noted, the resources 2820 and authentication services 2815 may be provided by the same server (or group of servers). Alternatively, the resources 2820 and authentication services 2815 may be provided by different servers (or group of servers). For simplicity, some of the method steps are illustrated in FIGS. 30A-C as being performed by a single resource/authentication service entity (e.g., a server or group of servers). However, the authentication services may be provided by an authentication server (or groups of authentication servers) and the resources may be provided by a different server (or group of servers).

In step 3002, the user may be authenticated with the client device 2805. For example, the user may provide credentials, such as a username and/or password, to login to the client device 2805.

In step 3004, the client device 2805 may authenticate the proxy device 2810. Additionally or alternatively, in step 3006, the proxy device 2810 may authenticate the client device 2805. In other words, the client device 2805 and proxy device may perform mutual authentication. To perform the authentication, the client device 2805 may connect to the proxy device 2810 using SSL with server authentication. The proxy device 2810 may request the client device 2805 and/or the user of the client device 2805 to authenticate to the proxy device 2810 before authorizing access to the proxy device 2810. In some aspects, the client device 2805 may use an enterprise client certificate for this authentication. The enterprise client certificate may be the same certificate used by the client device 2805 to sign documents and/or authentication messages, as will be described in further detail in the examples below. Alternatively, the enterprise client certificate may comprise a different certificate. For example, the client device 2805 may have multiple certificates, each used for a different purpose. If a physical smart card is used, the multiple certificates may be stored on the smart card or different smart cards.

Similarly, the client device 2805 may request authentication of the proxy device 2810 to establish that the proxy device 2810 is a known trusted entity and may request identification of resources to which the user is being authenticated by means of delegated authentication through the proxy. The client device 2805 may also authenticate the user of the client device 2805 to the proxy device 2810, for instance using the client certificate available to the device as part of the SSL handshake, or by running a separate user authentication protocol inside the SSL connection, for instance over HTTP. Resources 2820 may also wish to know that access to the resources 2820 is being mediated by the proxy device 2810, such as by using a resource access protocol. Thus, mutual authentication or identification may be performed for all three entities, the client device 2805/user, the proxy device 2810, and the resources 2820.

After authentication and/or identification of one or more of the three entities, the client device 2805 may send a request to the proxy device 2810 for one or more resources, such as web resources, enterprise resources (e.g., from a network file server), or other resources, that can be accessed by the proxy device 2810 but that may require user authentication based on a client certificate. The request for a resource may be sent by the client device 2805 over HTTP, HTTPS, or any other access protocol supported by the client device. The proxy device 2810 may translate or bridge from the access protocol used by the client device 2805 (e.g., HTTP or HTTPS) to the access protocol used by the resource. After translation, the proxy device 2810 may forward the request to the resource and/or authentication service in step 3010 or otherwise attempt to access the requested resource.

In step 3012, the resource may request authentication from the proxy device 2810. For example, the resource may indicate the type of authentication to be performed (e.g., SSL, a domain-based authentication, such as Kerberos, etc.). Based on the type of authentication, the resource may send an authentication challenge (e.g., a 401 Negotiate message for Kerberos authentication or a client certificate challenge for SSL authentication). For Kerberos authentication, a PKINIT protocol may be used, and the proxy device 2810 may perform the role of the client in the PKINIT protocol to authenticate the user identified by the client certificate to the Kerberos realm (e.g., a MICROSOFT Active Directory domain). The resource server may generate a Kerberos authentication challenge, such as HTTP 401 Negotiate. For SSL authentication (e.g., using a client certificate), the proxy device 2810 may represent to the resource that the proxy device 2810 has access to the user's client certificate and/or key. The proxy device 2810 may attempt to authenticate directly with the resource instead of with a particular domain, as in Kerberos authentication. Additionally or alternatively, the proxy device 2810 may be aware that authentication is required before attempting to access the requested resource. In either case, the proxy may determine and initiate the relevant authentication protocol interactions with the resource. These interactions may involve additional entities such as an authentication server running an authentication service trusted by the resource.

In step 3014, the proxy device 2810 may determine whether a session key that can be used to initiate a secured communication session with the resource (or a server having the resource) is available. A session key may have previously been obtained by the proxy device 2810 based on a prior authentication session with the resource or authentication service and stored (e.g., cached) at the proxy device. For Kerberos authentication, the session key may be stored with a Kerberos ticket, such as a ticket granting ticket (TGT) or other time-limited ticket. With reference to FIG. 29 and for Kerberos authentication, the Packet Engine 2920 of the proxy device 2810 may invoke its Kerberos authentication response logic, which checks to see if there is already a service ticket for the resource (e.g., a web resource) in the session cache 2925. In some aspects, the client-side authentication module 2930, in response to the check, may invoke PKINIT if the proxy device 2810 knows that client certificate authentication is required and/or supported. For SSL authentication, the session key may be used to resume a previous SSL connection, such an SSL session. If a session key (and/or ticket) is available (step 3014: Y), the proxy device 2810 may continue to step 3054 (obtain requested resource) using the session key (and/or ticket), as will be described in further detail in the examples below.

For a first time authentication, the session cache may be empty (e.g., not store a valid session key and/or ticket) (step 3014: N). Thus, the proxy device 2810 may initiate authentication with the resource. With reference to FIG. 29 and for Kerberos authentication, the Packet engine 2920 may issue an internal PKINIT command to the client-side authentication module to obtain a TGT. In order to authenticate, the proxy device 2810 may determine that it needs one or more client certificates and/or signatures based on a client certificate accessible by the client device 2805. These certificates and/or signatures might not be directly accessible by the proxy device 2810. With reference to FIG. 29, the client-side authentication module 2930 may send a command, such as an internal P11 get certificates command, to PKOperation Proxy SDK 2935 to obtain certificates from the client device 2805. The client-side authentication module 2930 may incorporate a Kerberos client implementation, which supports a public-key cryptography standard (PKCS), such as the standard PKCS#11 library interface as a way to look for suitable client certificates for PKINIT. The PKOperation Proxy SDK 2935 may implement the relevant subset of the PKCS#11 API functions to support the PKINIT feature.

In step 3016, the proxy device 2810 may send the request to the client device 2805 for a list of certificates available and/or accessible to the client device 2805. The request may be encoded into an HTTP header. For example, the request may be encoded in a 401 status code in HTTP indicating that an authentication is required and challenging the client device 2805 for authentication. With reference to FIG. 29, the Proxy SDK 2935 may require a custom interface to the Packet Engine 2920 which the Proxy SDK 2935 may use to have certificate requests (e.g., PK operation requests) sent to the client device 2805 and to receive the results if the client device 2805 responds to the request. If the certificate requests need to be remoted, the Proxy SDK 2935 may encode the request into a binary structure (having encryption/integrity wrappers as appropriate), and submit to the Packet Engine 2920. The Packet Engine 2920 may causes an HTTP 401 response with a custom authentication challenge to be sent to the client device 2805 in response to the initial HTTP request, containing the binary structure encoded in a WWW-Authentication header.

In some aspects, the proxy device 2810 might not receive a response responsive to the request for a list of certificates from the client device 2805. In particular, there is no guarantee that the client device 2805 will respond to the certificate (e.g., PK operation) request. For example, the client device 2805 may have crashed or otherwise been unable to respond to the request. Furthermore, the client device 2805 may have attempted to obtain user consent for the operation (e.g., by requesting the user to enter a PIN to unlock the keystore 2915), but consent might be denied. To handle situations where the client device 2805 does not return a list of client certificates, the proxy device 2810 (such as the Proxy SDK 2935 component) may use a timeout to eventually abandon the certificate request operation. The proxy device 2810 may return a suitable error code in these circumstances. During PKINIT logon, several PK operations may be sent to the device, until the PKINIT logon succeeds, fails or is abandoned or the timeout lapses.

In step 3018, the client device 2805 may receive the certificate list request from the proxy device 2810 and, in response, identify the certificates available or otherwise accessible to the client device 2805. For example and with reference to FIG. 29, the MAMP framework 2905 of the client device 2805 may receive the message (e.g., an HTTP 401 request) having a custom authentication challenge from the proxy device 2810. Recognizing it as a certificate request (e.g., a PK operation 'authentication' protocol), the MAMP framework 2905 may decode the message from the received header format and pass a binary structure of the message to the PKOperation SDK 2910. The PKOperation SDK 2910 may have knowledge of the available client certificate(s). As previously noted, the client certificates may be in the form of a physical smart card, a virtual smart card, and the like. The PKOperation SDK 2910 may decode the request (including processing any encryption/integrity wrappers), and dispatch it to an appropriate internal handler. The handler may process the request and generate a list of available certificates. The list of certificates may be filtered according to relevance for the operation being requested, for example, to only include certificates with an appropriate key usage indicator. The list of certificates may be filtered until only one certificate remains. For example, the list may be further filtered by presenting a UI to the user of the client device 2805 to pick the certificate that should be used for the operation. The list may be in a binary structure that represents the operation result. The PKOperation SDK 2910 may return the list of certificates, which may still be in the binary structure, to the MAMP framework 2905 or signal an error condition if the list cannot be generated.

With reference to FIG. 30B, in step 3024, the client device 2805 may send a message including the list of available certificates to the proxy device 2810. In some aspects, the message may be sent as an HTTP or HTTPS message. For example, the MAMP framework 2905 may replay the original HTTP request from the proxy device, but use a custom Authorization header attached to the request which includes the list of available certificates. Prior to sending, the message may be sealed in the encryption/integrity wrapper and/or encoded to fit an HTTP header.

In step 3026, the proxy device 2810 may receive the message from the client device 2805 (and decrypt/decode if necessary). With reference to FIG. 29, the Packet Engine 2920 may recognize that the HTTP request received from the client device 2805 is a resend of the original certificate request sent by the proxy device 2910. The Packet Engine 2920 may submit a binary structure of data from the Authorization header to the Proxy SDK 2935 via the client-side authentication module 2930. The Proxy SDK 2935 may unpack the binary structure (including the encryption/integrity wrapper) and return the unpacked data to the client-side authentication module 2930. Next, the proxy device 2810 may select a certificate (from the list of certificates) to use to authenticate the proxy device 2810 with the resource/authentication server, such as a certificate that is suitable for the authentication session (i.e., to authenticate the proxy device 2810 with the resource/authentication server). In some embodiments, the Kerberos and SSL standards may specify the key usage(s) that are expected or required. For example, if the authentication session comprises Kerberos authentication, the proxy device 2810 may need to obtain Kerberos tickets and can select the certificate suitable to obtain Kerberos tickets. If the client device 2805 returned multiple certificates in step 3024, the proxy device 2810 may send a selection request to the client device seeking user input to select from a list of certificates.

The proxy device 2810 and resource may continue exchanging messages during the authentication session. At one or more points during the authentication session, the proxy device 2810 may be required to perform a cryptographic operation with a signature, such as a private key, of the client device 2805. The private key might not be directly available to the proxy device 2810. Instead, the private key may remain under the control of the client device 2805 and not exposed directly to the proxy device 2810. The proxy device 2810 may interact with the client device 2805 over a specialized communication channel to obtain a signature (e.g., the private key).

In step 3028, the proxy device 2810 may generate a request for a signature corresponding to the selected certificate from the client device 2805. The proxy device 2810 may also generate a piece of data to be signed. For Kerberos authentication, the piece of data may comprise an authentication service request (AS_REQ) message using the selected certificate. The AS_REQ message may optionally be included with the request for signature to be sent to the client device 2805. The proxy device 2810 may send an unsigned AS_REQ message to the client device 2805 if the client device needs to ascertain the full details of the authentication context before providing a signature. The proxy device 2810 might not send the AS_REQ message to the client device 2805 if the communication protocol between the client and proxy devices and/or the Kerberos authentication implementation do not support sending the AS_REQ message to the client device 2805. As will be discussed in the examples below, the proxy device 2810 may send a signed AS_REQ message to the authentication service 2815 and/or resource 2820 for authentication once it has been signed by the client device 2805.

In step 3030, the proxy device 2810 may determine authentication context information to be included in the request for signature. In some aspects, the context information might not be limited by size or format. For example, the proxy device 2810 may send the context information as a Binary Large Object (BLOB). Generally, the context information may comprise information that identifies the authentication session between the proxy device 2810 and the resource/authentication server. As will be described in further detail in the examples below, the client device 2805 may use the context information to verify or otherwise confirm the authentication session between the proxy device 2810 and the resource/authentication server.

Examples of the content of the context information will now be provided. The context information may identify a data structure of authentication information previously exchanged between the proxy device 2810 and the resource/authentication server. For example, if the proxy device 2810 and the resource have already exchanged authentication messages and are currently in the middle of authentication, the context information may comprise all or a portion of the exchanged authentication messages. Additionally or alternatively, the context information may identify a data structure of authentication information to be sent by the proxy device 2810 to the resource/authentication server in the future. In Kerberos authentication, for example, the context information may comprise part or the entire AS_REQ message to be sent by the proxy device 2810 to the resource/authentication server.

The context information may comprise timestamp information associated with the authentication session. The timestamp may identify the current time as determined by the proxy device 2810. For Kerberos/PKINIT, the authentication service 2815 and/or resource 2820 may validate the timestamp during authentication. In general, the timestamp should be within a reasonably tight tolerance of the current time (e.g., within X seconds) determined by the authentication service 2815 and/or resource 2820. Because the timestamp is used to authenticate the proxy device 2810 with the authentication service 2815 and/or resource 2820, the timestamp may also be used for verification by the client device 2805. A greater tolerance threshold (e.g., X+Y seconds) may be used by the client device 2805 because the client device 2805 and the proxy device 2810 might not be as closely synchronized in time as the proxy device 2810 and the authentication service 2815. The client device 2805 may use the timestamp information to verify that the authentication session is recent (e.g., within the last minute, within the last day, etc.).

The context information may identify the type of authentication protocol being used by the proxy device 2810 and resource/authentication server. For example, if Kerberos authentication is used, the context information may identify Kerberos generally or PKINIT/Kerberos if the PKINIT features of Kerberos are being used. As one example, "sign-for-PKINIT" may be used. The context information may also identify the application requesting the signature or the specific proxy device 2810 implementation. For example, 'sign-for-PKINIT-by-NetScaler®' or 'sign-for-PKINIT-by-XenApp®' may be used. If SSL authentication is used, the context information may identify SSL. As one example, 'sign-for-SSL-client-authentication' may be used. The context information may also identify which SSL authentication operation the proxy device 2810 is performing (e.g., operation 1, operation 2, etc.) and with which resource the proxy device 2810 is authenticating.

The context information may identify the certificate that the proxy device 2810 selected from the list of certificates provided by the client device 2805 (e.g., step 3026). By providing the selected certificate, the client device 2805 may be able to figure out the type of authentication protocol being used by the proxy device 2810 and the resource.

The context information may identify the data structure of the authentication session, such as a Kerberos data structure or an SSL data structure. For example, the Kerberos authentication session may comprise Abstract Syntax Notation 1 (ASN.1) constructs, which the proxy device 2810 may identify via the context information. In particular, an AuthPack, which may be part of the AS_REQ, to be signed may have a well-defined ASN.1 structure that the client device 2805 may recognize. For SSL authentication, the data structure may comprise a CertificateVerify structure.

The context information may comprise specific pieces of information that the client device 2805 may use to verify the authentication session. The specific pieces of information can also be used to identify the data structure of the authentication session. For example, if the authentication session comprises Kerberos authentication, the context information may include, for example, a checksum associated with the Kerberos authentication, a Kerberos domain used for the Kerberos authentication (e.g., the realm that a particular authentication server serves), a Kerberos principal name associated with the client device 2805 (e.g., a username assigned to the client device 2805), an identifier of a key distribution center (KDC) used for the authentication session, a validity period of a requested ticket (e.g., a TGT ticket or session ticket), and Kerberos flags that have been set during the authentication session (e.g., based on the authentication messages so far exchanged between the proxy device 2810 and resource/authentication server). An example flag that the client device 2805 may verify is a "forwardable" flag, which may indicate that the resulting ticket may be forwarded to another device. As previously noted, a portion or the entirety of an AS_REQ message to be signed by the client device 2805 and to be sent to the resource/authentication server may be sent to the client device 2805.

For SSL authentication, specific pieces of information alone might not be sufficient for the client device 2805 to identify the context of the SSL authentication session between the proxy device 2810 and the resource/authentication service. For example, the specific pieces of information will look like random data to the client device 2805 because SSL authentication creates hashes of an entire series of packets that have gone back and forth between proxy device 2810 and the resource. Thus, in some embodiments, the context information for SSL authentication may comprise the entire (or close to entire) authentication conversation between the proxy device 2810 and the resource prior to requesting the signature from the client device 2805. In other words, all of the SSL operations (e.g., handshake messages) may be provided to the client device 2805. The proxy device 2810 generates a cumulative digest of SSL operations performed. Accordingly, the client device 2805 may inspect any portion of the handshake that the client device 2805 wishes to inspect, allowing the client device 2805 to ascertain the identity of the resource being accessed and to confirm that the handshake is well-formed. In some aspects, the proxy device 2810 may delegate the entire SSL handshake process to the client device 2805 over a certificate operation interface. When the handshake is complete, the client device 2805 may supply a Master Secret protected under the key exchange for the specialized communication channel between the client and proxy.

In step 3032, the client device 2805 may receive the request for signature from the proxy device 2810 and extract the context information included therein. For example, the client device 2805 may decode and/or decrypt the request message. Examples of the context information were previously listed. In step 3034, the client device 2805 may attempt to verify the context information. The client device 2805 may use the context information to verify that the authentication session between the proxy device 2810 and the resource/authentication server is valid. For example, the client device 2805 may use the context information to determine that the proxy device 2810 is communicating with the resource/authentication server and the type of communication occurring between them. The client device 2805 may be made aware of a relevant portion (or entirety) of the resource authentication protocol or the proxy's authentication context, sufficient for the client device 2805 to satisfy itself that, for example, the resource being accessed is the intended one, the cryptographic operation being requested is part of the expected protocol, and the results of the cryptographic operation will be or can only be usefully used as part of the specific protocol interaction between the proxy device 2810 and resource. For instance, the client device 2805 may inspect the data (e.g., an AS_REQ message for Kerberos authentication) the client device 2805 has been asked to sign to ensure that the data (or appended data) corresponds to a well-known structure used by that construct of the expected authentication protocol (e.g., Kerberos, SSL, etc.). The data may also potentially include specific data elements that can be verified by the client device

2805. Alternatively or additionally, the client device 2805 may look for a recognizable and/or verifiable expected structure in the data before the client device 2805 provides a signature.

If the context information is not verified (step 3034: N), the client device 2805 may send a message indicating that the context information could not be verified. For example, the client device 2805 may send a response that does not include the requested signature. For Kerberos authentication, the verification may fail if the timestamp is outside the tolerance threshold set by the client device 2805. For SSL and Kerberos authentication, the client device 2805 may perform certificate chain validation on the authentication/resource server certificate, which may fail for any of a number of reasons. Certificate chain validation for Kerberos may require a separate PK operation step (dealing with AS_REP, which is the reply to AS_REQ). For SSL, the chain validation may be possible if the relevant portion of the SSL authentication messages between proxy device 2810 and resource are sent to the client device 2805.

In some aspects, the client device 2805 may request additional context information from the proxy device 2810 if the client device 2805 cannot verify based on the context information already provided by the proxy device 2810. If the proxy device 2810 decides to provide the additional context information, the proxy device 2810 may return to step 3030 and find additional context information to provide to the client device. The additional context information may be of a different type of context information. For example, if the proxy device 2810 previously provided information identifying the certificate that the proxy device 2810 selected, the proxy device 2810 may provide specific information from the authentication messages exchanged between the proxy device 2810 and the resource/authentication server (e.g., the Kerberos flags set during a Kerberos authentication session or handshake messages exchanged during an SSL authentication session). Instead of sending a message without a signature, the client device 2805 might not respond to the proxy device's signature request.

In step 3038, the proxy device 2810 may generate a message indicating that a signature is unavailable and forward the message to the resource/authentication server. In step 3070, the resource/authentication server may determine that the proxy has not been authenticated, and in response, may end the authentication session. In other words, the resource/authentication server might not provide the Proxy with a session key (or a ticket in the case of Kerberos).

The context information may be verified (step 3034: Y). For Kerberos authentication, verification may succeed if, for example, the received timestamp is within a tolerance of the current time at the client device and/or if the checksum in received AuthPack matches the checksum computed by the client device (in the case where AS_REQ is supplied as context information). If the context information is verified, in step 3042, the client device 2805 may sign the data provided by the proxy device 2810 using the certificate, which may have been selected by the proxy device 2810 in step 3026. For example, for Kerberos authentication, if the proxy device 2810 provided the unsigned AS_REQ message to the client device 2805 (e.g., in step 3030), the client device 2805 may sign the AS_REQ message. As previously noted, providing the unsigned AS_REQ is optional. As an alternative, for both Kerberos and SSL authentication, the data provided by the proxy device 2810 may comprise any chunk of data, such as a sequence of octets, on which the signature is to be computed. After signing the data, the client device 2805 may send a message with the signature and/or the signed data to the proxy device 2810 in step 3044.

In step 3046, the proxy device 2810 may receive the message and extract the signature and/or signed data. For example, the signature (which may be another sequence of octets) may be returned to the proxy device and inserted by the proxy device into the appropriate authentication message to be sent to the resource or authentication service, as will be discussed in further detail below. With reference to FIG. 29, the Packet Engine 2920 may receive the message and forward the message to the Proxy SDK 2935. The Proxy SDK 2935 may provide the signature to the client-side authentication module 2930.

In step 3048, the proxy device 2810 may send an authentication message including the signature to the resource/authentication server. The authentication message may be in response to the request to authenticate sent by the resource/authentication server in step 3012. In general, the authentication message may be used to obtain a session key for the proxy device 2810 to obtain resources requested by the client device 2805. In Kerberos authentication, for example, the authentication message may comprise an AS_REQ message used to obtain a session key and a ticket, such as a TGT, which the proxy device 2810 may use to obtain tickets for a secured communication session with the resource. If the proxy device 2810 received a signed AS_REQ message from the client device 2805, the proxy device 2810 may forward the signed AS_REQ message to the resource/authentication server. If the proxy device 2810 received the signature separately, the proxy device 2810 may generate an AS_REQ message and append the signature to the AS_REQ message. In some aspects, the AS_REQ message may be encoded in the PA-PK-AS-REQ format, as described in RFC 4556, which is herein incorporated by reference in its entirety.

In step 3050, the resource/authentication server may receive the authentication message and determine whether the authentication message has a valid signature. If the signature is not valid, the resource/authentication server may perform step 3070, which was previously discussed (e.g., determine that the proxy device 2810 is not authentication and/or end the authentication session with the proxy device 2810).

In step 3052, if the signature is valid (step 3050: Y), the resource/authentication server may generate and/or send a session key to the proxy device 2810. In Kerberos authentication, the resource/authentication server may also send a ticket, such as a TGT or a service ticket, to the proxy device 2810. The session key and/or ticket may be encapsulated using another key that the proxy device 2810 and/or the client device 2805 can decrypt. In some aspects, the message may be sent as a Kerberos AS_REP message.

In step 3053, the proxy device 2810 may receive the session key and/or ticket and store (e.g., cache) the session key and/or ticket. They may be cached for later use. For example, the session key and/or ticket may be used in the future if the client device 2805 requests additional resources. With reference to FIG. 30A, the proxy device 2810 may determine that a session key is available in step 3014 the next time the proxy device 2810 needs to obtain a resource for the client device 2805. With reference to FIG. 29 and for Kerberos authentication, the client-side authentication module 2930 may populate a Kerberos ticket cache for user sessions with TGTs and/or service tickets and their corresponding session keys.

In some embodiments, the proxy device 2810 might not have the key to decrypt the message having the session key and/or ticket received from the resource/authentication server. Instead, the client device 2805 may control access to the key, for example, if the client device 2805 does not entirely trust the proxy device 2810. In these embodiments, the proxy device 2810 and the client device 2805 may optionally exchange an additional set of messages (e.g., in an additional certificate operation) to decrypt the encapsulated message comprising the session key and/or ticket. The exchange may occur instead of the proxy device 2810 decrypting and storing the session key and/or ticket in step 3053.

For example, in Kerberos authentication, PKINIT may use Diffie-Hellman key exchange to negotiate an AS reply key for wrapping the TGT session key, as described in section 3.2.3.1 in RFC 4556, which is incorporated by reference in its entirety. Alternatively, public key encryption may be utilized by a KDC to encrypt an AS reply key it generates with the certificate's public RSA key, as described in section 3.2.3.2 in RFC 4556. This may force the proxy device 2810 to request the client device 2805 to decrypt the reply key. In these examples, the client device 2805 may choose to retain the reply key and other keys it protects such as the TGT session key allowing it to control any use of the TGT to request further tickets (and to control use of those service tickets as well if it wished). Thus, instead of the proxy device 2810 storing the session key and/or ticket in step 3053, the client device 2805 may store the session key and/or ticket. This may be appropriate if the client device 2805 has a moderate trust in the proxy device 2810, but not entire trust.

Further details on using public key encryption will now be described. If RSA public key encryption is used to return the AS reply key, the proxy device 2810 may request certificate private key decryption from the client device 2805 of a substructure in a data field of the reply message with the session key and/or ticket received from the resource, such as an encKeyPack field of a KRB-AS-REP reply message. A blob which results from decryption by the client device 2805 may be a SignedData structure, as defined in section 5.1 of RFC 3852, which is incorporated herein by reference in its entirety. The SignedData struct may have content type id-pkinit-rkeyData and a content field containing a ReplyKeyPack structure as defined in section 3.2.3.2 of RFC4556. The signature field on SignedData may include the KDC's certificate allowing the client device 2805 to perform certificate path validation to confirm the identity of the KDC. Accordingly, if RSA public key exchange is used, the client device 2805 may have the ability to fully verify the identity of the KDC to which the proxy device 2810 is authenticating. If Diffie-Hellman key exchange is used, the proxy device 2810 may see the KDC's certificate and perform path validation. The proxy device 2810 may not need to involve the client device 2805 in completing the key exchange.

Alternatively, the client device 2805 may have high trust in the proxy device 2810 and allow the proxy device 2810 to decrypt the message containing the session key and/or ticket. In these embodiments, the proxy device may decrypt the message and store the session key and/or ticket as previously described with respect to step 3053. For example, the proxy device 2810 may control the Diffie-Hellman key exchange, allowing the proxy device 2810 to recover the session key (e.g., associated with a TGT) without further client device 2805 support. In this case, the proxy device 2810 may be granted unconstrained delegation permissions by the client device 2805 as the proxy device 2810 can exercise full control of the TGT.

Additionally or alternatively, the proxy device may utilize the Microsoft Active Directory environment to obtain the session key and/or ticket. In a Microsoft Active Directory environment, the proxy device 2810 may support an extension of the PKINIT process that allows the proxy device 2810 to receive the user's password hash (such as NTLM credentials) from the domain controller. This allows the proxy device 2810 to respond to NTLM authentication challenges as well as Kerberos authentication challenges. Unless the client device retains the AS reply key in order to retain control over the TGT session key (as previously described), no additional interaction between the proxy device 2810 and the client device 2805 may be required to recover the NTLM password hash because it may be encrypted with the same AS reply key used to convey the TGT session key.

In step 3054, the proxy device 2810 may obtain the requested resource using the session key. In step 3056, a server or other database may provide the requested resource based on the session key. For Kerberos authentication, the resource/authentication server may have provided a TGT and an associated session key in step 3052. In this example, the proxy device 2810 may perform inline authentication on behalf of the user of the client device 2805 by obtaining additional Kerberos service tickets for requested resources using the TGT. With reference to FIG. 29, the client-side authentication module 2930 may signal the Packet Engine 2920 if PKINIT and Kerberos ticket fetching succeeded to retry the proxied HTTP request to the resource. This may be performed when the session key/ticket cache is populated. The Packet Engine 2920 may attach an Authorization header containing the appropriate Kerberos binary structure (AP_REQ) generated from the service ticket and session key to obtain the resource. As previously noted, the client device 2805 might not entirely trust the proxy device 2810. In these examples, the client device 2805 may retain possession of the TGT session key and may require the proxy device 2810 to interact with the client device 2805 when requesting service tickets for individual resources. In this way, the client device 2805 can ensure visibility of the identity of resources being accessed on its behalf by the proxy device 2810.

In step 3058, once the proxy device 2810 obtains the resource, the proxy device 2810 may send the resource to the client device 2805. In step 3060, the client device 2805 may receive the requested resource and use it as desired, such as by accessing data or services, such as enterprise data or services. As previously discussed, the data or services may be encrypted in data vaults 616 to protect the data or services on the client device 2805.

In some embodiments, the client device 2805 may communicate with the resource 2820, such as Sharepoint, using a VPN tunnel (e.g., through the proxy device 2810) or other type of communication channel. Instead of the proxy device 2810 receiving the resource authentication challenge from the resource 2820 (e.g., in step 3014 illustrated in FIG. 30A), the client device 2805 may receive the challenge via the VPN tunnel. The client device 2805 may establish a second parallel conversation with the proxy device 2810 (or communicate with the proxy device over a previously established channel) to enable the proxy device 2810 to aid in authentication. This is beneficial because the client device 2805 might not have the functionalities to perform certain types of authentication, such as Kerberos authentication. During the second parallel conversation, the client device 2805 may present the resource authentication challenge to the proxy device 2810. The proxy device 2810 may then communicate with the authentication service 2815 (e.g., a KDC in the case of Kerberos authentication) and obtain a session key (and Kerberos ticket in the case of Kerberos authentication) needed for the client device 2805 to access the resource. At this point, the steps performed among the client device 2805, proxy device 2810, and authentication service 2815 may include, for example, any of steps 3014, 3016, 3018, 3024, 3026, 3028, 3030, 3032, 3034, 3036, 3038, 3070, 3042, 3044, 3046, 3048, 3050, 3052, and/or 3053 previously discussed in reference to FIGS. 30A-C. After the proxy device 2810 receives the session key and/or ticket from the authentication service 2815, the proxy device 2810 may return the key and/or ticket to the client device 2805 over the secure communication channel between the client device and the proxy device. The client device 2805 may now respond to the resource authentication challenge received from the resource 2820 using the session key and/or ticket and obtain the requested resource. Alternatively, instead of the proxy device 2810 returning the key and/or ticket to the client device 2805, the proxy device 2810 may itself construct the response to the resource authentication challenge and send the authentication response to the client device 2805. The client device 2805 may forward the response to the resource 2820 to obtain the requested resource.

The steps illustrated in FIGS. 30A-C may be applied to signing documents, such as emails or other document types, and/or to decrypting data that is protected by the certificate private key. In the example of signing documents, the proxy device 2810 may provide the client device 2805 with the document to be signed as the context information described herein.

The steps illustrated in FIGS. 30A-C may also be applied to a virtualization environment, such as desktop and/or application virtualization. In a virtualization environment, the client device 2805 may be running a virtualization application, such as the client agent 604 illustrated in FIG. 6 or any other client application used to establish a remote display connection (e.g., CITRIX ICA, CITRIX RDP, etc.). As previously noted, the client device 2805 may still secure a private certificate, such as a key stored in a physical or virtual smart card.

The proxy device 2810 may comprise or be part of an application or desktop virtualization server, such as virtualization server 301 illustrated in FIG. 3. Such servers may run applications and may communicate with resources, such as enterprise resources. Communications between the proxy device 2810 and the client device 2805 in a virtualization environment may be handled over a display remoting protocol, such as CITRIX ICA protocol or CITRIX RDP protocol. The resource may comprise the enterprise resources 504, 508, and/or 608 and/or the enterprise services 508 and/or 609 noted above.

In some embodiments, the steps illustrated in FIGS. 30A-C may be used for virtualization environments. Alternatively, some changes may be made. HTTP communications between the client device 2805 and the proxy device 2810 may be replaced with communications utilizing a display remoting protocol, such as CITRIX ICA protocol or CITRIX RDP protocol. The PKOp Proxy SDK 2935 may comprise a third party application. Accordingly, steps performed by the PKOperation Proxy SDK 2935 described above may be performed by a third party application. In some aspects, the proxy device 2810 may call out to the third party application to perform these steps.

An example virtualization embodiment will now be described. A standard OS Kerberos implementation where the virtualization server runs an OS, such as Microsoft Windows, may be used. For example, Kerberos Security Service Provider (Kerberos SSP) Authentication Package (SSP/AP) may be used. Various programming interfaces to the Kerberos SSP may be utilized, including, but not limited to, LsaCallAuthenticationPackage and KERB_CERTIFICATE_LOGON. A smart card equivalent client certificate, in conjunction with a custom credential provider and custom key storage provider (KSP), may be used to invoke the PKINIT Kerberos logon protocol previously discussed. The KSP may be exposed to the specific protocol elements of PKINIT that can be signed with the private key, such as the checksum of the AuthPack structure. Additionally, the Kerberos SSP may use OS APIs to invoke cryptographic operations, such as the Hash API used to compute the checksum which is an initial step in generating a signature. By intercepting the Hash API calls made by the Kerberos SSP the protocol elements upon which signatures are to be calculated can be seen. The Hash API calls can be intercepted by using a custom SSP which is loaded into the trusted LSASS process where the Kerberos SSP performs PKINIT.

As previously noted, the elements to be signed may comprise an AuthPack structure described in section 3.2.1 of RFC4556. Furthermore, the protocol element may have some well-formed structure, such as a structure that follows ASN.1 binary encoding rules. Additionally, the structure may include a timestamp which represents the current time, allowing the client device 2805 to perform a basic validation check against the client device's own knowledge of the current time. To allow for time variances that may be likely in practice, the client device 2805 may wish to allow a wider latitude of variance than, for example, the authentication server (e.g., a KDC) will. For example, the client device 2805 may accept a time value that is within 24 hours of its own time value, rather than the 5 minutes which is what the KDC may allow.

In some embodiments, the KSP may reliably locate the KRB-REQ-BODY binary structure which may have been prepared in the Kerberos SSP prior to invoking the certificate sign operation which ultimately calls the KSP. If this structure can be located, such as from a stack walk back to the Kerberos SSP, then a full validation of AuthPack may be possible. Alternatively, by intercepting the OS Hash API calls made by the Kerberos SSP, to compute a checksum of KRB-REQ_BODY as part of the preparation of the AuthPack structure, the KRB-REQ-BODY structure may be directly visible. A copy of the structure can then be sent by the proxy device 2810 to the client device 2805 as part of the PK operation request. Similarly the AuthPack structure may be visible to the Hash API as part of the signature construction. As previously noted, a special communication channel between the client device 2805 and the proxy device 2810 may comprise a custom GSS-API mechanism. In the virtualization embodiment, the special communication channel may be inside a virtual channel in the display remoting protocol. For example, a SSPI Virtual Channel may be used. In some aspects, if a SSPI negotiation fails to complete authentication itself, other authentication methods supported by the display remoting protocol can be used instead.

In some embodiments, the aspects described herein may be applied to CITRIX XenApp® and/or XenDesktop®. XenApp® and XenDesktop® may support smart card remoting using a smart card virtual channel that remotes a smart card reader interface (e.g., a PC/SC). The aspects described herein may replace PC/SC remoting for the purpose of Windows logon. The smart card may be accessed once the session has been established, for instance to support applications that use the smart card to sign documents. This may be achieved by appropriately configuring the smart card API hooks used by XenApp®/XenDesktop®, causing them not to apply in the Windows Logon processes (e.g., winlogon.exe, logonui.exe, etc.), but still apply normally to other processes.

From the client device 2805's perspective, the certificate operations that are remoted may be associated with a particular form of PKINIT (e.g., 'sign-for-PKINIT-from-XenApp®'), and the smart card context used for PKINIT may be immediately released upon conclusion so that application causes additional PIN prompts if required. Additionally or alternatively, the smart card context may have been used prior to the PKINIT request, for example by the client device 2805 to perform SSL with client certificate authentication to the proxy device 2810 or to another device or server. In this way, a single PIN prompt may be sufficient to enable authentication by the client device 2805 to a broker server which identifies the proxy device 2810 to be used for the resource access operations (from a plurality of devices that can perform this service). The selected proxy device 2810 may then perform PKINIT without an additional PIN prompt and without having required explicit PIN caching by the client device 2805. In the case of domain login to application or desktop virtualization servers, a significant performance improvement may be achieved over traditional methods of remote smart card authentication. Furthermore, this can be achieved without needing to implement the full reader and smart card interface for a virtual smart card.

Various modifications to the aspects describe above can be made. Each entity (client device 2805, proxy device 2810, authentication service 2815, and/or resource 2820) may be made aware of the activities of the other entities. For example, each entity may be provided with identifiers for one or more of the other entities. The identifiers may be provided during any of the message exchanges previously described with respect to FIGS. 30A-C. For example, the proxy device 2810 may inject information identifying the client device 2805 into the information packets that the proxy device 2810 sends to the resource/authentication server. The proxy device 2810 may also inject information identifying the resource/authentication server into the information packets the proxy device 2810 sends to the client device 2805. In a similar manner, the type of client device 2805 (e.g., PC, tablet, smartphone, etc.) may be provided to the other entities. In some aspects, Kerberos Protocol Extensions (e.g., MS-KILE), as described in RFC 6113, which is hereby incorporated by reference in its entirety, may be leveraged to make the activities of entities available to other entities. By providing identification information to the resource 2820, the resource 2820 may determine who is accessing data and/or also restrict access to data.

For the case of Kerberos, it is possible in some implementations (e.g., a Windows Server 2012 implementation) to provide two principal identities during network service authentication. The proxy device 2810 may use its own Kerberos identity (e.g., TGT) to 'armor' the TGS exchange, as described in the Microsoft Kerberos Protocol Extensions documentation [MS-KILE] and RFC 6113. This technique is referred to as FAST, also described in RFC 6113. A compound identity for the user/client device 2805 and proxy device 2810 may be created. In Windows Server 2012, this compound identity may be exposed to resources that operate on top of the Windows ACL framework, with the ability for ACLs to inspect the machine identity and other claims. While a Windows Server 2012 implementation has been described, one of ordinary skill in the art would recognize that any other implementations using different operating systems may be utilized.

The proxy device 2810 may use generalized claims mechanisms to also supply information relating to the client device 2805 itself, which could reflect its identity (if known from other means, such as device certificate authentication by SSL to the proxy device 2810) or other relevant attributes of the device such as its type, OS, version, or security posture that may be learned during the authentication or resource access process from client device 2805 to proxy device 2810.

Another modification to the aspects describe above may comprise adjusting a user experience to notify the user of operations using the client certificate. Information that the proxy device 2810 provides to the client device 2805 may be displayed to the user. In another example, the display may indicate that the client device 2805 is in the middle of a logon process, which may also utilize the client certificate. A PIN prompt may also be displayed, such as for smart cards using Class 1 readers. More detailed displays to the user that faithfully represents the operation to be conducted may be provided. For example, for signing documents with the client certificate, the document may be displayed to the user for review. A suitable summary indicator of a transaction to be performed may also be displayed. Detailed displays may be utilized in any of the smart card reader classes, such as Class 4. In some embodiments, the client device 2805 may simulate a smart card reader (or support using such a reader if interacting with a physical smart card).

Unnecessary interactions with the user may be avoided. For example, the scope of remoted certificate operations may be properly grouped (e.g., bounded), so that multiple operations which are part of the same group (e.g., a group of operations using the same resource authentication protocol) may be recognized as being part of the same group, and a logical group may be created. In some aspects, one information display or prompt may be displayed to the user for operations within the same group. Approximately speaking, this logical grouping corresponds to obtaining and releasing a smart card context in the case of traditional physical smart cards.

Application Management Framework for Secure Data Sharing

Improved techniques involve conveying data between secure applications running on an electronic mobile device via a parallel, hidden encrypted pasteboard. Such a hidden pasteboard is defined only to a set of secure (or "managed") applications running on the mobile device (e.g., via management policies). Moreover, all data is encrypted by the managed app writing the data to the hidden pasteboard, and then decrypted by another managed app reading the data from the hidden pasteboard thus preventing exposure of the data even if the location of the hidden pasteboard is discovered.

One embodiment is directed to a method of conveying data between secure applications running on the electronic mobile device which is performed in an electronic mobile device having (i) processing circuitry and (ii) memory. The method includes receiving, by the processing circuitry, a copy command; and encrypting, by the processing circuitry and in response to the copy command, original data from a first secure application to form encrypted data. The method further includes writing, by the processing circuitry and in response to the copy command, the encrypted data to a hidden pasteboard residing in the memory to enable a second secure application to subsequently read and decrypt the encrypted data from the hidden pasteboard, the hidden pasteboard residing at a location of the memory which is different than that of a general clipboard residing in the memory, the general clipboard being accessible by a set of unsecure applications running on the electronic mobile device.

Figure 31A:
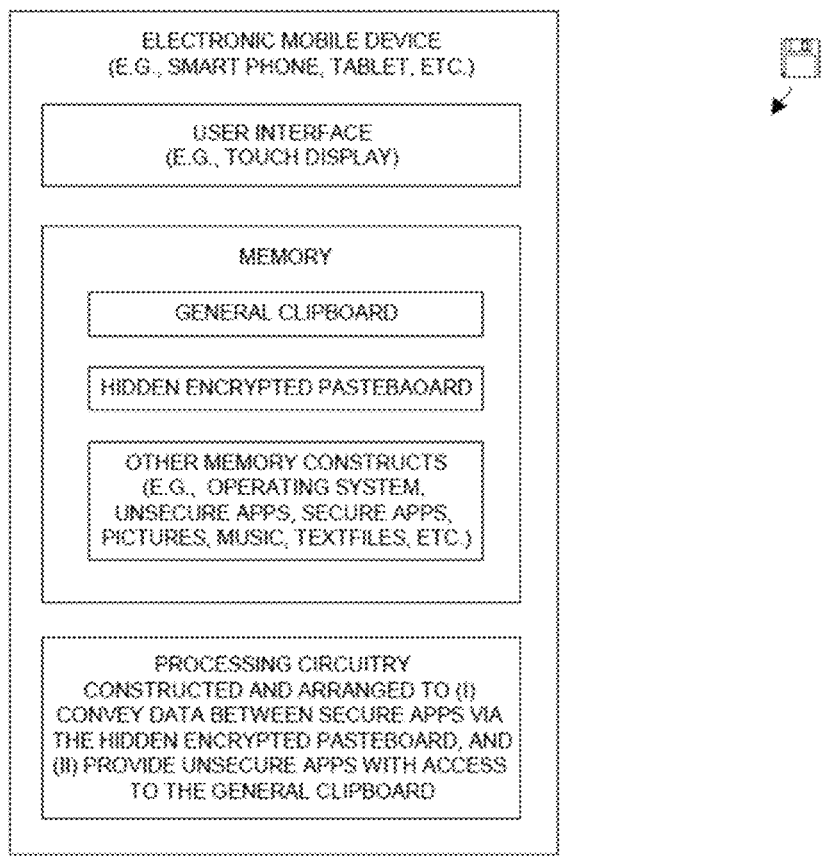
FIG. 31A is a block diagram of an electronic mobile device which is suitable for use in conveying data between secure applications.

FIG. 31A shows an electronic mobile device which is suitable for use in conveying data between secure applications. The electronic mobile device includes, among other things, a user interface for user input/output, memory to store data, and processing circuitry. Examples of suitable mobile devices include smart phones, tablet devices, electronic notebooks, and so on. In the context of smart phones, various specific platforms are suitable for use such as those running iOS provided by Apple Computer, Android provided by Google, and Windows provided by Microsoft are suitable.

During operation, the electronic mobile device responds to user commands by performing operations such as launching applications, establishing connections to external devices (e.g., cellular calls, WiFi connections, etc.) to exchange wireless signals, and performing useful work. Along these lines, the processing circuitry of the electronic mobile device runs a set of (i.e., one or more) unsecure applications, and a set of secure applications.

When the processing circuitry runs an unsecure application, the processing circuitry is configured to access the general clipboard for copy and paste operations in a traditional manner. For example, while the processing circuitry runs a first unsecure application, the user is able to copy data from the first unsecure application to the general clipboard. Additionally, the while the processing circuitry runs a second unsecure application, the user is able to paste the copied data from the general clipboard into a workspace of the second unsecure application.

Figure 31B:
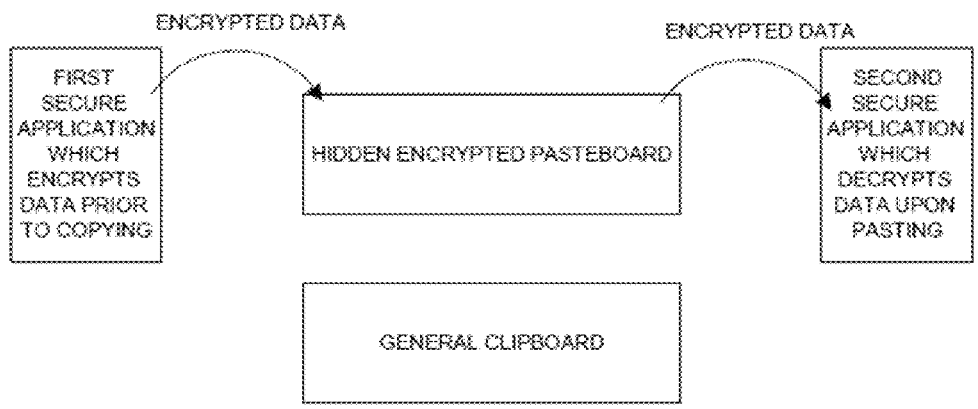
FIG. 31B is a block diagram of secure applications that are configured to access a hidden encrypted pasteboard.

However, as illustrated in FIG. 31B, the secure applications are configured to access the hidden encrypted pasteboard. In particular, to perform a copy operation using a secure application, the processing circuitry encrypts the data and then writes the encrypted data into the pasteboard (bypassing the general clipboard). Furthermore, to perform a paste operation using a secure application, the processing circuitry reads data from the hidden encrypted pasteboard, and decrypts the data before placing the decrypted data into the workspace of that secure application. Accordingly, the data is never exposed outside the secure applications.

Figure 31C:
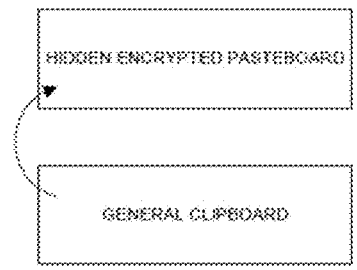
FIG. 31C illustrates an example copy of data into the general clipboard by an unsecure application that creates a detectable copy event.

In some arrangements, the mobile device is capable of inputting data from the general clipboard into the secure applications. Along these lines and as shown in FIG. 31C, copying of data into the general clipboard by an unsecure application creates a detectable copy event. When the processing circuitry runs a secure application that receives an indication of the copy event, the processing circuitry reads the data from the general clipboard, encrypts the data to form encrypted data, and writes the encrypted data into the hidden encrypted pasteboard. Accordingly, the data within the hidden encrypted pasteboard is now synchronized with the data in the general clipboard and the secure applications which have access to the hidden encrypted pasteboard may now access the data from the hidden encrypted pasteboard. In some arrangements, the mobile device equips different groups of secure applications to use different secure pasteboards. For example, the processing circuitry may provide (i) a first memory address of the hidden pasteboard and a first set of cryptographic keys to a first group of secure applications, (ii) a second memory address to another hidden pasteboard and a second set of cryptographic keys to a second group of secure applications, and so on. Such deployment and configuration of the secure applications may be effectuated via management policies to group applications where the management policies dictate a particular group, keys and pasteboard to each secure application.

While various embodiments of the present disclosure have been particularly shown and described, it will be understood by those skilled in the art that various changes in form and details may be made therein without departing from the spirit and scope of the present disclosure as defined by the appended claims. Additionally, further details are provided in the following materials which are appended this portion of the application.

Some arrangements are directed to a system to prevent sensitive data from being shared outside of a managed set of applications. A company may wish to restrict data sharing to this managed set of applications, allowing full bidirectional access, but also potentially allowing incoming insecure data, such as text from a webpage, to be copied into one of the managed applications. On modern operating systems such as iOS, Android and Windows, there is a mechanism typically called the "pasteboard" or "clipboard" that is used to share data between applications. The user can "copy" data from one application into the pasteboard, and then "paste" it from the pasteboard into a second application. One problem is that the data put into the pasteboard is not secured in any way, and sometimes there is a need to secure it such that only a defined set of managed applications can share this data, hiding it from other non-managed applications. Aspects of this disclosure are directed towards a mechanism for redirecting copy and paste operations to a parallel encrypted pasteboard, that only managed applications have access to.

In order to provide secure copy and paste functionality between a set of managed applications, the circuitry redirects copy and paste operations to a parallel pasteboard. This parallel pasteboard is hidden from general view by other applications, and all data written to it is encrypted. Only managed applications know how to access this hidden, encrypted pasteboard.

In addition, to allow the user to copy and paste data from insecure application to one of the managed applications, a synchronization method monitors the unsecure pasteboard for changes, and writes the changes to the secure pasteboard as needed.

Furthermore, in some cases a system administrator may choose to entirely disable copy and paste functionality, either for a single application, a group of applications, or all managed applications. This is achieved by adding appropriate management policy enforcement points in the redirection code.

Also, there may be a need to have multiple application groups, each with its own secure pasteboard. This is achieved by using management policies to group applications, and then provide each group with their own separate secure pasteboard.

In some mobile devices:
1. Copy and paste between managed applications is totally secured by using a parallel, hidden, encrypted pasteboard.
2. Synchronization with an unsecure pasteboard allows a user to copy and paste data from an unsecure app into a secure app, but not vice versa.
3. Copy and paste functionality can be completely blocked based on management policies set by a system administrator.

Additionally, depending on settings of particular management policies, applications within a set of managed applications can be constrained to exchange files and/or data only with other managed applications within the set. In some arrangements, API calls from a managed application are intercepted by injected (or wrapped) code which operates to 'contain' the application. A particular management policy is read, and the operation specified by the API call is either blocked or allowed depending on the settings in the management policy. Because the management policy has a record of all applications in the set of managed applications, the application, by reading the management policy, can test whether the requested operation of the API call involves an application inside or outside the set, and allow or block activity accordingly. Thus, based on management policy settings, movement of data can be restricted such that data within the set of managed applications is not commingled with data outside the managed set.

It is understood that a process of intercepting an API call, consulting an application's management policy, and allowing or blocking the operation specified by the API call based on the management policy can be carried out in a number of contexts. In one example, the above process can be applied for selecting a set of applications on the mobile device that can be used to open a file or data element identified by a link or icon (e.g., using Open-In). In another example, the above process can be applied for copying data or data objects from one application and pasting the data or data objects into another application (e.g., via a hidden, encrypted paste buffer). In yet another example, the above process can be applied for moving files into and/or out of a protected file vault. Essentially, any operation used to move data into and/or out of an application can make use of the above techniques.

On mobile operating systems, such as iOS, Android, and Windows 8, each application runs in its own sandbox. These apps use a very high level content sharing mechanism like Open In in iOS, Intents/activities in Android and Charms in Windows8. On a BYOD (bring your own device) mobile device, it will have a mix of managed and un-managed/personal applications running on the device. Here, we focus on how to enable data sharing among the managed set of applications.

On modern mobile operating systems like iOS, the file system is not really exposed to the end user by design to hide complexity. The focus is rather on the applications and the data they handle.

There are many ways data can move in and out of the device. Primary examples include email, cloud storage resources (e.g., ShareFile®, DropBox, GoogleDocs, Box), browsers, etc. Then the data needs to be moved among the managed applications to get actual work done.

Figure 31D:
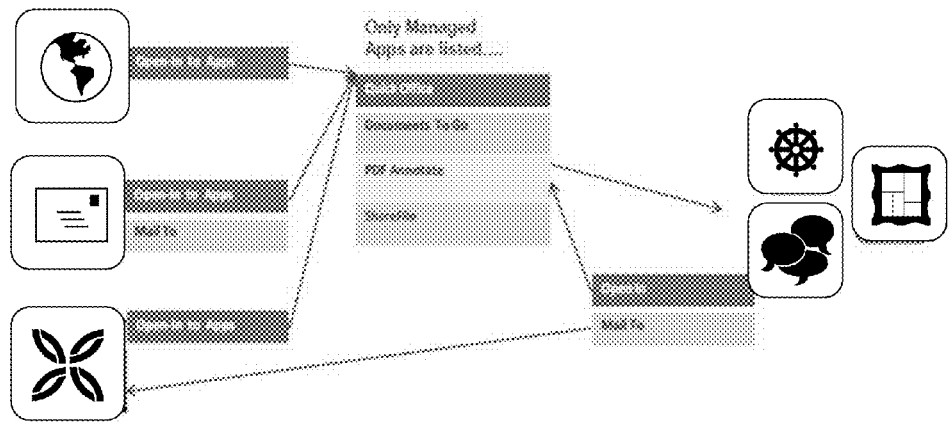
FIG. 31D illustrates example ways data can move in and out of a device

In FIG. 31D, all of the displayed apps are managed applications, i.e., members of the set 1 of managed applications.

To keep data moving among only managed applications, the Open In list provided to the application is filtered by intercepting the call and presenting to the application only the set of managed applications which can handle that particular file format. The same technique is extended to Mail To option where the URL scheme used for Mail To could be intercepted and presented with the option of Mail To with only a managed mail application as shown in FIG. 31D.

This way, even the managed applications could be forced to Save to only the managed data sharing applications, like ShareFile®, DropBox, GoogleDocs, Box.

By using above interception and filtering technique, data flow in and out of the device as well as on the device is limited to the managed secure space. The same techniques could be easily extended to Android and Windows 8.

The drawing above presents a 3 app scenario: a corporate email application, a cloud storage resource, and a pdf annotation application. A user may wish to get a file from the cloud storage resource, annotate it with the PDF annotator, and pass it to the corporate email. This can be made to work because these are all in the managed set. But it is also necessary to prevent the file from going through private email, or to pass for viewing to other apps that are not part of the managed set (and therefore trusted).

In general, there is no commingling of trusted apps and others, but commingling depends on management policy. An admin on the EMM server can set management policies for any task of managed application to allow/disallow features. It is possible that a management policy could allow one to export a file from the PDF annotator to an app outside the managed set, but then control over the of PDF file would be lost.

The general concept is that an admin sets the management policies of the managed applications, with default settings being to contain data within the managed set of trusted apps. The management policies are dynamically delivered from the EMM server. However, exceptions can be provided, e.g., to allow content to leak out from the managed set, when business concerns dictate it.

It is understood that for apps that are not part of the managed set, there is no interference with normal activities, i.e., they are unrestricted.

In an example, each application in the managed set creates its own VPN back to the EMM server. The EMM client (e.g., a Citrix client agent) logs onto EMM server and negotiates to construct a secure tunnel. Each application supports its own VPN tunnel to the EMM server. Apps can connect directly to services on EMM server through VPN tunnel, without requiring communications to pass through the EMM Client.

Improved techniques involve imposing control over managed applications which have been derived from unmanaged applications. Once the managed applications have been installed on electronic equipment such as electronic mobile devices, the managed applications operate based on management policies which are updated locally on the mobile devices in a routine manner.

For example, an application source such as an app store, a software developer, etc. may operate as a repository of unmanaged apps (i.e., applications which are not under local management policy control). An unmanaged app from the application source is then decompiled, augmented with a set of instructions that impose control based on a set of management policies, and then recompiled to form a managed application. The managed application is then offered through an application source (e.g., the same app store, a different app store, an enterprise application server, etc.) for use by mobile devices.

Once the managed application is installed on a mobile device, the managed application accesses, and operates in accordance with, a set of management policies which are separately maintained on the mobile device. Additionally, the managed application may request an updated set of management policies from the application source and operate in accordance with the updated set of management policies over time and in a routine manner.

Figure 32:
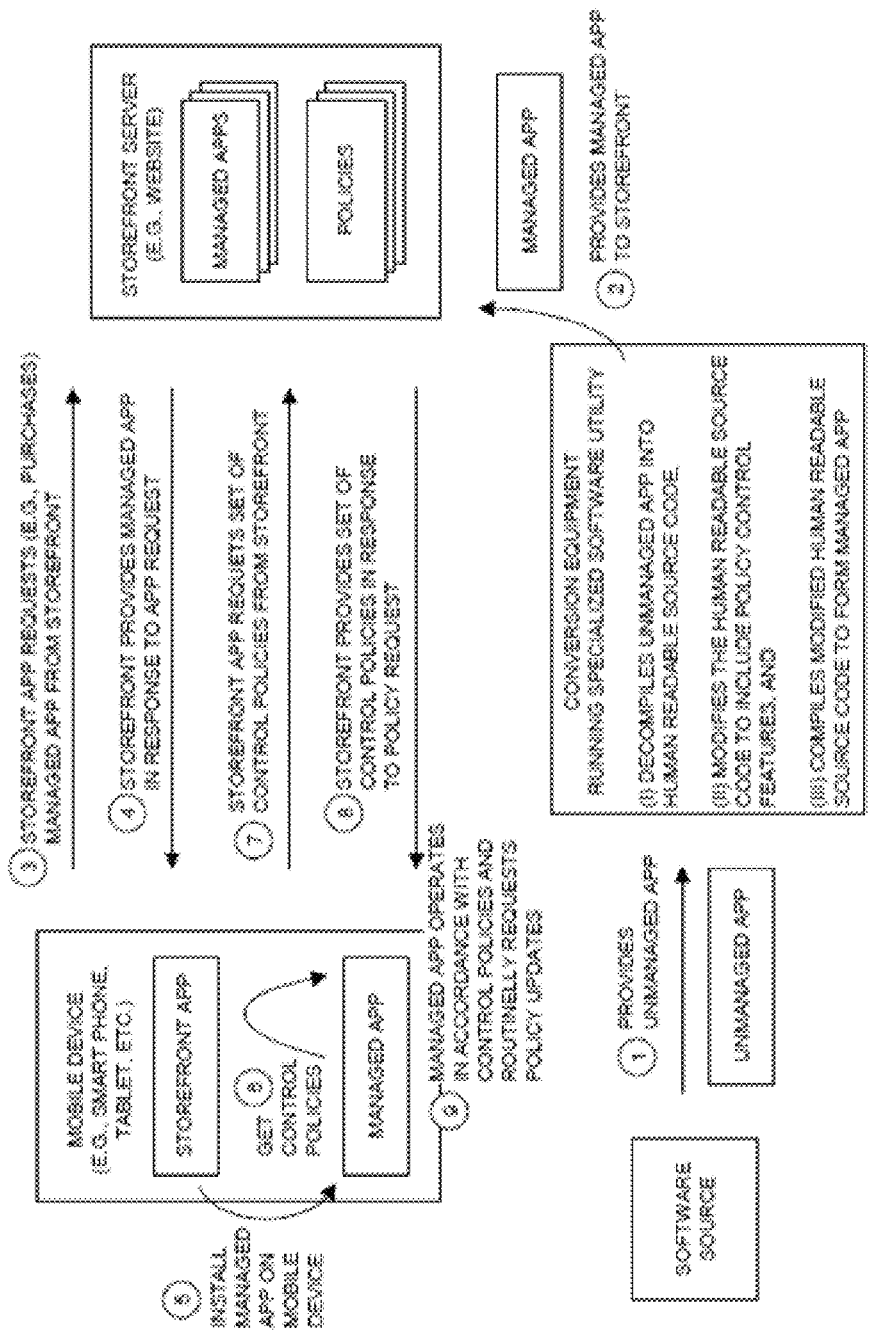
FIG. 32 illustrates an example electronic environment which is suitable for configuring management policies at a device.

FIG. 32 shows an electronic environment which is suitable for use. The electronic environment includes an application source, a software converting equipment running a specialized software utility, an application store server, and a mobile device (e.g., a smart phone, a tablet, etc.).

It should be understood that the application source and the application store server are shown as separate apparatus although, in some arrangements, they may be the same apparatus. In some arrangements, users of mobile devices purchase managed applications from the application store server, and the application store server operates as both a vehicle for distributing the managed applications as well as a management policy server for distributing management policies which control how the managed applications operate on the mobile devices.

It should be understood that the various apparatus of the electronic environment are computerized and communicate via electronic signals. For example, each computerized apparatus may include a communications interface to connect to a communications medium such as a network, memory to cache and/or persistently store information, and processing circuitry to execute an operating system and local applications.

During operation, the conversion equipment runs a specialized software utility which receives an unmanaged app from a software source (see step 1). The conversion equipment, when running in accordance with the specialized software utility, decompiles the unmanaged app into human readable source code. Then, the conversion equipment modifies the human readable source code to include management policy control features. In particular, the conversion equipment is constructed and arranged to analyze (e.g., scan and identify) activities and appropriate locations to inject management policy-based control instructions into the human readable source code. The conversion equipment then recompiles the human readable source code to form a managed app.

The application store server then loads the managed apps from the conversion equipment (see step 2) thus making the managed app available for distribution. Additionally, an administrator provides management policies which control the operation of the managed apps, and such management policies are also made available on the application store server for distribution.

Users of mobile devices are able to browse apps offered by the application store server via application store apps installed on the mobile devices. When a user of a mobile device wishes to acquire a managed app (e.g., via a purchase), the user directs the application store app on the mobile device to request the managed app (see step 3). The application store server response to the app request by providing the managed app to the mobile device (see step 4).

The user then installs the managed app on the mobile device (see step). Such installation may be automatically triggered by the application store app (e.g., the application store app automatically directs the operating system to install the managed app), or manually coordinated by the user.

When the user initially invokes the managed app, the manage app communicates with the application store app to obtain a set of management policies (see step 6). Such a set of management policies may have been provided to the application store app from the application store server during purchase. However, if the set of management policies is not present, the application store app sends a management policy request to the application store server for a set of management policies (see step 7). In response to the management policy request, the application store server provides the set of management policies to the mobile device (see step 8). It should be understood that the set of management policies and the managed app are separate software constructs.

At this point, the managed app is able to run in accordance with the set of management policies and thus enable the user to perform useful work (see step 9). Along these lines, the set of management policies may dictate times in which the managed app is to request an updated set of management policies. For example, the set of management policies may direct the managed app to obtain a new set of management policies daily, every two or three days, and so on.

When the managed app requires a new set of management policies, the managed app signals the application store app to retrieve the new set of management policies from the application store server (see step 6 again). That is, the application store app operates as a proxy and obtains the new set of management policies from the application store server on behalf of the managed app. In some arrangements, the mobile device runs multiple managed apps, and the same application store app communicates with the application store server on behalf of each managed app. One embodiment is directed to a method of generating a managed application from an unmanaged application. The method includes receiving, by processing circuitry, an unmanaged application from an application source, the unmanaged application being constructed and arranged to execute on a mobile device. The method further includes decompiling, by the processing circuitry, the unmanaged application into unmanaged source code which is human readable and editable. The method further includes adding, by the processing circuitry, a set of management policy-based control instructions to the unmanaged source code to form managed source code, the set of management policy-based control instructions being constructed and arranged to provide management policy-based control. The method further includes compiling, by the processing circuitry, the managed source code to form a managed application which, when executed on a mobile device, is constructed and arranged to access and operate in accordance with a set of management policies which is separately stored on the mobile device.

Examples of suitable processing circuitry includes particular hardware of various software development platforms such as servers, general purpose computers, client workstations, and so on. Such platforms may be equipped with various software development tools including compilers, linkers, libraries, editors, debuggers, other runtime environment and test utilities, and so on.

Another embodiment is directed to a method of operating an electronic mobile device. The method includes receiving, by a processor of the electronic mobile device, a managed application from an application server during a first communication, the managed application being constructed and arranged to access and operate in accordance with a set of management policies. The method further includes receiving, by the processor, the set of management policies from the application server during a second communication which is different than the first communication, the set of management policies being stored on the electronic mobile device separately from the managed application. The method further includes running, by the processor, the managed application on the mobile device, the managed application accessing and operating in accordance with the set of management policies which is stored on the electronic mobile device separately from the managed application.

Other embodiments are directed to electronic systems and apparatus, processing circuits, computer program products, and so on. Some embodiments are directed to various processes, electronic components and circuitry which are involved in generating, deploying and operating managed apps derived from unmanaged apps.

While various embodiments of the present disclosure have been particularly shown and described, it will be understood by those skilled in the art that various changes in form and details may be made therein without departing from the spirit and scope of the present disclosure as defined by the appended claims.

For example, it should be understood that mobile devices allow users to purchase and download applications for their device from an external Web Site or Service commonly referred to as an application store (e.g., StoreFront). The application that browses these application store services may be known as an application store app or storefront application. Once the application store app has downloaded and installed an application, typically management of that application may cease. For example, loss of entitlement to the application, or changes to the allowed uses of the application, may not be maintained or enforced. Once the application is installed on a device, the enterprise or corporation that distributed it may lose the ability to control access to the application.

Many vendors offer conventional solutions that manage the entire device. For example, a user wishing to install managed applications must first enroll their device into a corporate Mobile Device Management system (MDM). These MDM services usually require strict adherence to corporate security management policies, forcing the user to comply if they want to install the applications. In addition, by enrolling their device in an MDM system, often times the user must relinquish his/her control over certain aspects of their device, such as the ability to not have a passcode or password set.

Many employees would prefer to use their own devices but without enrolling their device in some MDM service. Accordingly, what is needed is a way for Corporations to manage Applications on unmanaged devices.

Improved techniques discussed within this disclosure provide a means by which a corporation can add management to applications and distribute those applications to unmanaged devices.

Some techniques are directed to a system and method for adding management to applications that are to be distributed to unmanaged devices. The system includes an Application running on a mobile device that acts as an application store app for downloading and installing other applications from one or more Sites or Services acting as an application store. The system further includes a Software Utility, which takes as input an unmanaged application and outputs the same application with additional management software added. The system further includes a set of security management policies or rules that control how the managed application is expected to operate.

Some techniques are directed to methods which involve an administrator generating a managed application by submitting an unmanaged application to the Software Utility. The method includes the Software Utility decompiling the original application into byte code. The method further includes modification of the byte code to inject the management software and components. The method further includes recompiling the modified application into a new and managed version of the application. The method further includes the managed application being posted to an application store and made available for download and install by the application store app. The method further includes the managed application periodically contacting the application store app to confirm entitlement and to refresh the security management policies.

Some improved techniques provide a means for an enterprise to provide managed applications to unmanaged devices, alleviating the need to enroll the device into Mobile Device Management Systems. Some improved techniques provide a means by which an Enterprise can distribute and control access to specific applications and data on devices that are not in its direct control, even if those applications were originally written with no management software included.

Some techniques are directed to a Software Utility (and associated methods) which dynamically injects management code into existing unmanaged applications. In this way, even applications that were originally developer without any management software can be added to the list of Enterprise Managed applications.

Furthermore, the application store app now acts as an Authentication and Security Management Policy management application. This extends the intent and use for a conventional storefront application in an improved way, allowing for management of specific applications on unmanaged devices.

Alternative conventional approaches usually involve either device management (where the entire device is enrolled into a management system) or rewriting applications with specific management components added as part of the core design of the application. However, with the above-described improved techniques, control may be imposed and dynamically updated via management policies which are routinely deployed locally to the mobile devices to direct the operation of the managed apps.

Enterprise Application Storefront

As described above with reference to FIG. 5, an enterprise mobility technical architecture may include an application store. An enterprise application store interface may, for example, generate one or more user interfaces and/or cause the one or more user interfaces to be displayed (e.g., on a mobile device, such as the computing device from which the identity credential was received). In one or more arrangements, the enterprise application store interface may enable a user, such as a user of a mobile device who may be accessing the enterprise application store to browse and/or download various applications. The enterprise application store interface may, for instance, be configured by one or more administrative users to include various features that may be specific to the organization or other enterprise that has deployed and/or is implementing the enterprise application store. For example, the enterprise application store interface may include a listing of one or more applications that are available to (and/or have been chosen, recommended, and/or licensed for) employees of the organization or enterprise (and/or other enterprise users who may be otherwise affiliated with the organization or enterprise). In addition, the one or more applications that are presented to a particular user (e.g., in a listing of applications included in the enterprise application store interface) may be selected by the enterprise application store based on the identity of the user. In some instances, an enterprise application store interface that is presented to a first user by an enterprise application store (which may, e.g., be provided by a first organization to employees and/or other users affiliated with the organization) may include a first set of applications, while an enterprise application store interface that is presented to a second user (who may, e.g., be different from the first user in terms of identity, role, etc.) by the enterprise application store may include a second set of applications different from the first set of applications. For instance, the second set of applications may include one or more applications that are selected by the enterprise application store for the second user based on a determination, by the enterprise application store, that the application(s) are recommended for and/or more appropriate for the second user (e.g., and perhaps not for the first user).

A request for an application may be received. For example, the enterprise application store may receive a request for a software application. For instance, the enterprise application store may receive a request from a computing device to download and/or otherwise provide a particular application that is available in the enterprise application store to the computing device. Such a request may, for instance, be received based on a user of the computing device (which may, e.g., be a mobile device, such as a smart phone, tablet computer, or other mobile computing device) selecting and/or requesting to download a particular application from the enterprise application store using the enterprise application store interface.

The application may be configured for operation at the computing device. For example, the enterprise application store may configure the software application based on credentials received from the computing device. In configuring the application, the enterprise application store may, for instance, establish one or more user-specific settings, apply one or more management policies, and/or otherwise modify generic and/or default settings of the application to be provided based on, e.g., received credentials as well as the identity, access rights, and/or privileges of the user.

For instance, in some embodiments, configuring the software application may include establishing one or more user-specific settings. For example, various application-specific settings may be defined and/or stored (e.g., for certain users with respect to various different applications) in one or more data sources, and in establishing user-specific settings, the enterprise application store may look up, access, and/or otherwise obtain these settings from the one or more data sources based on information or credentials received from the user. For instance, the enterprise application store may use the information and/or credentials to authenticate with the one or more data sources and to identify the particular user's application-specific settings (e.g., based on the user identity) in the one or more data sources.

Some examples of the user-specific settings that may be established by the enterprise application store include user account settings that may be set for a particular application (e.g., an email client, a web browser, document management software, etc.), network and/or connection settings that may be set for a particular application (e.g., an email client, a web browser, etc.), custom dictionary settings that may be set for a particular application (e.g., a word processor, an email client, etc.), custom view and/or display settings that may be set for a particular application (e.g., a word processor, a spreadsheet tool, an email client, document management software, etc.). Other examples of the user-specific settings that may be established by the enterprise application stored based on an identity credential include user interface settings (e.g., color settings, theme settings, etc.), language settings, time zone settings, currency settings, and/or other settings. While these examples illustrate some of the types of settings that may be established in some embodiments, as well as some of the types of applications for which some settings may be established, in additional and/or alternative embodiments, any other types of user-specific settings may be established for any of these and/or other types of applications.

In some embodiments, in configuring the software application, the application store may minimally configure an application, and subsequently, in providing the application to the recipient device, the application store may provide the minimally configured application to the recipient device. In some instances, a minimally configured application may be an application that has not been fully configured by the enterprise application store before it is provided to the recipient device. In other instances, in minimally configuring the application, the application store may, for example, establish one or more settings that may be essential to enabling functionality of the application (e.g., network and/or connection settings for a browser application or email client application) without establishing one or more settings that may be non-essential to enabling such functionality (e.g., color theme settings and/or other user interface settings for the browser application or email client application). In one or more arrangements, the non-essential settings instead may be established (and the applying may be fully configured) on the recipient device at runtime (e.g., when the application is executed, for instance, on the mobile device) and/or after runtime (e.g., as may be needed as a particular aspect of the application is invoked).

In some embodiments, the configured software application that is provided to the recipient device may be a stub application that corresponds to a virtualized application. For example, the stub application may provide a container or a client agent (which may, e.g., be provided on a user computing device) for a virtualized application that is executed on one or more remote servers and/or devices. In configuring such a stub application, the enterprise application store may establish one or more settings that facilitate execution of the virtualized application for the particular user (e.g., user account settings for the virtualized application and/or a virtualization platform, network and/or connecting settings for the virtualized application and/or a virtualization platform, etc.).

In some embodiments, the enterprise application store may also automatically provide applications to a device. For example, in instances in which the enterprise application store determines that certain devices and/or users are in need of certain applications (e.g., based on download history information for various applications and users, based on update and/or version history information for various applications and/or users, based on information provided by on-device monitoring agents for various devices and/or users, etc.), the enterprise application store may automatically provide the one or more needed applications to a particular device and/or user responsive to a determination that the user or device needs the application (e.g., without the user of such a device manually selecting to download the particular needed applications). Additional aspects regarding the enterprise application store will be appreciated with the benefit of this disclosure.

Operation of Applications and Devices Having Multiple Operation Modes in an Orchestration Framework for Connected Devices Systems and methods for cross-device coordination are described above as well as systems and methods for managing enterprise resources at computing devices. It will thus be appreciated with the benefit of this disclosure that a user may desire to interconnect both managed and unmanaged computing devices via an orchestration framework such that the computing devices can interact in a coordinated way to perform at least a portion of a computing activity. In addition, a set of interconnected and coordinated devices may include both managed and unmanaged applications. Therefore, a need exists for managing computing devices, applications, and other enterprise resources that are configurable to operate in a managed or an unmanaged mode.

Figure 33:
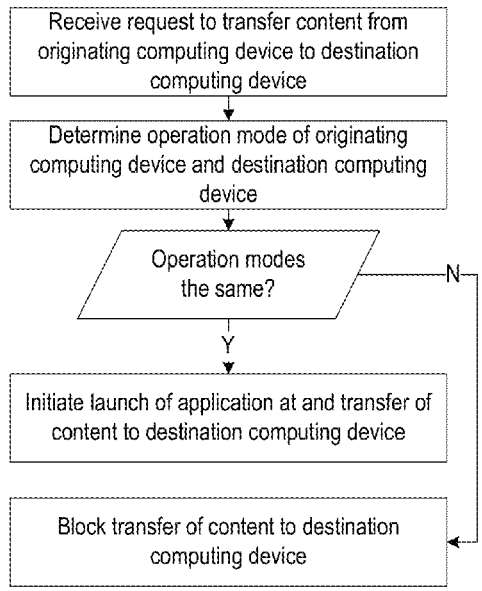
FIG. 33 is a flowchart of example method steps for transferring content between computing devices based on the operation mode of the computing devices.
Figure 34:
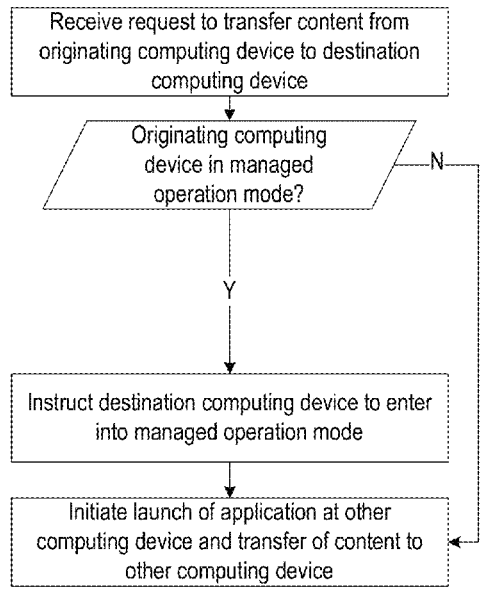
FIG. 34 is another flowchart of example method steps for transferring content between computing devices based on the operation mode of the computing devices.
Figure 35:
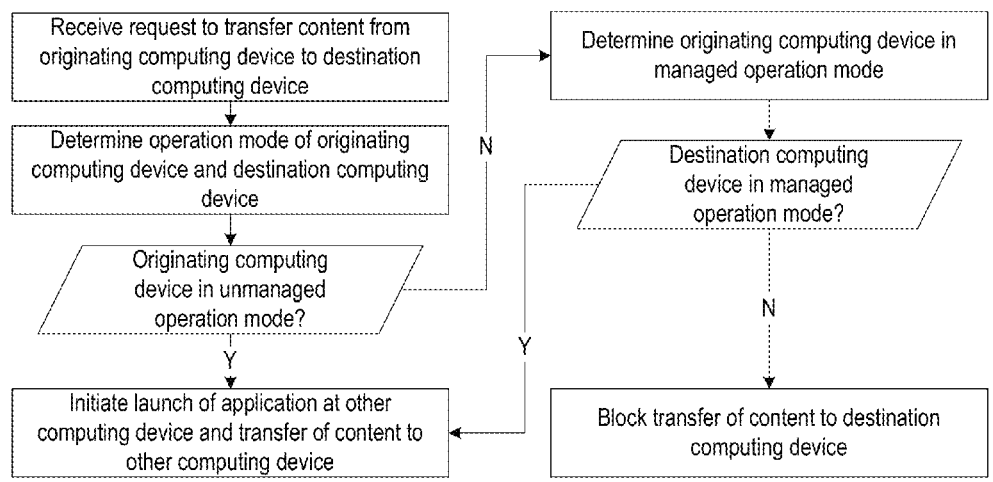
FIG. 35 is an additional flowchart of example method steps for transferring content between computing devices based on the operation mode of the computing devices.
Figure 36:
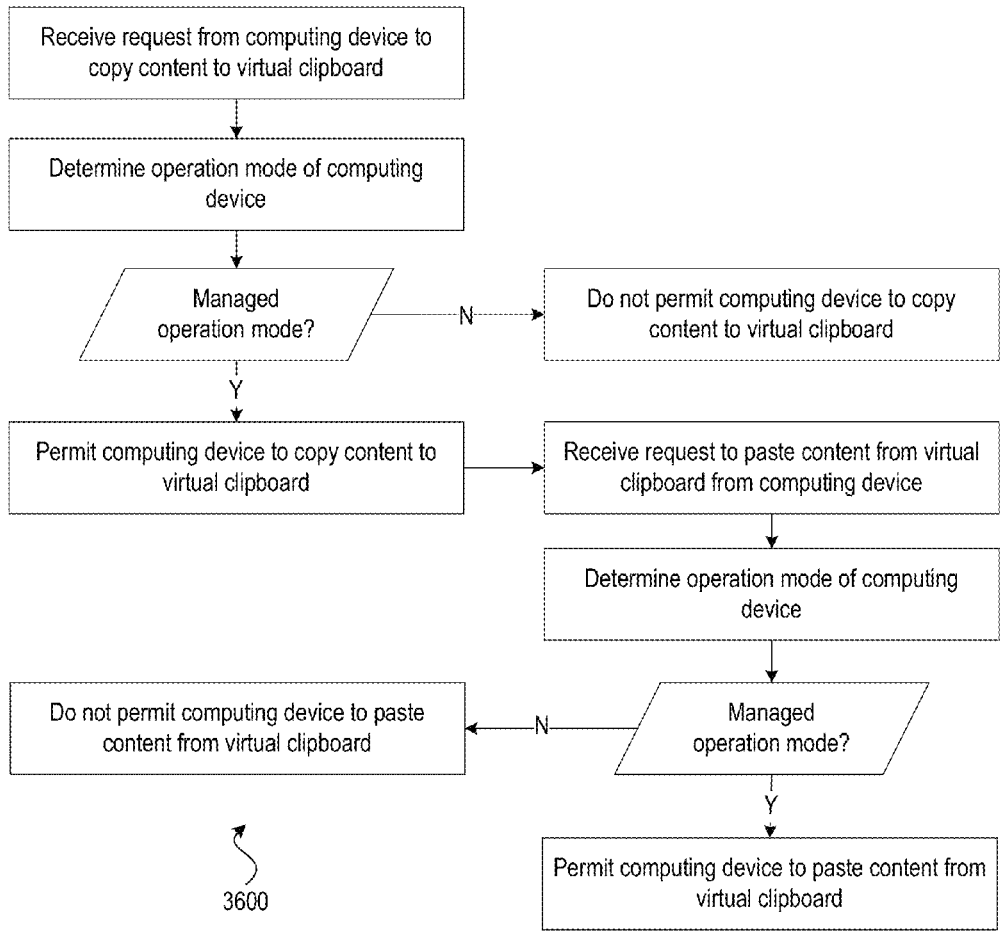
FIG. 36 is a flowchart of example method steps for determining whether to permit a request to copy to and paste from a virtual clipboard based on the operation mode of a computing device.
Figure 37:
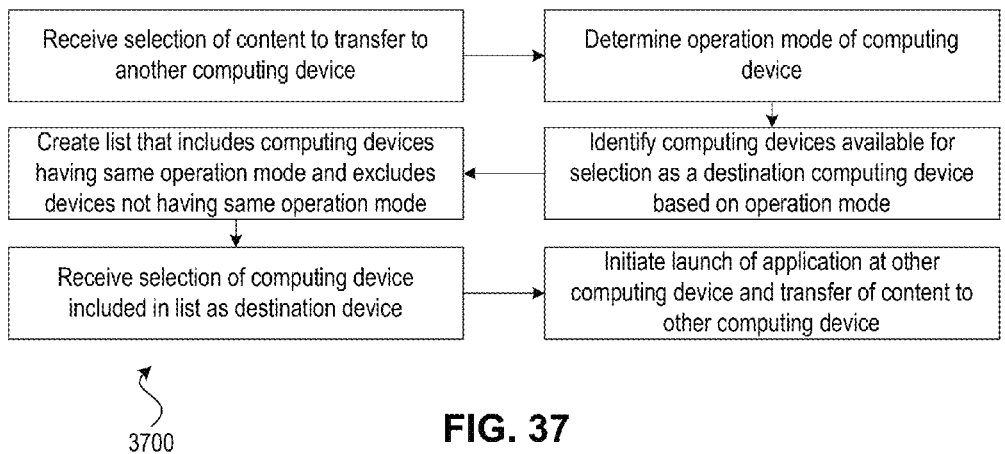
FIG. 37 is a flowchart of example method steps for identifying a set of computing devices available for selection as a destination computing device based on the respective operation modes of the computing devices.

FIGS. 33-37 illustrate flowcharts of example method steps for managing interactions between interconnected computing devices based on the operation mode of the computing devices. In particular, FIGS. 33-35 illustrate respective flowcharts 3300, 3400, and 3500 of example method steps for transferring content between computing devices based on the operation mode of the computing device. FIG. 36 is a flowchart 3600 of example method steps for determining whether to permit a computing device to copy to or paste from a virtual clipboard based on the operation mode of the computing device. FIG. 37 is a flowchart 3700 of example method steps for identifying a set of computing devices available for selection as a destination computing device to transfer content to. The various steps illustrated in the flowcharts of FIGS. 33-37 are described in further detail below. It will also be appreciated that the steps are shown by way of example only and that the principles disclosed in the flowcharts may be similarly applicable to applications residing at the computing devices and the operation modes of the applications.

As described above, a user may utilize an orchestration framework to transfer content from one computing device associated with the user to another computing device associated with the user. The content may also be transferred between computing devices in a peer-to-peer fashion. As described above, content transferred between computing devices may include document-based content, image-based content, video-based content, audio-based content, and web-based content. When the orchestration framework facilitates the transfer of the content between computing devices, the orchestration framework may determine whether transfer of content between computing devices is permitted based on operation mode which may include, e.g., a managed operation mode, an unmanaged operation mode, and a partially managed operation mode.

Whether and how the content is allowed to be transferred from one computing device (the originating computing device) to another computing device (the destination computing device) may depend on the operation mode of the originating computing device and the operation mode of the destination computing device. Likewise, the transfer of content from the originating computing device to the destination computing device may also depend on the operation mode of an originating application installed at the originating computing device and a destination application installed at the destination computing device. The transfer of content between computing devices may further depend on the operation modes of both the computing devices and the applications.

For example, if the originating computing device is in a managed operation mode, the orchestration framework may determine that transfer of the content to a destination device that is also in a managed operation mode is permitted. In this way, an enterprise may retain control over the content at both the originating computing device and the destination computing device. In a similar fashion, if the content is transferred from a managed application at the originating computing device, then the orchestration framework may determine transfer of the content to an application that is also in a managed operation mode at the destination computing device is permitted. If the orchestration framework determines transfer of the content between the computing devices based on operation mode is permitted, then the orchestration framework may initiate and facilitate the transfer of the content as described above. In a peer-to-peer communication context, the orchestration agent at the computing device may determine whether transfer of the content to another computing device is permitted and initiate and facilitate the transfer in response to a determination that the transfer is permitted. The orchestration framework (or orchestration agent) may initiate and facilitate the transfer of content by providing one or more instructions to the computing device selected to receive the content, e.g., to the orchestration agent or the application resolver of the destination computing device.

If the orchestration framework (or orchestration agent) determines that the transfer is not permitted, then the orchestration framework may block the transfer. The orchestration framework may block the transfer by, e.g., denying a request to initiate the transfer, refrain from initiating the transfer, or otherwise prevent the transfer from occurring by carrying out some action or not carrying out some action.

In some example implementations, the transfer of content between computing devices may be permitted when the computing devices are both in the same operation mode. For example, if both computing devices are in a managed operation mode, then the transfer of content between those devices may be permitted. Similarly, if both computing devices are in an unmanaged operation mode, then the transfer of content between those devices may be permitted. In other example implementations, the transfer of content between computing devices may not be permitted where each computing device is configured with a different operation mode. For example, the transfer of content between computing devices may not be permitted where one of the computing devices is in a managed (or partially managed) operation mode and one of the computing devices is in an unmanaged operation mode.

In further example implementations, however, transfer of content between computing devices having different operation modes may be permitted depending on which device is the originating computing device and which device is the destination computing device. In particular, transfer of content from an originating computing device in an unmanaged operation mode to a destination computing device in a managed (or partially managed) operation mode may be permitted. This may be because content residing at an unmanaged computing device has not been designated as sensitive content and thus may be received at, utilized by, access by, and presented by either a managed, partially managed, or unmanaged computing device. In contrast, transfer of content from an originating computing device in a managed (or partially managed) operation mode to a destination computing device in an unmanaged operation mode may not be permitted.

The principles described above are similarly applicable to the applications residing at the same or different computing devices. Transfer of content from applications that are each in the same operation mode may be permitted while transfer of content from applications in different operation modes may not be permitted. Additionally, transfer of content from an unmanaged application to a managed (or partially managed) application may be permitted while transfer of content from a managed (or partially managed) application to an unmanaged application may not be permitted.

In some example implementations, the orchestration framework may instruct the destination device or destination application to change operation modes before initiating and facilitating the transfer of the content. For example, if the originating device is in a managed operation mode and the orchestration framework determines that the destination device is in an unmanaged operation mode, then the orchestration framework may provide an instruction to the destination device instructing the destination device to change its operation mode to the managed operation mode. The orchestration framework may similarly instruct the destination application to change the operation mode of the destination application from an unmanaged operation mode to a managed operation mode.

As also described above, the orchestration framework may provide a virtual clipboard that enables computing devices to share and transfer content by copying to and pasting from the virtual clipboard. Whether a computing device or application has access to the virtual clipboard may also depend on the managed operation mode of the computing device or application. If the computing device or application is in an unmanaged mode, for example, then a request to copy content to the virtual clipboard may be denied. In this way, the orchestration framework (or orchestration agent) may block the computing device or application from copying to the virtual clipboard. In a similar fashion, a request to paste content from the virtual clipboard may be denied in response to a determination that the computing device or application is in the unmanaged mode. In this way, the orchestration framework (or orchestration agent) may block the computing device or application from pasting from the virtual clipboard. If, however, the computing device or application is in a managed operation mode, then the orchestration framework (or orchestration agent) may permit the computing device or application to copy content to the virtual clipboard and paste content from the virtual clipboard. A partially managed operation mode may, in some example implementations, be treated as a managed operation mode when making the various determinations described above.

As described in detail above, a user at a first computing device may select content (e.g., a video) to be shared. Having selected the content, the user may then select a second computing device (e.g., a display screen) to transfer the content to. The first computing device may then submit to the orchestration framework a request to transfer the content. The request may identify the content to transfer as well as the computing device to transfer the content to. As described above, the orchestration framework may determine whether the content is permitted to be transferred to the identified computing device and initiate and facilitate the transfer of content in response to a determination that the transfer is permitted.

The user may select the destination computing device or application from a list of computing devices or a list of applications presented to the user at the first computing device. In some example implementations, the list of computing devices or applications may include each computing device and application associated with and accessible by the first computing device. In other example implementations, the list of computing devices or list of applications may be dynamically determined based on the operation mode of the first computing device or an application at the first computing device. For example, the orchestration framework may determine that the first computing device is in a managed operation mode and notify the first computing device of the other computing devices and applications that are also in a managed operation mode. In this way, the list of computing devices and applications presented to the user as available for selection as a destination for the content includes only those computing devices and applications that the first computing devices is permitted to transfer content to.

The orchestration framework may also be configured to initiate launch of an application that is capable of presenting the content at the destination computing device, e.g., via the application resolver. The orchestration framework may also provide an instruction to the second computing device instructing the second computing device to configure the application in one of the operation modes. For example, the orchestration framework may receive a request to transfer content from the first computing device to the second computing device and determine that the first computing device is in a managed operation mode. The orchestration framework may thus instruct the second computing device to configure the application to also be in the managed operation mode before initiating and facilitating transfer of the content. In some example implementations, the orchestration framework may block launch of an application at the second computing device in response to a determination that the first computing device and the second computing device are in different operation modes.

It will be appreciated that the steps set forth by way of example in FIGS. 33-37 may be similarly applicable with respect to functionality of applications at the computing devices. In particular, a user may initiate a computing activity at one application residing at a computing device and request via the orchestration framework that a portion of that computing activity be performed by another application at another computing device. The orchestration framework may determine whether to fulfill the request based on the operation modes of the applications. The orchestration framework may not fulfill the request unless each application is in the same operation mode, e.g., unless both applications are in a managed operation mode or unless both applications are in an unmanaged operation mode. In some example implementations, therefore, the orchestration framework may permit the second application to perform at least a portion of the activity where each of the applications are in the same operation mode. In these example implementations, the orchestration framework may not permit, block, or otherwise prevent the second application from performing at least a portion of the computing activity when the respective operation modes of the first and second application are different.

In other example implementations, the orchestration framework may fulfill the request and permit the second application to perform at least a portion of the computing activity where the first application is in an unmanaged operation mode and the second application is in a managed operation mode. The orchestration may also determine whether to permit the second application to perform at least a portion of the computing activity based on the respective operation modes of the first and second computing devices.

Moreover, the orchestration framework may configure corresponding applications at respective computing devices based on the operation modes of the computing devices. If a first computing device includes an application and a second computing device includes a matching application, then the orchestration framework may enable or disable functionality of the applications based on the operation mode of one of the applications or based on the operation mode of one of the computing devices. For example, the orchestration framework may determine that the first application is in a managed operation mode and identify enabled functionality and disabled functionality at the first application. The orchestration framework, in this example, may then enable and disable the same functionality of the second application at the second computing device. The orchestration framework may also set the operation mode of the second application to match the operation mode of the first application. Moreover, the orchestration framework may enable or disable functionality of an application based on the operation mode of a computing device at which the application resides.

To provide a specific example, two computing devices may be interconnected via the orchestration framework, and each computing device may include a document editing application. The document editing application at one of the computing devices may be in a managed operation mode, and a save feature of the document editing application may be disabled. The orchestration framework may thus set the operation mode of the other document editing application at the other computing device to the managed operation mode and also disable the save feature of the other document editing application. Additional and alternative examples will be appreciated.

The orchestration framework may maintain a management policy that governs the transfer of content between devices. The management policy may indicate, for example, contexts in which transfer of the content is or is not permitted, launch of an application should or should not be performed, and so forth.

Managing Dynamic Management Policies and Settings in an Orchestration Framework for Connected Devices In addition to systems and methods for cross-device coordination, the description above also describes aspects of device management policies as well as application management policies. Aspects of device management and application management may thus also be applied in the context of computing devices interconnected via an orchestration framework that coordinates operation of a computing activity across the interconnected devices. Device management and application management may be performed when the devices are connected through an orchestration framework or when the devices are connected in a peer-to-peer fashion.

Figure 38:
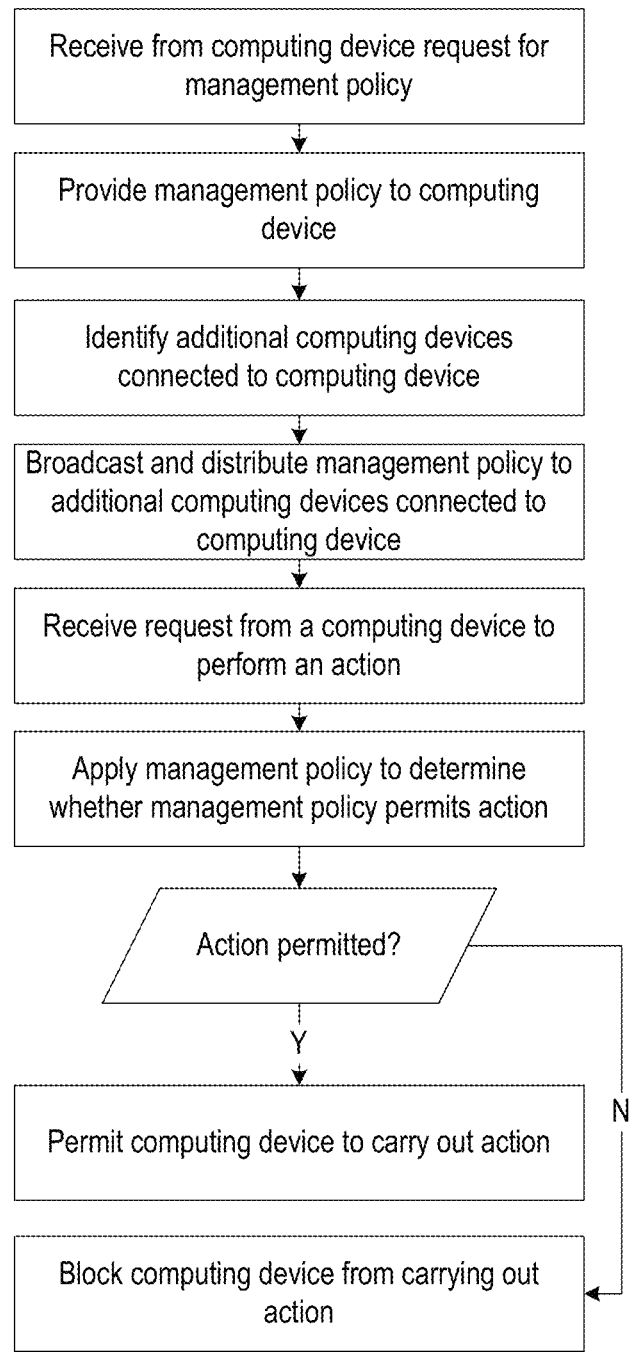
FIG. 38 is a flowchart of example method steps for obtaining a management policy and distributing the management policy among interconnected computing devices.
Figure 39:
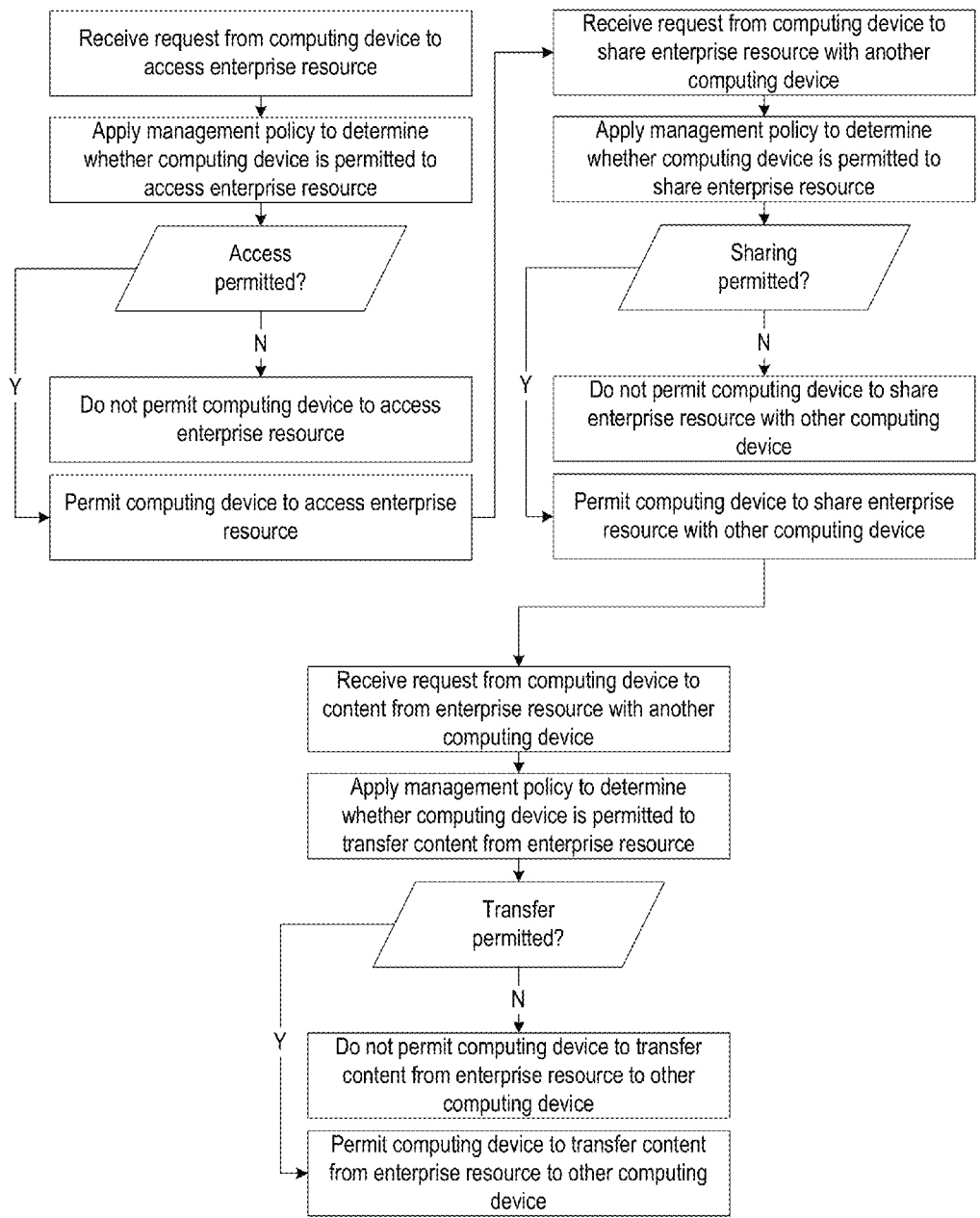
FIG. 39 is a flowchart of example method steps for applying a management policy to determine whether a computing device can access a resource, share the resource with another computing device, and transfer content from the resource to another computing device.
Figure 40:
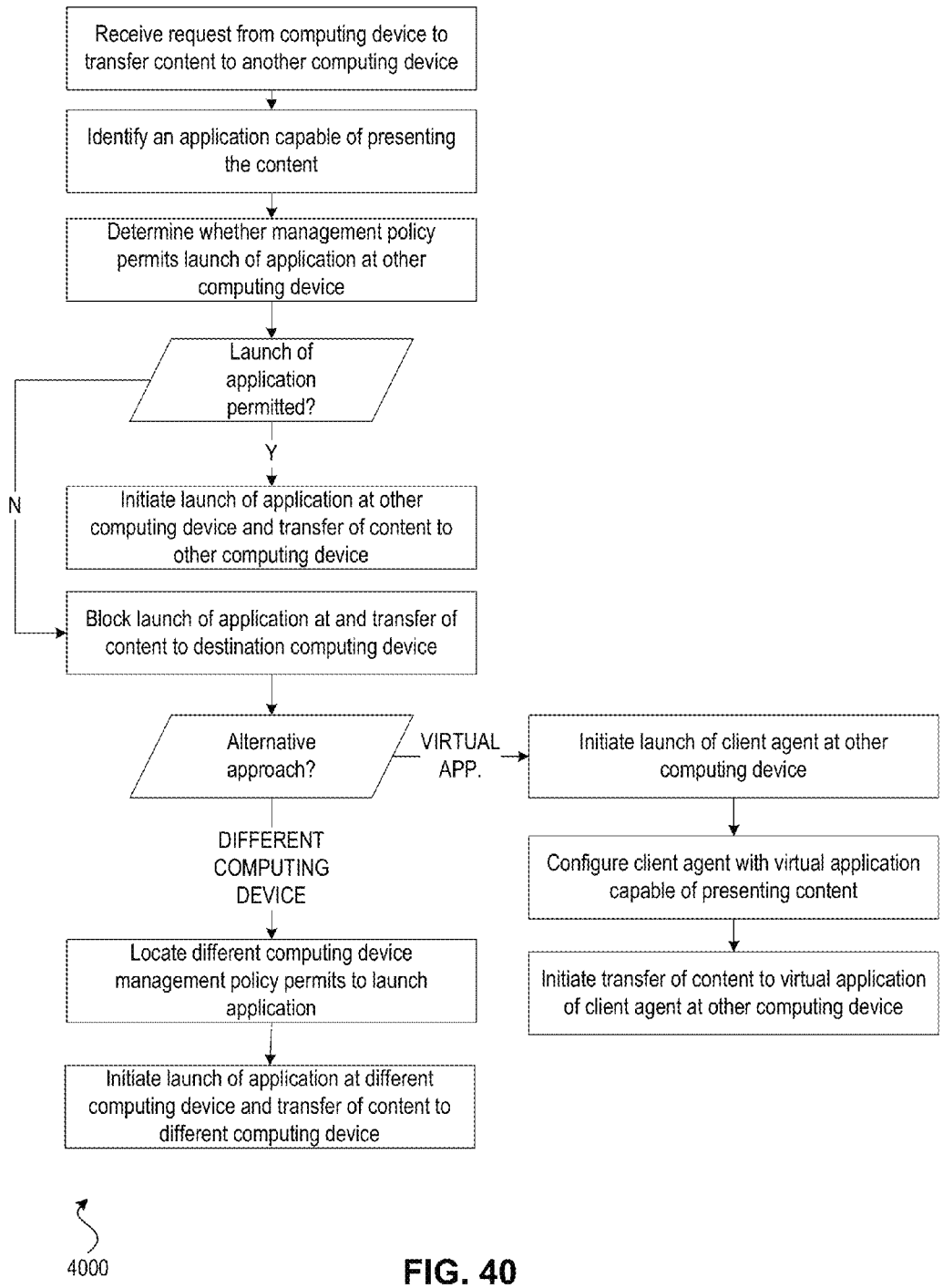
FIG. 40 is a flowchart of example method steps for applying a management policy to manage the transfer of content from one computing device to another computing device.
Figure 41:
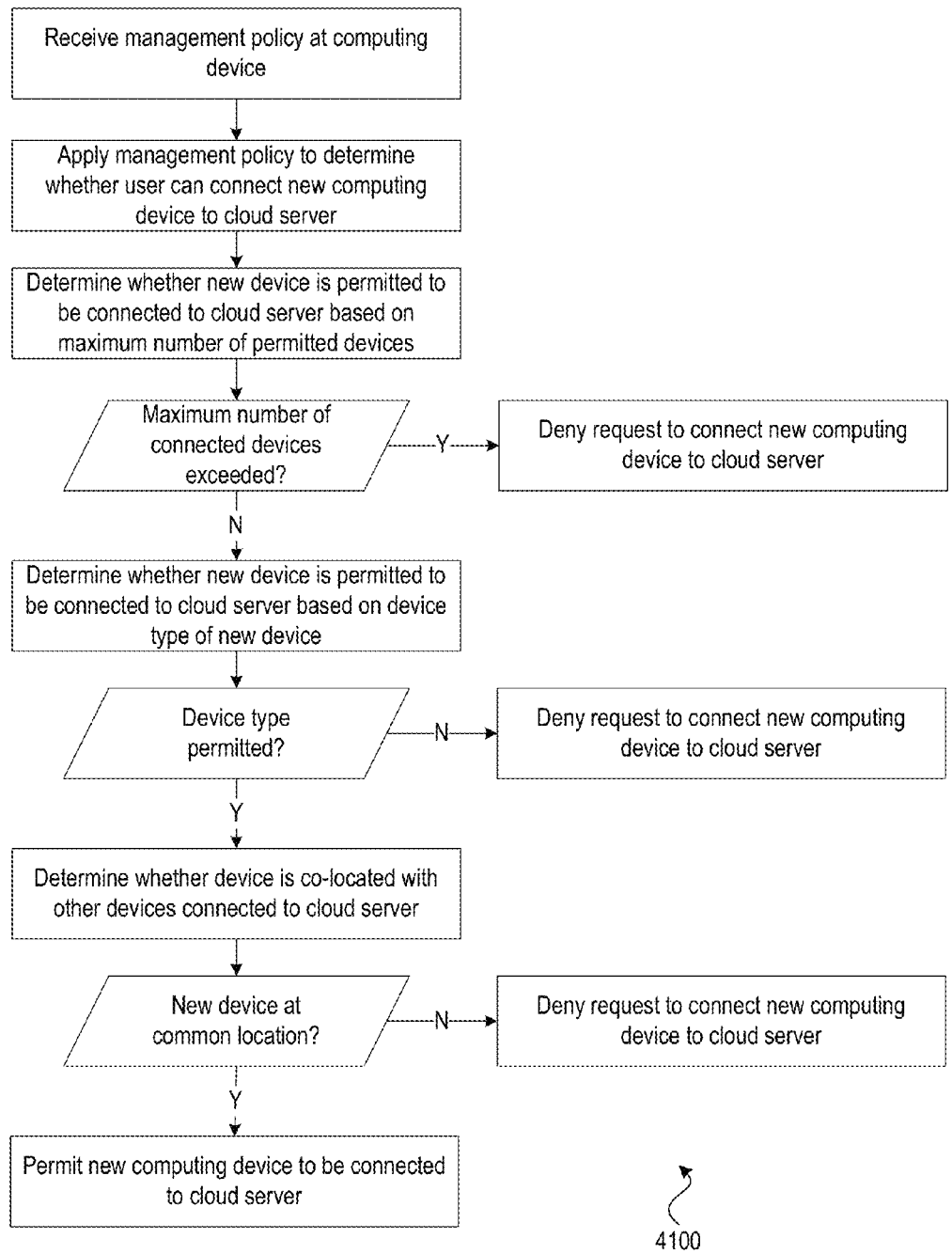
FIG. 41 is a flowchart of example method steps for applying a management policy to determine whether a user is permitted to connect a new computing device via an orchestration framework.

FIGS. 38-41 illustrate flowcharts of example method steps for obtaining management policies and applying the management policies to manage the interactions between the computing devices. In particular, FIG. 38 is a flowchart 3800 of example method steps for obtaining a management policy and distributing the management policy among interconnected computing devices. FIG. 39 is a flowchart 3900 of example method steps for applying a management policy to determine whether a computing device is permitted to access an enterprise resource, share that enterprise resource with another computing device, and transfer content from the enterprise resource to the other computing device. FIG. 40 is a flowchart 4000 of example method steps for applying a management policy to manage the transfer of content between interconnected computing devices. FIG. 41 is a flowchart 4100 of example method steps for applying a management policy to determine whether a user is permitted to connect a new computing device via the orchestration framework. The various steps illustrated in the flowcharts of FIGS. 38-41 are described in further detail below. It will also be appreciated that the steps are shown by way of example only and that the principles disclosed in the flowcharts may be similarly applicable to applications residing at the computing devices and the use of management policies to control operation of the of the applications.

In general, an orchestration framework may be configured to connect computing devices and manage the interaction between those computing devices such that computing activities are coordinated across the interconnected computing devices. The orchestration framework may maintain and apply a management policy that governs the interaction between the computing devices. The management policy may indicate the contexts in which various interactions are permitted and the contexts in which various interactions are not permitted. In particular, the orchestration framework may apply the management policy in response to receipt of a request from a first computing device to interact with a second computing device. Through the management policy, the orchestration framework may determine whether a requested interaction is or is not permitted. If the management policy indicates that the requested interaction is permitted, then the orchestration framework may approve the request and initiate and facilitate the interaction. If, however, the management policy indicates that the requested interaction is not permitted, then the orchestration framework may deny the request and block or prevent the interaction between the computing devices. As shown above, interaction may include, e.g., the transfer of content from one computing device to a second computing device. The orchestration framework may initiate and facilitate the interaction by providing one or more instructions to the computing devices, e.g., to the respective application resolvers or corresponding orchestration agents at the computing devices.

In some example implementations, the management policy may indicate whether a computing device may access an enterprise resource, share the enterprise resource with another computing device, or transfer content to another computing device. If the management policy indicates that a first computing device is permitted to access or share the enterprise resource or transfer content to another computing device, then the orchestration framework may permit and facilitate the access or sharing of the enterprise resource or the transfer of the content. If, however, the management policy indicates that the first computing device is not permitted to access or share the enterprise resource or transfer the content, then the orchestration framework may block or otherwise prevent the access or sharing of the enterprise resource or transfer of the content. For example, the management policy may permit a computing device of a first type to access an enterprise resource but not permit a computing device of a second type to access the enterprise resource. As another example, the management policy may permit a computing device to share the enterprise resource with another computing device of a first type but not permit the computing device to share the enterprise resource with another computing device of a second type. As a further example, the management policy may permit a computing device to transfer content to another computing device of a first type but not permit the computing device to transfer content to another computing device of a second type. Device type may be based on, e.g., the type of machine (desktop computer, laptop computer, tablet computer, mobile phone, etc.), the operating system at the device (iOS, Android, etc.), and other device-based criteria.

In addition, the management policy may indicate whether content is permitted to be transferred between computing devices based on content type. Content type may include, e.g., a document content type, an image content type, an audio content type, a video content type, and a web content type. As an example, the management policy may permit a computing device to transfer video content to a large display screen and may not permit video content to be transferred to a mobile phone.

Furthermore, the management policy may indicate whether an application is permitted to be launched at one of the computing devices connected to the orchestration framework (e.g., via a cloud server using a client-server communication session between orchestration agents using a peer-to-peer communication session). If, for example, the orchestration framework receives a request to transfer content from a first computing device to a second computing device, the orchestration framework may identify an application at the second computing device that is capable of presenting the content. The orchestration framework may then determine whether the management policy permits the application to be launched at the second computing device. If the management policy permits the application to be launched at the second computing device, then the orchestration framework may initiate launch of the application at the second computing device. If, however, the management policy does not permit the application to be launched at the second computing device, then the orchestration framework may block or otherwise prevent launch of the application at the second computing device. The orchestration framework may notify the first computing device that the request was denied so that the first computing device may select a new computing device to transfer the content to if desired.

In some example implementations, the management policy may indicate a class of applications that are or are not permitted to be launched at a computing device. Accordingly, the orchestration framework may initiate launch of an application of a first application class when the management policy indicates that applications in that application class are permitted to be launched at a computing device. The orchestration framework may also block or otherwise prevent launch of an application in a second application class when the management policy indicates that the applications in that application class are not permitted to be launched at the computing device. As an example the management policy may indicate that all applications capable of presenting video content are not permitted to be launched at a computing device.

Also in some example implementations, the management policy may include rules that apply to all interconnected computing devices as well as management policies that apply to individual computing devices. For example, the management policy may indicate that all computing devices are not permitted to launch a web browser application. As another example, the management policy may indicate that a specific computing device is not permitted to launch a video application. The management policy may identify the computing devices using a unique identifier associated with the computing device such as an IP address or MAC address. Furthermore, the rules of the management policy may indicate whether computing devices are permitted to interact based on the user associated with the interconnected computing devices or a user role associated with a user. For example, the management policy may indicate that all of the computing devices associated with a particular user are not permitted present audio content. Examples of user roles may include, e.g., presenter, participant, listener, etc. The management policy may thus indicate the interactions that are or are not permitted based on user role. As another example, the management policy may permit a user assigned the user role of presenter to transfer content between interconnected devices but not permit a user assigned the user role of listener to transfer content between interconnected devices.

If the management policy indicates that an application is not permitted to be launched at a computing device, the orchestration framework may be configured to initiate a client agent at the computing device instead of the application. The orchestration framework may also initiate configuration of the client agent with a virtual application that is capable of presenting the transferred content. In this way, the orchestration framework may facilitate the transfer and presentation of content at a computing device that is not permitted to launch a native application to present the content.

Additionally or alternatively, the orchestration framework may attempt to locate a computing device that is capable of presenting the content and that the management policy permits to present the content. If, for example, the management policy indicates that a selected computing device is not permitted to present the content, then the orchestration framework may initiate an attempt to locate a computing device at which to present the content instead. The orchestration framework may determine whether a replacement computing device includes an application that is capable of presenting the content and whether the management policy permits the replacement computing device to present the content. If the orchestration framework locates a replacement computing device that is capable of and permitted to present the content, then the orchestration framework may initiate the transfer of the content to the replacement computing device as described above.

The orchestration framework may also provide a management interface that includes various controls that allow an administrative user to create, modify, and delete management policies. The controls of the management interface may also allow an administrative user to create, modify, and delete respective rules for the various management policies maintained by the orchestration framework. The management interface may be implemented as, e.g., a desktop application, a mobile application, a web-based application, and the like.

In addition to managing the interactions between devices, the management policy may be used to manage the interconnection of devices to the orchestration framework or the interconnection of devices in a peer-to-peer fashion. In this regard, the management policy may indicate a maximum number of devices that a single user may interconnect. If the user requests interconnection of a device that would exceed the maximum permitted number of devices, then the request may be denied, and the user may be prevented from interconnecting the additional device. Similarly, the management policy may indicate whether a user is permitted to interconnect a device based on device type. For example, the management policy may indicate that the user is permitted to interconnect a tablet computer but not permitted to interconnect a mobile phone. As mentioned above, the management policy may indicate the types of interactions a user is permitted to perform and the types of interactions a user is not permitted to perform. For example, the management policy may indicate whether or not a user is permitted to transfer content to another computing device and whether the user is permitted to receive transferred content from another computing device. The management policy may include rules that are globally applicable to all users, to users of a particular user role or group, to individual users, and combinations of such.

The management policy may also be configured with rules regarding devices located at a common physical location. As described above, during a meeting a set of devices may be interconnected to help conduct the meeting. As noted above, an orchestration framework may interconnect the devices at the common meeting room location, and such devices may include, e.g., a television display for presenting video content, a mobile phone device to act as a speaker and present video content, and tablet computing devices for presenting a slide presentation. In this example context, the management policy may include rules indicating that computing devices determined to be at a common physical location are permitted to interact while computing devices that are not located at the common physical location are not permitted to interact. The management criteria may utilize the location of a computing device in combination with other criteria described above. For example, the management policy may indicate that even though a device is not located at the same location as the other devices connected to the orchestration framework, the computing device is permitted to interact with the other devices if the computing device is associated with a specific user or a user have a specific user role. It will be appreciated with the benefit of this disclosure that the management policy may include additional and alternative permutations and combinations of criteria that indicate whether a device can connect to the orchestration framework, whether the device can interact with other devices connected to the orchestration framework, and how the device may interact with those other interconnected devices.

Controlling Device Access to Enterprise Resources in an Orchestration Framework for Connected Devices Systems and methods for managing data vaults at computing devices and the content stored in those data vaults are described in conjunction with systems and methods for cross-device coordination. It will thus be appreciated aspects of data vault and content management may also be applied where computing devices are interconnected via an orchestration framework through a cloud service or in a peer-to-peer fashion. The orchestration framework may coordinate operation of a computing activity across the interconnected computing devices such that the computing devices each perform at least a portion of a computing activity. In particular, aspects of data vault management may be applied when transferring content from a first computing device (the originating computing device) to a second computing device (the destination computing device). Additionally, aspects of content management may be applied to selectively wipe content that has been transferred between devices. In this way, an enterprise may control sensitive content shared between coordinated devices.

Figure 42:
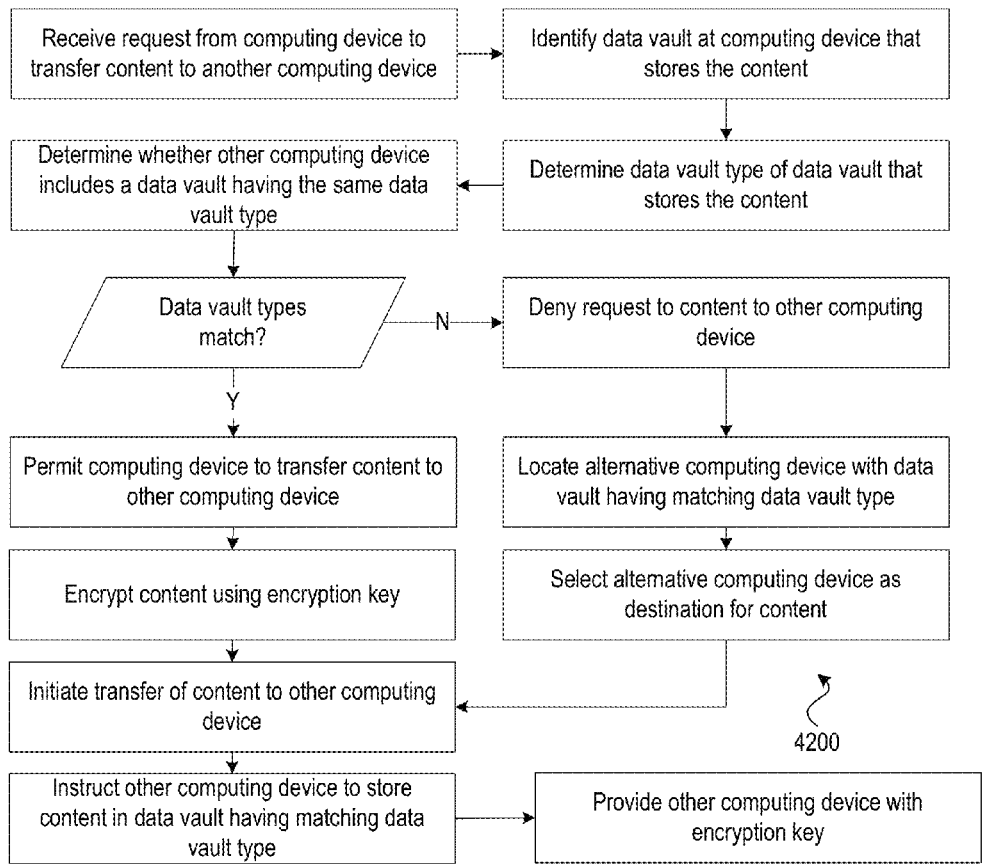
FIG. 42 is a flowchart of example method steps for transferring content between computing devices based on a data vault type of a data vault that stores the content at the computing devices.
Figure 43:
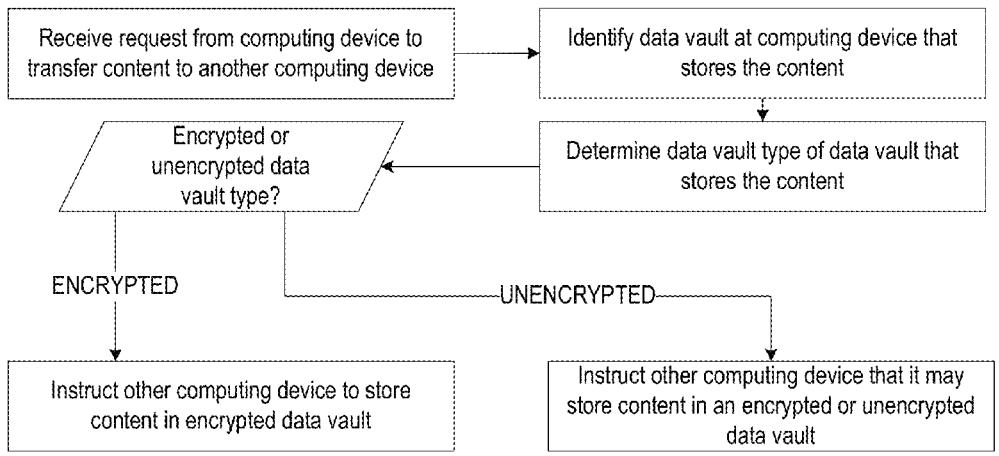
FIG. 43 is another flowchart of example method steps for transferring content between computing devices based on a data vault type of a data vault that stores the content at the computing devices.
Figure 44:
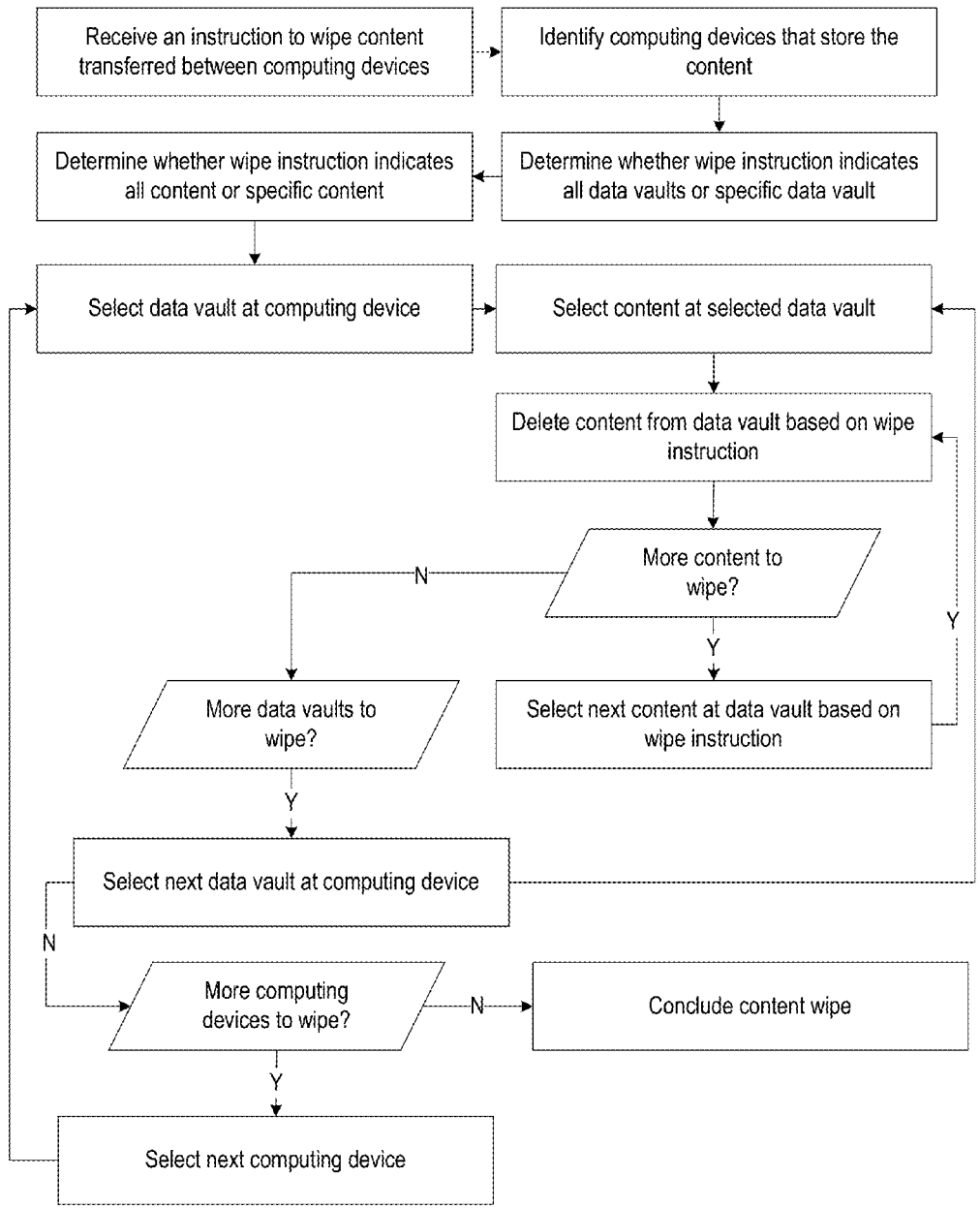
FIG. 44 is a flowchart of example method steps for carrying out an instruction to wipe content respectively stored at interconnected computing devices.
Figure 45:
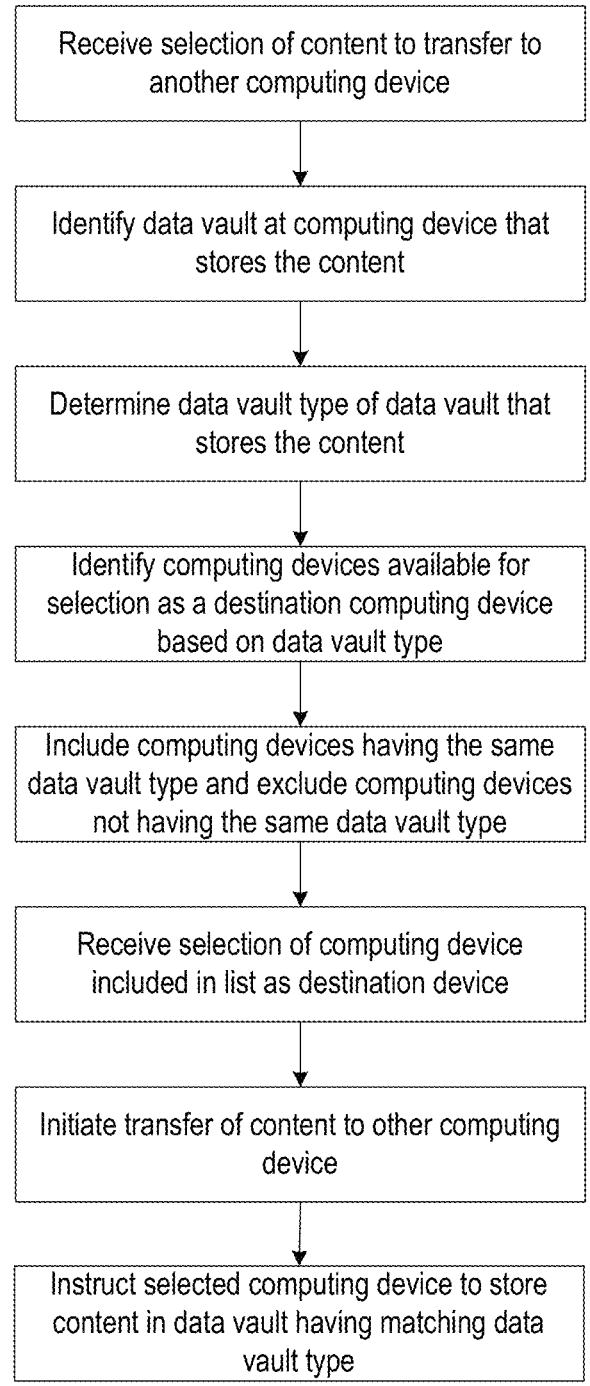
FIG. 45 is a flowchart of example method steps identifying a set of computing devices available for selection as a destination computing device based on the respective data vault types of data vaults at the computing devices.

FIGS. 42-45 illustrate flowcharts of example method steps for managing the storage of content at data vaults of interconnected computing devices. In particular, FIGS. 42-43 are respective flowcharts 4200 and 4300 of example method steps for transferring content between computing devices based on a data vault type of a data vault that stores the content at the computing devices. FIG. 44 is a flowchart 4400 of example method steps for carrying out an instruction to wipe content respectively stored at interconnected computing devices. FIG. 45 is a flowchart of example method steps for identifying a set of computing devices available for selection as a destination computing device based on the respective data vault types of data vaults at the computing devices. The various steps illustrated in the flowcharts of FIGS. 42-45 are described in further detail below. It will also be appreciated that the steps are shown by way of example only and that the principles disclosed in the flowcharts may be similarly applicable to applications residing at the computing devices and managing the storage of content transferred between applications.

In general, an orchestration framework may receive a request to transfer content from an originating device to a destination device. The orchestration framework may identify a data vault that stores the content at the originating computing device. As described above, the data vault may be encrypted or unencrypted and thus referred to as an encrypted data vault or an unencrypted data vault respectively.

The orchestration framework may thus instruct the destination device how the content should be stored at the destination computing device when transferred to the destination computing device. For example, the enterprise may require that sensitive data at the originating computing device be stored at an encrypted data vault. Accordingly, if the orchestration framework determines that the data to transfer is stored at an encrypted data store, the orchestration framework may instruct the destination computing device to also store the transferred content in an encrypted data store at the destination computing device. If the orchestration framework determines that the originating computing device stores the transferred content in an unencrypted data vault, then the orchestration framework may instruct the destination computing device to also store the content in an unencrypted computing device. It will be appreciated that the originating computing device may store content in the unencrypted data vault because the content has not been designated as sensitive content. Accordingly, in some example implementations, the destination computing device may choose to store the content either in an encrypted data vault or an unencrypted data vault.

Before transferring the content to the destination computing device, the originating computing device may encrypt the content with an encryption key as described above. The originating computing device may also provide the encryption key to the destination computing device such that the destination computing device can decrypt the transferred content.

In some example implementations, the orchestration framework may receive a request to transfer content from an originating computing device to a destination computing device. In response to receipt of the request, the orchestration framework may determine whether the destination computing device includes an appropriate data vault the second computing device may store the content in. For example, if the originating computing device stores the content in an encrypted data store, then the orchestration framework may determine whether the destination computing device also includes an encrypted data store. If the orchestration framework, in this example, determines that the destination computing device includes an encrypted data store, then the orchestration framework may initiate and facilitate transfer of the content from the originating computing device to the destination computing device. The orchestration framework may initiate and facilitate the transfer of the content by providing one or more instructions to the computing devices.

If, however, the orchestration framework determines that the destination computing device, in this example, does not include an encrypted data vault, then the orchestration framework may block or otherwise prevent the transfer of the content from the orchestration computing device to the destination computing device. In some example implementations, the orchestration framework may be configured to locate a replacement computing device to receive the content to be transferred in response to a determination that the destination computing device does not include an encrypted data vault to store the content. In this example, the orchestration framework may locate a computing device that does include an encrypted data store and select the replacement computing device to receive the content. The orchestration framework may thus initiate and facilitate the transfer of the content from the originating computing device to the replacement computing device selected to receive the content.

As described above the cloud service and orchestration agents may advantageously provide for cross-device coordination where sensitive content is transferred between computing devices. An enterprise, however, may desire to control the various computing devices that store sensitive content. Accordingly, the cloud service (or orchestration agent) may issue instructions to any computing devices that receive the content instructing those computing device to delete the content. As described above, such instructions may be referred to as a selective wipe instruction. In response to receipt of the instruction, a computing device may delete at least a portion of the content stored at its data vaults. The instruction may be a general wipe instruction such that a computing device deletes the content in both the unencrypted data vault and the encrypted data vault. The instruction may be relatively more targeted indicating that only content in the encrypted data vault should be deleted. If the computing device includes multiple encrypted data vaults the instruction may identify a particular data vault content should be deleted from. In some example implementations, the instruction may be target particular content stored at a data vault such that the computing device only deletes from the data vault the content identified in the instruction. Furthermore, the instruction may instruct the computing device to delete all of the content stored in the data store or only a portion of the content stored in the data store.

It will also be appreciated that various computing devices (e.g., the cloud data storage provider may store the content as it is transferred between the originating computing device and the destination computing device. Accordingly, the orchestration framework may be configured to provide a wipe instruction to each computing device along the path between the originating computing device and the destination computing device such that the transferred content may be wiped from each potential computing device that may store the content.

As described above, a user at a computing device may select content stored in an encrypted data vault to transfer to another computing device. In some example implementations, the orchestration framework may identify a set of computing devices that also include encrypted data vaults and provide a list of those computing devices to the computing device. The list may thus include one or more computing devices available for selection as the destination computing device because the computing devices listed include an encrypted data vault to store the transferred content. Correspondingly, the list may exclude any computing devices that do not have an encrypted data store to store the transferred content. In this way, the orchestration framework may control which computing devices are available for selection to transfer content to based on the types of data vaults at those computing devices. The user may thus select one of the computing devices in the list, and the orchestration framework may initiate and facilitate the transfer of the content to the selected computing device.

In some example implementations, a computing device may include multiple data stores that are separate and distinct from one another. For example, a computing device may include a data vault that is a dedicated area of storage physically isolated from other data stores of the computing device. More particularly, a computing device may include main data stores of read-only and random access memory for carrying out typical computing operations. The computing device, in this example, may also include a data vault that is physically separate and distinct from the main data stores in order to allow for secure management of the computing device, applications at the computing device, and any sensitive or confidential resources residing at the computing device.

Single Sign-on Access in an Orchestration Framework for Connected Devices

Along with systems and methods for cross-device coordination, systems and methods for authenticating computing devices are described above. As described above, a computing device may request authentication in order to access an enterprise resource. If the computing device is successfully authenticated, the computing device may be provided with access credentials that allow the computing device to access and utilize the enterprise resource. In the context of cross-device coordination, access credentials may be provided to multiple computing devices interconnected via an orchestration framework such that the interconnected computing devices may also access the enterprise resource when performing at least a portion of a computing activity.

Figure 46:
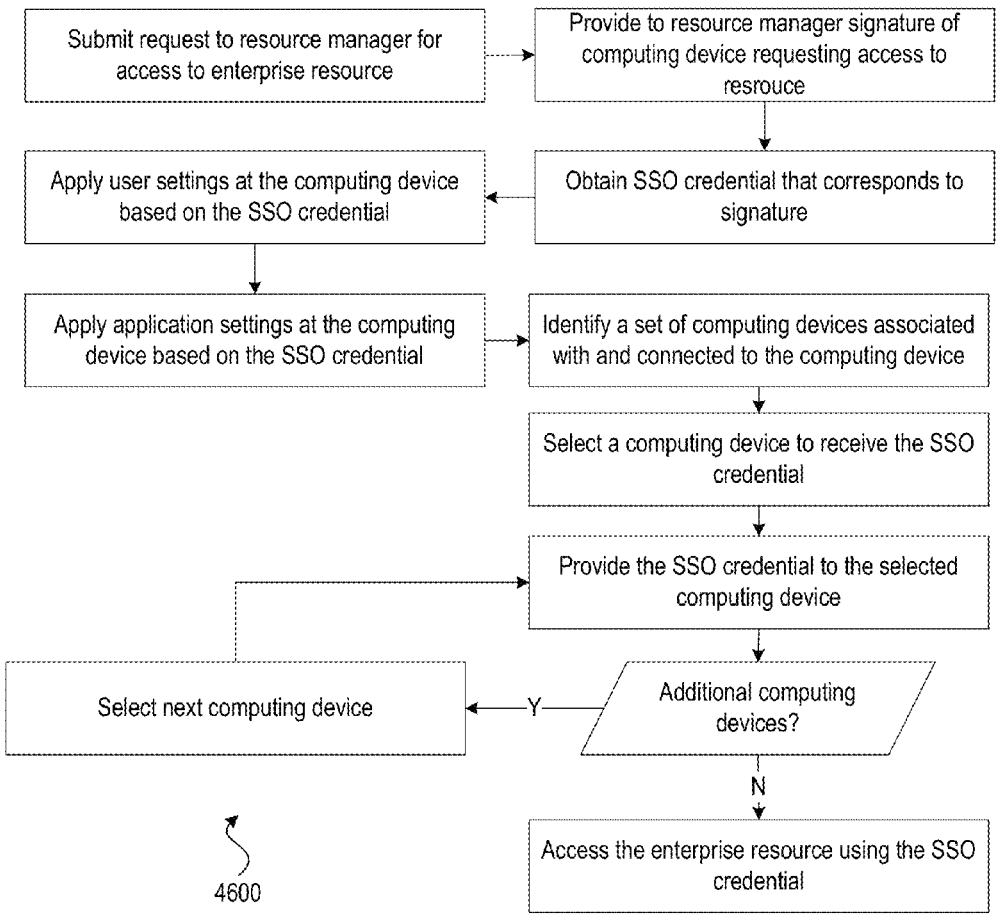
FIG. 46 is a flowchart of example method steps for obtaining SSO credentials for interconnected computing devices.
Figure 47:
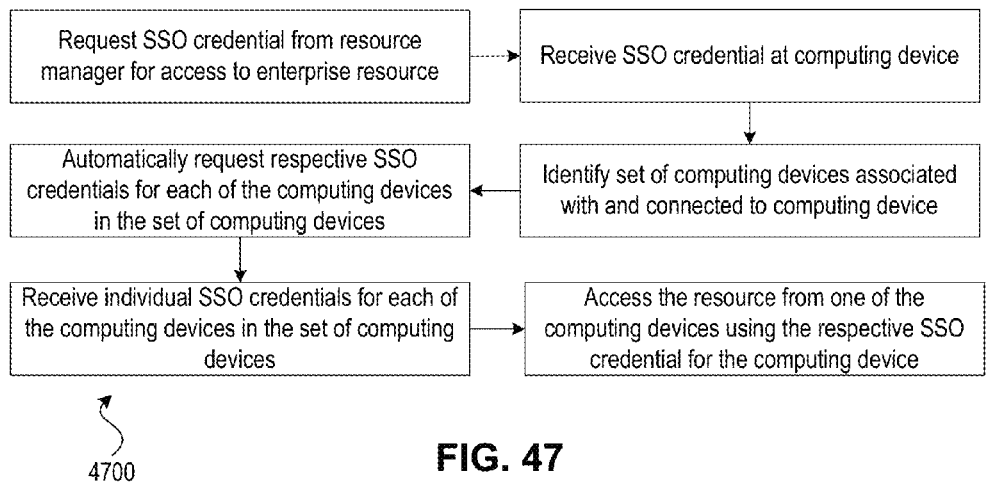
FIG. 47 is another flowchart of example method steps for obtaining SSO credentials for interconnected computing devices.

FIGS. 46-47 illustrate flowcharts of example method steps for obtaining SSO credentials for interconnected computing devices in order to enable the computing devices to access an enterprise resource. In particular, FIGS. 46-47 are respective flowcharts 4600 and 4700 of example method steps for obtaining SSO credentials for interconnected computing devices. The various steps illustrated in the flowcharts of FIGS. 46-47 are described in further detail below. It will also be appreciated that the steps are shown by way of example only and that the principles disclosed in the flowcharts may be similarly applicable to applications residing at the computing devices and obtaining SSO credentials for applications such that the applications are enabled to access enterprise resources.

In general, multiple computing devices may be interconnected through an orchestration framework in a client-server fashion through an orchestration agent at a computing device communication with a cloud server or in a peer-to-peer fashion through respective orchestration agents at the computing devices communicating with each other. Multiple interconnected computing devices may be associated with one another, e.g., through an association with a common user. The interconnected computing devices may interact with one another, e.g., to exchange content. A proxy may be configured to authenticate a computing device and provide the computing device with a single sign-on (SSO) credential to access an enterprise resource.

A computing device may submit to the proxy a request to access the enterprise resource. A resource manager may manage access to one or more enterprise resources. The proxy may thus request access credentials from the resource manager on behalf of the computing device in order to obtain access credentials for the computing device as described above. In response to receipt of the request, the proxy may initiate authentication of the computing device to determine whether the computing device is permitted to access the enterprise resource. Upon successful authentication, the proxy may provide the computing device (the authenticated computing device) with an SSO credential received from the resource manager. The computing device may thus access the enterprise resource using the SSO credential. The proxy may request and the computing device may provide a unique identifier that the SSO credential is based on. As described above, the unique identifier may be, e.g., a signature of the computing device, and the SSO credential may be, e.g., a session key.

In a cross-device coordination context, a user may desire that each of the interconnected computing devices also have access to the enterprise resource. Accordingly, after a computing device is authenticated and enabled to access an enterprise resource, one or more additional computing devices may automatically enabled to access the enterprise resource as well. In some example implementations, the SSO credential may be provided to another one of the computing devices such that the other computing device is enabled to access the enterprise resource using the SSO credential. The SSO credential may be provided to one, some or all of the computing devices associated with the authenticated computing device. In this way, one computing device may be authenticated and enabled to access the enterprise resource, and the computing devices associated with the computing device may automatically be provided with the access credentials used to access the enterprise resource. The orchestration framework may initiate the transfer of the SSO credential to a computing device. In other example implementations, additional computing devices may be enabled to access the enterprise resource by obtaining individual SSO credentials for each computing device to be enabled to access the enterprise resource. Furthermore, the computing device itself may access the enterprise resource using the SSO credential or the proxy may access the enterprise resource using the SSO credential on behalf of the computing device.

As an example, a first computing device (an originating computing device) may transfer content to a second computing device (a destination computing device). As described above, the originating computing device may store the content at a file storage service and initiate a notification to the destination computing device that the content is available from the file storage service. Upon receipt of the notification, the destination computing device may retrieve the content from the file storage service. In this example, the originating computing device may receive an SSO credential that enables the originating computing device to access the file storage service. The originating computing device may thus access the file storage service using the SSO credential in order to store the content to transfer to the destination computing device. The SSO credential may then be provided to the destination computing device, and the destination computing device may utilize the SSO credential to access the file storage service and retrieve the transferred content.

A computing device may establish one or more user settings based on the SSO credential. Upon sharing the SSO credential with another computing device one or more matching user settings may also be established at the other computing device. In this way, interconnected computing devices may be similarly configured for accessing enterprise resources using the SSO credential. In a similar fashion, configuration settings of an application at a computing device may be set based on the SSO credential. The SSO credential may thus be provided to another one of the computing devices such that a corresponding application may be configured with matching settings based on the SSO credential. Additionally, the orchestration framework may maintain a list that identifies the computing devices. The orchestration framework may also maintain a list that identifies respective login credentials associated with the computing devices connected to the orchestration framework. Furthermore, the orchestration framework may apply one or more management policies to the computing devices or the applications at the computing devices based on the SSO credential. In some example implementations, the orchestration framework may select a management policy to apply based on a user role associated with the SSO credential.

As also described above, an originating computing device may initiate transfer of content to a destination computing device. In some situations, however, the destination computing device may not include an application capable of presenting the computing resource. In response to a determination that the destination computing device does not include an application capable of presenting the transferred content, a client agent may be launched at the destination computing device. The client agent may also be configured with a virtual application capable of presenting the computing device. In order to enable the client agent or the virtual application to access the enterprise resource, the SSO credential may be provided to the client agent at the destination computing device.

The orchestration framework may also be employed to ensure consistency of SSO credentials between corresponding applications operating at respective computing devices. For example, SSO credentials may periodically timeout, and a user may re-login to obtain new SSO credentials. Upon receipt of the new SSO credentials after re-login, the orchestration framework may broadcast the new SSO credentials to other interconnected computing devices and applications at those computing devices. In this way, new SSO credentials received at one computing device may be automatically kept consistent and made available to associated computing devices and applications for continued coordination of computing activities in a seamless fashion.

Application Management Framework for Secure Data Sharing in an Orchestration Framework for Connected Devices Systems and methods for cross-device coordination among interconnected computing devices are described above in addition to systems and methods for applying management policies to applications at computing devices and convey data between those applications. It will thus be appreciated that aspects of management policy configuration and inter-process communications may be applied in the cross-device coordination context. In particular, management policies may be respectively applied at computing devices that are interconnected via an orchestration framework that coordinates operation of a computing activity across the interconnected computing devices.

Figure 48:
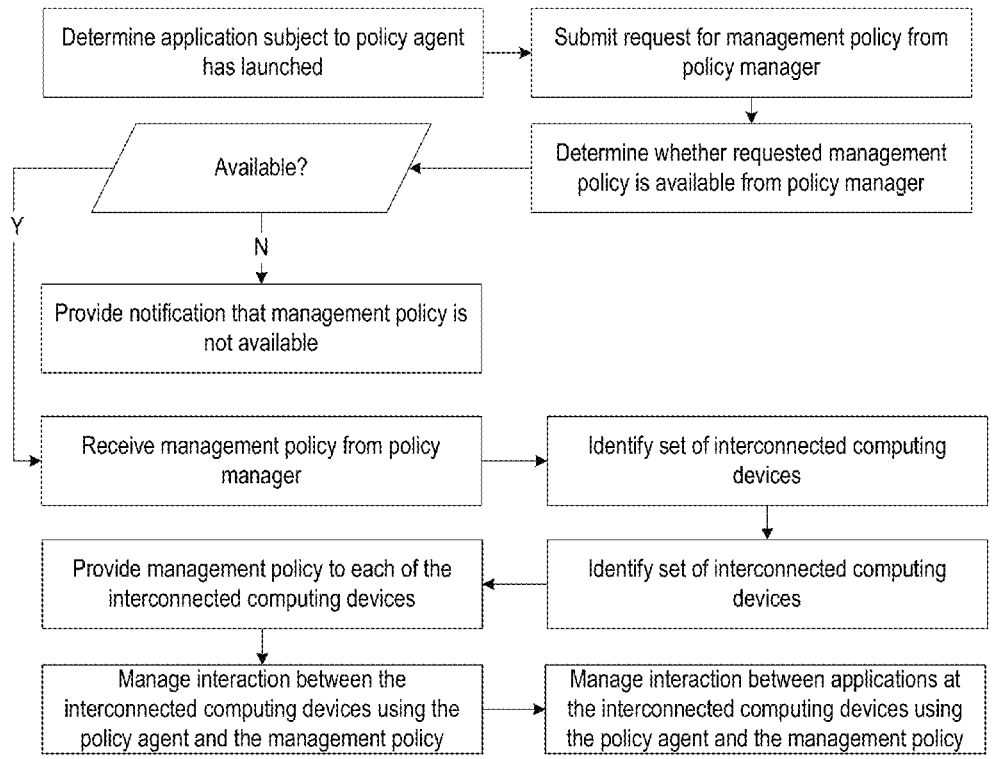
FIG. 48 is a flowchart of example method steps for providing a management policy to interconnected computing devices that include respective policy agents.
Figure 49:
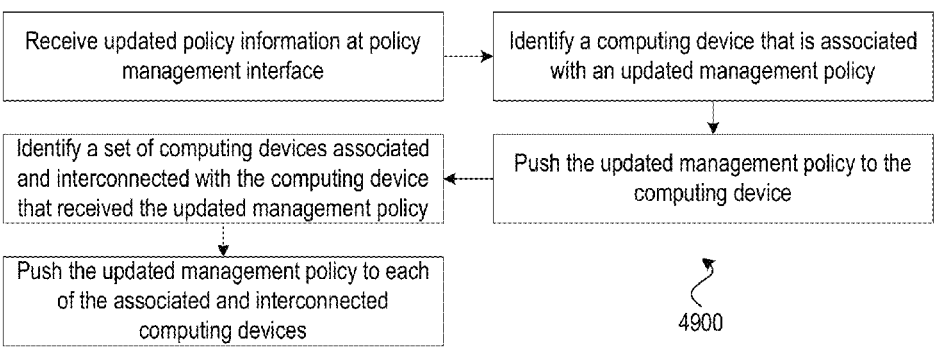
FIG. 49 is another flowchart of example method steps for providing a management policy to interconnected computing devices that include respective policy agents.
Figure 50:
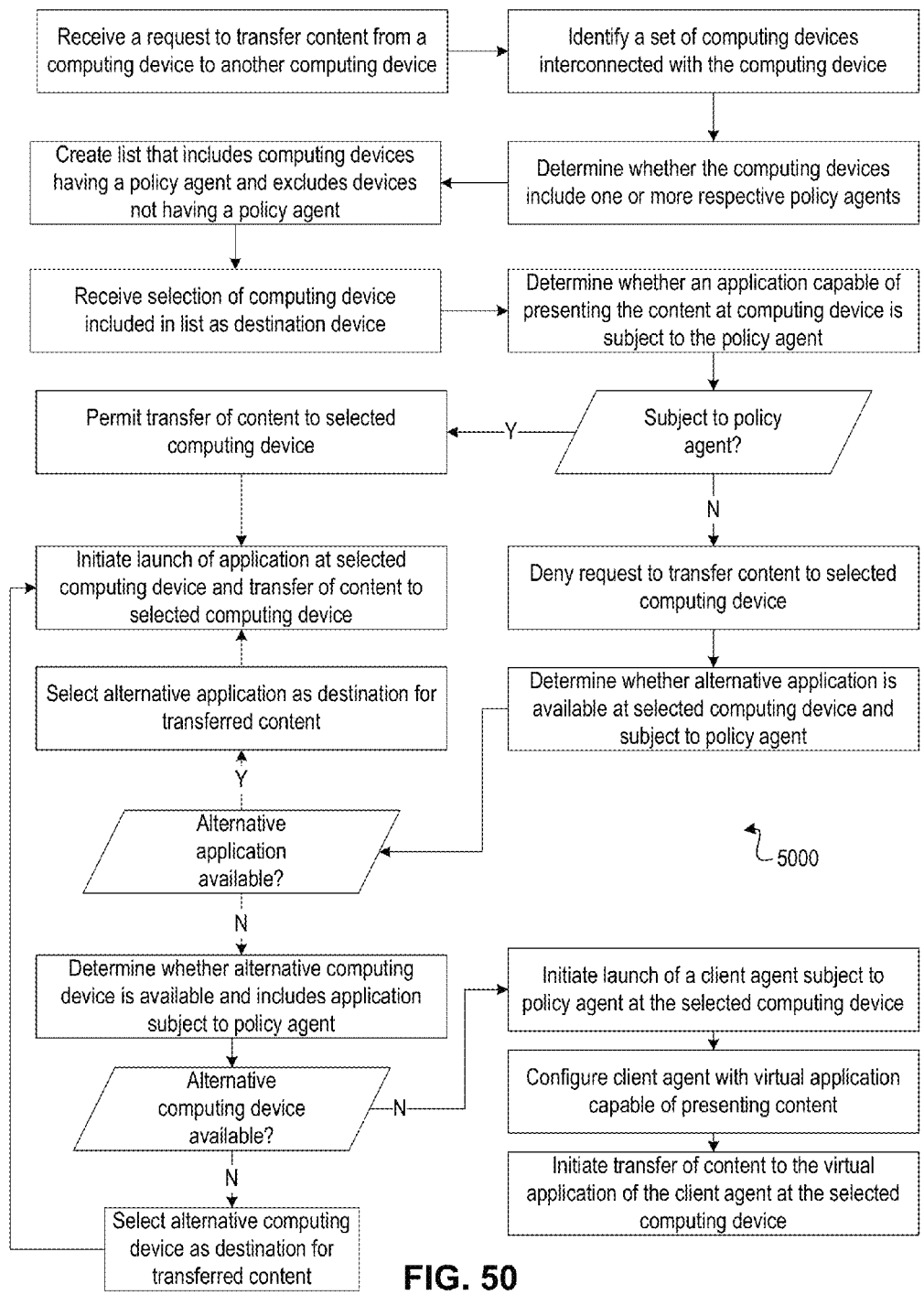
FIG. 50 is a flowchart of example method steps for managing the transfer of content from a computing device subject to a policy agent to another computing device subject to a policy agent.

FIGS. 48-50 illustrate flowcharts of example method steps for using policy agents and management policies to manage operation of interconnected computing devices. In particular, FIGS. 48-49 are respective flowcharts 4800 and 4900 of example method steps for providing a management policy to interconnected computing devices. FIG. 50 is a flowchart 5000 of example method steps for transferring content from one computing device subject to a management policy to another computing device subject to a management policy. The various steps illustrated in the flowcharts of FIGS. 48-50 are described in further detail below. It will also be appreciated that the steps are shown by way of example only and that the principles disclosed in the flowcharts may be similarly applicable to applications residing at the computing devices and using policy agents and management policies to manage operation of applications subject to the policy agents.

An orchestration framework may interconnect one or more computing devices and facilitate interaction between those computing devices as described above. Additionally, a set of computing devices may be interconnected in a peer-to-peer fashion in which an orchestration agent facilitates interaction between the computing devices. A policy agent at the computing devices may be in signal communication with a policy manager. In some example implementations, the policy manager may be located remote from the policy agent, e.g., at the orchestration framework. The policy agent may utilize a management policy received from the policy manager to control the operation and functionality of the various applications residing at the computing devices. As described in detail above, the policy agent may be an application wrapper that wraps an application at a computing device. Accordingly, a computing device may include multiple policy agents as the respective application wrappings of the applications at the computing device. In other example implementations, the policy agent may be a management policy enforcement agent that resides at the computing device distinct from the applications. When an application is subject to a policy agent that controls operation of the application, the application may be referred to as a managed application. If the application is not subject to a policy agent, then the application may be referred to as an unmanaged application.

The policy manager may provide one or more management policies to the interconnected computing devices. The policy agents at the computing devices may thus apply the management policies to permit the applications to carry out various functionality or prevent the applications from carrying the functionality. The management policies may be global management policies that apply to all of the interconnected computing devices or applications or that apply to individual computing devices or applications as described in detail above. An orchestration framework may provide a management policy configuration interface that provides controls allowing an administrative user to add, modify, or delete management policy information. For example, the administrative user may create new management policies or modify existing management policies with updated management policy information.

In a cross-device coordination context, it may be desired that interconnected computing devices operate with respect to the same management policies. For example, it may be desired that each computing device associated with a user operate under a common management policy that is configured for the user role of the user. Accordingly, a policy agent of a computing device may request a management policy from the policy manager, and the policy manager may provide the computing device with a requested management policy when the management policy is available. If the requested management policy is not available, the policy manager may notify the computing device that the requested management policy is not available.

In some example implementations, the policy agent may request indication of whether it has the most up-to-date management policy, in other words, whether the policy manager includes updated management policy information, e.g., a new or updated management policy. If the policy manager does include updated management policy information, then the policy agent may request the update management policy information from the policy manager. As noted above, the policy manager may provide update management policy information to a policy agent at a computing device in response to receipt of a request from the policy agent at the policy manager. In some example implementations, however, the policy manager may push the updated management policy information to the policy agent in response to receipt of the updated management policy information at the policy manager. In this way, the policy agents at the computing devices may receive the management policies without requesting them from the policy manager.

The policy agent may monitor the applications at a computing device and request the management policy in response to a determination that an application has launched at the computing device. The policy agent may request and receive updated management policy information when it is available from the policy manager as described above. In this way, the policy agent may ensure that it has the most up-to-date management policies before the application is permitted to operate, e.g., to access enterprise resources.

In order to consistently apply the management policy to the computing devices associated with a user, the requested management policy may also be provided to one or more of the interconnected computing devices associated with the user. Accordingly, in response to receipt of a request for a management policy, the policy manager may identify the computing devices associated with the computing device that requested the management policy. The policy manager may then initiate transfer of the requested management policy to at least one of the computing devices associated with the computing device that requested the management policy.

The policy agents at the computing devices may thus apply the management policy to manage interaction between the interconnected computing devices. For example, a policy agent may manage the interaction between one application at a first computing device and a second application at another computing device. A policy agent may also apply the management policy to manage communications between applications at the same computing device.

As described above, interconnected computing devices may exchange content such that content residing at one computing device (the originating computing device) may be provided to a second computing device (the destination computing device). The destination computing device may thus present the transferred content at an application at the second computing device. Accordingly, the orchestration framework may receive a request from the originating computing device to present content at an application at a destination device. The policy agent may thus determine whether the application at the destination computing device is subject to a policy agent. If the application at the destination device is not subject to a policy agent (e.g., if the application is an unmanaged application), then the policy agent may block or otherwise prevent the originating computing device from transferring the content to the destination computing device. If, however, the application at the destination device is subject to a policy agent (e.g., if the application is a managed application), then the orchestration framework may initiate and facilitate transfer of the content to the destination application. In this way, an enterprise may ensure that content is only transferred between devices and applications that include policy agents in order to control the use of that content.

In some example implementations, the orchestration framework may attempt to locate another application at the destination computing device that is subject to a policy agent. If another application subject to a policy agent is located at the destination computing device, then transfer of the content to that application may be initiated. In other example implementations, the orchestration framework may attempt to locate another application at a different computing device associated with the originating computing device. If a different computing device that includes an application that is subject to a policy agent is located, then that computing device may be selected as the destination device to send the transferred content to.

If the destination computing device does not include an application that is capable of presenting the transferred content and that is subject to a policy agent, a client agent subject to a policy agent may be launched at the destination device. The client agent may thus be configured with a virtual application that is capable of presenting the transferred content, and the transferred content may be provided to the virtual application for presentation.

As described above, a user may select content at a computing device to be presented at another computing connected to the computing device. Upon selection of the content to transfer, a list may be displayed listing computing devices available for selection as the destination computing device. The user may then select one of the computing devices from the list, and the content may be transferred to the selected computing device for presentation. In some example implementations, an orchestration framework may identify applications at the connected computing devices that are subject to policy agents and applications at the connected computing devices that are not subject to policy agents. The orchestration framework may thus indicate to the originating computing device the applications at the connected computing devices that are and are not subject to a policy agent. Accordingly, the list of computing devices available for selection as the destination computing device may include computing devices that are subject to a policy agent and exclude computing devices that are not subject to a policy agent. In this way, the list of computing may, in some examples, only display computing devices that include applications capable of presenting the selected content and that are subject to a policy agent.

Enterprise Application Store for Orchestration Framework for Connected Devices

An enterprise application store for delivering applications to computing devices is also described above. Aspects of the enterprise application store may be applied in the cross-device coordination context. In particular, an orchestration framework may interconnect multiple computing devices such that the orchestration framework coordinates a computing activity across the computing devices. The computing devices may also be connected to an enterprise application store that delivers applications to the interconnected computing devices in order to enable computing devices to perform at least a portion of the computing activity. The interconnected computing devices may be associated with a common user.

Figure 51:
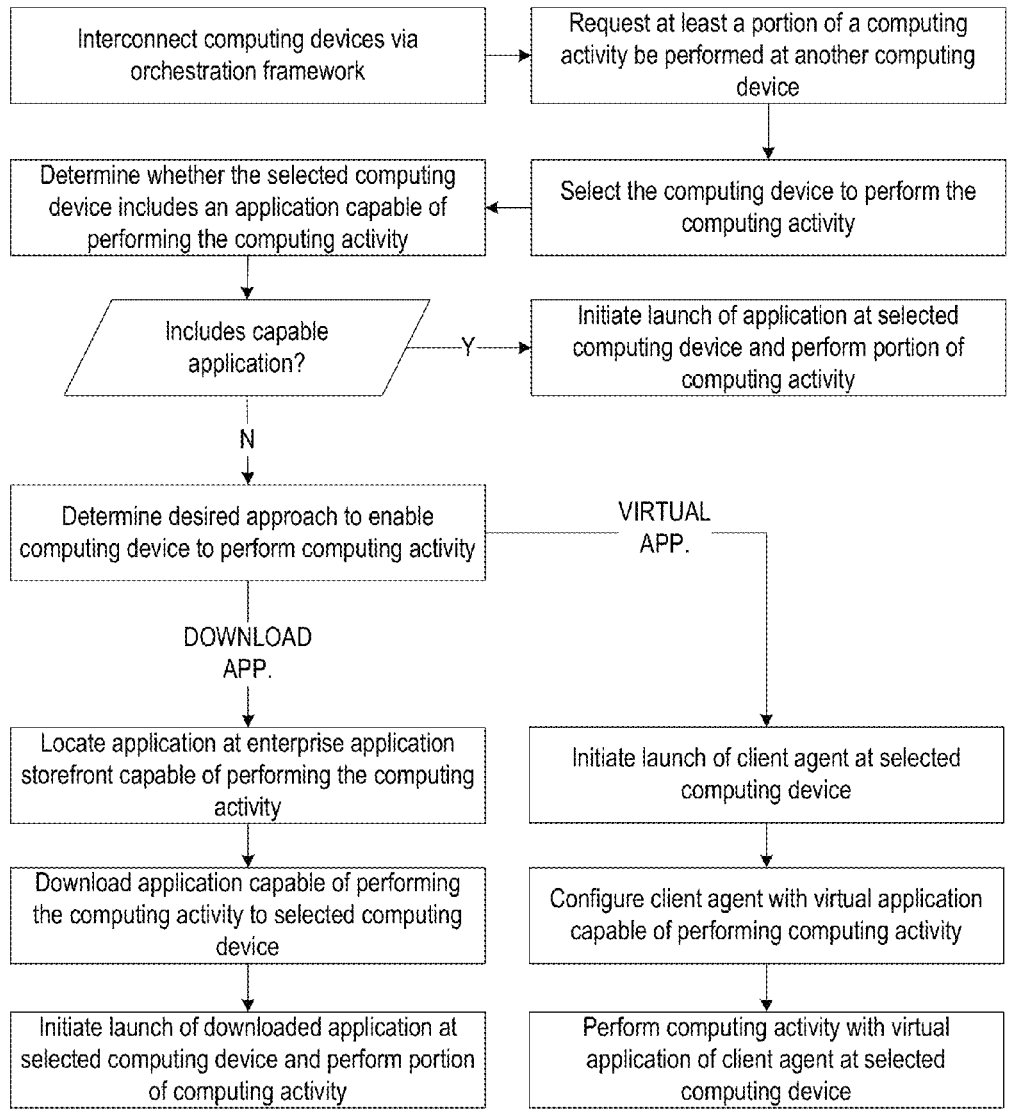
FIG. 51 is a flowchart of example method steps for coordinating operation of a computing activity at multiple computing devices interconnected through an orchestration framework.
Figure 52:
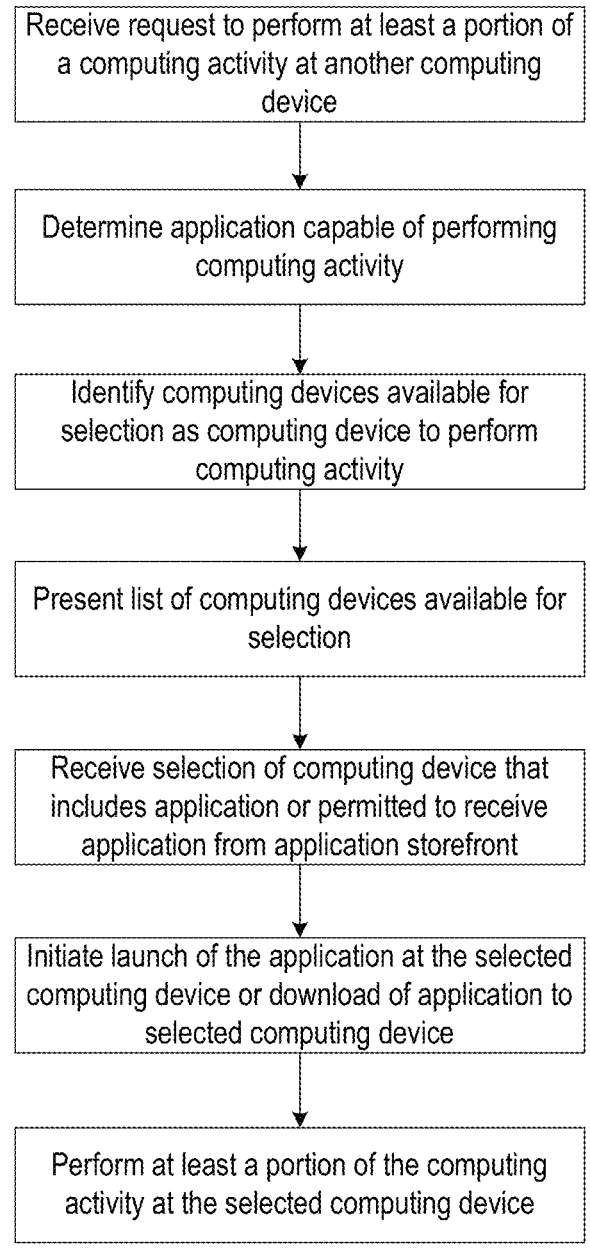
FIG. 52 is a flowchart of example method steps for selecting an interconnected computing device to perform at least a portion of a computing activity.

FIGS. 51-52 illustrate flowcharts of example method steps for coordinating computing activities across computing devices interconnected via an orchestration framework and connected to an application store. In particular, FIG. 51 is a flowchart 5100 of example method steps for coordinating operation of a computing at activity at multiple computing devices interconnected through the orchestration framework. FIG. 52 is a flowchart of example method steps for selecting an interconnected computing device to perform at least a portion of the computing activity. Furthermore, an enterprise application store may be utilized to deliver applications to interconnected computing devices in order to equip those computing devices with applications to perform at least a portion of the computing activity It will also be appreciated that the steps are shown by way of example only and that the principles disclosed in the flowcharts may be similarly applicable to computing devices interconnected via the orchestration framework using a client-server communication session or a peer-to-peer communication session.

The enterprise application store may deliver applications to the computing devices interconnected via the orchestration framework as noted above. A user may access the application store from one computing device and select an application to be downloaded to that computing device or another computing device associated with that computing device and interconnected with that computing device via the orchestration framework. The orchestration framework may also automatically identify and provide applications to computing devices in order to enable those computing devices to perform at least a portion of a coordinated computing activity. It will be appreciated that the virtual workspace may also prepare applications as managed applications before delivering the applications to a computing device. The enterprise application store may also deliver management policies to the interconnected computing devices for managing operation of the computing devices and managed applications at those computing devices. If, for example, the application to provide the destination computing device is an unmanaged application, the enterprise application store may modify the unmanaged application to include a policy agent as described above such that the unmanaged application becomes a managed application. The policy agent may thus enforce one or more management policies during operation of the managed application at the destination computing device.

As noted above, the application store may automatically provide applications to the interconnected computing devices in order to coordinate operation of a computing activity across the computing devices. When a computing device (an originating computing device) submits a request to perform at least a portion of a computing activity at another computing device (a destination computing device), the orchestration framework may determine whether the destination computing device includes an application that is capable of performing the computing activity. If the destination computing device does not include an application that is capable of performing the computing activity, then the application store may identify an application available from the application store that is capable of performing the computing activity and initiate download of the application to the destination computing device. The destination computing device may thus utilize the received application to perform at least a portion of the computing activity.

In one example, a user may interconnect via an orchestration framework a tablet computer, a television display device, and a mobile telephone during a presentation. The user may desire to obtain an audio recording of the presentation and may desire to use a microphone at the mobile telephone to record the audio. The user may submit from the tablet computer a request via the orchestration framework to record audio using the mobile telephone. The mobile telephone may not include an audio recording application however. Accordingly, the orchestration framework may query the enterprise application store to identify a mobile telephone application that is capable of recording audio and that is permitted to be received and launched at the mobile telephone. The orchestration framework may thus initiate a download of the audio recording application from the application store to the mobile phone. In some instances, the enterprise application store may prepare the audio recording application as a managed application and provide the management policies to the mobile phone along with the application. Having received the audio recording application, the mobile phone may record the presentation for the user and, e.g., transfer the audio recording via the orchestration framework to the tablet computer at the conclusion of the presentation. The management policy may also indicate that the audio recording application be deleted from the mobile telephone at the conclusion of the presentation, and the application store may track which application are provided to which computing devices. Accordingly, the orchestration framework may, through the management policies and a selective wipe feature described above, ensure that applications automatically provided by the application store do not reside at destination computing devices longer than needed to perform a desired computing activity.

The enterprise application store may also be configured to recommend applications for delivery to computing devices based on the type of computing device or, additionally or alternatively, the capabilities of the computing device. For example, if a computing device is capable of presenting video content (e.g., includes a video output device), then the application store may recommend video output applications for delivery to the computing device. As another example, if a computing device is capable of presenting audio content (e.g., includes an audio output device), then the application store may recommend audio output applications for delivery to the computing devices. As a further example, if a computing device is capable of editing a document (e.g., includes a keyboard input device), then the application store may recommend document editing applications for delivery to the computing device. Additional and alternative recommendations will be appreciated.

Before providing an application to a destination computing device, the orchestration framework may determine whether the destination computing device is permitted to perform the computing activity or receive the application capable of performing the computing activity. The orchestration framework may make the determination based on one or more management policies maintained by the application store. The management policy may indicate whether the computing device is permitted to perform the computing activity or receive the application based on the type of the computing device or a user associated with the computing device (e.g., a user role associated with the user). If the management policy indicates that the computing device is permitted to receive the application and is permitted to perform at least a portion of the computing activity, then the orchestration framework may initiate download of the application to the destination computing device. If, however, the destination computing device is not permitted to receive the application or not permitted to perform at least a portion of the computing activity, then the orchestration framework may not initiate (block or otherwise prevent) the download of the application to the destination computing device.

The orchestration framework may also dynamically determine a set of computing devices to present as a list of available for selection as a destination computing device. The orchestration framework may configure the list based on the capabilities of potential destination computing device or, additionally or alternatively, based on the management policies indicating whether the potential destination computing devices are permitted to perform at least a portion of the computing activity. In one example, the list of computing devices available for selection as a destination computing device may include computing devices capable of performing at least a portion of the computing activity and excludes computing devices not capable of performing at least a portion of the computing activity. In another example, the list of computing devices available for selection as a destination computing device may include computing devices permitted to receive an application capable of performing at least a portion of the computing activity and excludes any computing devices that are not permitted to receive such an application. In a further example, the list of computing devices available for selection as a destination computing device may include computing devices permitted to perform at least a portion of the computing activity and exclude any computing devices that are not permitted to perform at least a portion of the computing activity.

In some example instances, the destination computing device may not include an application capable of performing at least a portion of the computing activity and may not permitted to receive an application capable of performing the computing activity. In this example, the orchestration framework may initiate download of a client agent from the enterprise application store to the destination computing device. The client agent may be configured with a virtual application that is capable of performing at least a portion of the computing activity. In this way, the orchestration framework may thus coordinate operation of at least a portion of the computing activity at the destination computing device.

The computing devices may also be interconnected via the orchestration framework to a virtual workspace. The virtual workspace may allow a user to access, manage, and utilize various types of workspace content, which may include a set of tasks, messages, contacts, events, computer files, applications, calendars, and other types of workspace content. The enterprise application store may also be used to provide computing devices with applications capable of presenting content selected from the virtual workspace. For example, a user may select workspace content to view at a computing device. The computing device, however, may not include an application capable of presenting the selected workspace content to view. Accordingly, the orchestration framework may initiate a download of an application capable of presenting the selected workspace content from the application store to the computing device such that the computing device can view the selected workspace content.

The orchestration framework may, in some example implementations, automatically determine which application to download to a computing device. For example, the workspace content may be associated with a workspace content type. The virtual workspace may maintain a list of associations between workspace content type and an application capable of presenting workspace content of the workspace content type. Additionally or alternatively, the virtual workspace may maintain a list of associations between workspace content type and a computing device capable of presenting workspace content of the workspace content type. The associations may be general associations applicable to workspace content across virtual workspaces. The associations may additionally or alternatively be user-specific such that each user may define which applications or computing devices should automatically be selected to present workspace content. Accordingly, the virtual workspace may provide one or more controls that allow a user to establish or modify associations between workspace content type, interconnected computing devices, and applications. For example, a user may specify that a television display device connected to the orchestration framework should present video content when the user selects video content for presentation. As another example a user may specify that a tablet computing device connected to the orchestration framework should present web-based content (e.g., web pages) when the user selects web-based content for presentation. Moreover, when a type of workspace content is associated with a particular application, the orchestration framework may automatically locate a computing that includes that application and select that computing device to present the workspace content of that type.

In some situations, the orchestration framework may determine that none of the interconnected computing devices is capable of presenting the workspace content. In response, a virtual client may be launched at one of the computing devices and configured to include a virtual application that is capable of presenting the selected workspace content. Having launched the client agent and configured the client agent with the virtual application, the selected workspace content may be provided to the virtual application at the client agent for presentation.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   interconnecting a plurality of client computing devices through an orchestration framework such that functionality associated with a computing activity is assignable to one or more of the client computing devices;
   receiving a request to transfer content from a first client computing device of the plurality of client computing devices to a second client computing device of the plurality of client computing devices while the first client computing device and the second client computing device are communicatively connected via the orchestration framework;
   identifying a data vault at the first client computing device that stores the content;
   determining whether the data vault is encrypted or unencrypted;
   instructing the second client computing device to store the content in an encrypted data vault of the second client computing device or in an unencrypted data vault of the second client computing device based on whether the data vault of the first client computing device is encrypted or unencrypted; and
   transmitting to the second client computing device an instruction to delete the content wherein receipt of the instruction at the second client computing device causes the second client computing device to delete at least a portion of encrypted content from the encrypted data vault and at least a portion of unencrypted content from the unencrypted data vault.

2. The method of claim 1 further comprising, responsive to a determination that the first data vault is encrypted:
   encrypting the content at the first client computing device using an encryption key before transferring the content to the second client computing device; and
   providing the encryption key to the second client computing device such that the second client computing device is capable of decrypting the content.

3. The method of claim 1 further comprising, responsive to a determination that the data vault is unencrypted, instructing the second client computing device to store the content at a unencrypted data vault.

4. The method of claim 1 wherein the orchestration framework is configured to communicatively connect the first client computing device and the second client computing device via at least one of a client-server communication session, a peer-to-peer communication session, and combinations thereof.

5. An apparatus comprising:
at least one processor; and
memory storing computer-readable instructions that, when executed by the at least one processor, cause the apparatus to
interconnect a plurality of client computing devices through an orchestration framework such that functionality associated with a computing activity is assignable to one or more of the client computing devices,
receive a request to transfer content from a first client computing device of the plurality of client computing devices to a second client computing device of the plurality of client computing devices while the first client computing device and the second client computing device are communicatively connected via the orchestration framework,
identify a data vault that stores the content at the first client computing device,
instruct the second client computing device to store the content in an encrypted data vault of the second client computing device or in an unencrypted data vault of the second client computing device based on whether the data vault of the first client computing device is encrypted or unencrypted, and
transmit to the second client computing device an instruction to delete the content; and
wherein receipt of the instruction at the second client computing device causes the second client computing device to delete at least a portion of encrypted content from the encrypted data vault and at least a portion of unencrypted content from the unencrypted data vault.

6. The apparatus of claim 5 wherein:
the instructions, when executed by the at least one processor, further cause the apparatus to
instruct the second computing device to store the content in the encrypted data vault responsive to a determination that the data vault of the first client device is encrypted, and
instruct the second client computing device to store the content in the unencrypted data vault responsive to a determination that the data vault of the first client computing device is unencrypted.

7. The apparatus of claim 5 wherein:
the first client computing device includes a main data store;
the data vault is encrypted;
the main data store and the data vault are separate components; and
the instructions, when executed by the at least one processor, further cause the apparatus to
determine whether the second client computing device includes at least one encrypted data vault, and
initiate transfer of the content to the second client computing device responsive to a determination that the second client computing device includes at least one encrypted data vault.

8. The apparatus of claim 7 wherein the instructions, when executed by the at least one processor, further cause the apparatus to block transfer of the content to the second client computing device responsive to a determination that the second client computing device does not include at least one encrypted data vault.

9. The apparatus of claim 7 wherein the instructions, when executed by the at least one processor, further cause the apparatus to:
responsive to a determination that the second client computing device does not include at least one encrypted data vault,
locate a third client computing device of the plurality of client computing devices that includes at least one encrypted data vault,
initiate transfer of the content to the third client computing device, and
instruct the third client computing device to store the content in one of the at least one encrypted data vaults at the third client computing device.

10. The apparatus of claim 5 wherein:
the second client computing device is one of at least two client computing devices of the plurality of client computing devices that store the content; and
the instructions, when executed by the at least one processor, cause the apparatus to track each client computing device of the plurality of client computing devices that stores the content.

11. The apparatus of claim 10 wherein the instructions, when executed by the at least one processor, further cause the apparatus to instruct each client computing device of the plurality of client computing devices to delete at least a portion of the content respectively stored at each of the client computing devices.

12. One or more non-transitory computer-readable media having instructions that, when executed, cause a computing device to:
connect to one or more client computing devices through an orchestration framework such that functionality associated with a computing activity is assignable to one or more of the client computing devices;
receive an indication of selected content to transfer to a selected client computing device of the one or more client computing devices while the computing device and the one or more client computing devices are communicatively connected via the orchestration framework wherein the selected content is stored at a first encrypted data vault of the computing device;
display a list of client computing devices available for selection as the selected client computing device wherein the list of client computing devices includes one or more client computing devices that have an encrypted data vault and excludes any client computing devices that do not have an encrypted data vault;
receive a selection of one of the client computing devices in the list of client computing devices as the selected client computing device;
initiate transfer of the selected content to the selected client computing device via the orchestration framework wherein receipt of the selected content at the selected client computing device causes the selected client computing device to store the selected content at a second encrypted data vault; and
initiate transmission of an instruction to the selected computing device to delete the selected content which causes the selected client computing device to delete a portion of encrypted content stored at the second encrypted data vault and at least a portion of unencrypted content stored at an unencrypted data vault of the selected client computing device.

13. The computer-readable media of claim 12 wherein the instructions, when executed, cause the computing device to:
encrypt the content with an encryption key before transferring the selected content to the selected client computing device; and providing the selected client computing device with the encryption key such that the selected client computing device is capable of decrypting the selected content.

14. The computer-readable media of claim 12 wherein:
the computing device further includes a first unencrypted data vault; and
the instructions, when executed, further cause the computing device to
  receive transferred content from a second client computing device of the one or more client computing devices, and
  store the transferred content in one of the first encrypted data vault or the first unencrypted data vault.

15. The computer-readable media of claim 14 wherein:
the transferred content is encrypted; and
the instructions, when executed, further cause the computing device to receive a transferred encryption key with the transferred content, and decrypt the transferred content using the encryption key.

16. The computer-readable media of claim 14 wherein:
the transferred content is stored in the first encrypted data vault; and
the instructions, when executed, cause the computing device to delete at least a portion of the transferred content responsive to receipt of an instruction to delete the transferred content.

* * * * *